(12) United States Patent
Fujisawa et al.

(10) Patent No.: US 9,828,548 B2
(45) Date of Patent: Nov. 28, 2017

(54) LIQUID-CRYSTAL COMPOSITION

(71) Applicant: DIC CORPORATION, Tokyo (JP)

(72) Inventors: Toru Fujisawa, Kita-adachi-gun (JP); Kazuaki Hatsusaka, Kita-adachi-gun (JP); Kazunori Maruyama, Kita-adachi-gun (JP); Isa Nishiyama, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/405,579

(22) PCT Filed: Jun. 5, 2013

(86) PCT No.: PCT/JP2013/065622
§ 371 (c)(1),
(2) Date: Mar. 31, 2015

(87) PCT Pub. No.: WO2013/183683
PCT Pub. Date: Dec. 12, 2013

(65) Prior Publication Data
US 2015/0259600 A1 Sep. 17, 2015

(30) Foreign Application Priority Data

Jun. 6, 2012 (JP) ................................ 2012-129307

(51) Int. Cl.
| | | |
|---|---|---|
| *G02F 1/1333* | (2006.01) |
| *C09K 19/30* | (2006.01) |
| *C09K 19/12* | (2006.01) |
| *C09K 19/02* | (2006.01) |
| *C09K 19/58* | (2006.01) |
| *C09K 19/04* | (2006.01) |

(52) U.S. Cl.
CPC ...... *C09K 19/3066* (2013.01); *C09K 19/0225* (2013.01); *C09K 19/12* (2013.01); *C09K 19/126* (2013.01); *C09K 19/3001* (2013.01); *C09K 19/3003* (2013.01); *C09K 19/3028* (2013.01); *C09K 19/588* (2013.01); *C09K 2019/0407* (2013.01); *C09K 2019/0466* (2013.01); *C09K 2019/122* (2013.01); *C09K 2019/123* (2013.01); *C09K 2019/301* (2013.01); *C09K 2019/304* (2013.01); *C09K 2019/3012* (2013.01); *C09K 2019/3016* (2013.01); *C09K 2019/3019* (2013.01); *C09K 2019/3027* (2013.01); *C09K 2019/3075* (2013.01); *C09K 2019/3077* (2013.01)

(58) Field of Classification Search
CPC ............... C09K 19/3006; C09K 19/12; C09K 19/3003; C09K 19/588; C09K 19/126; C09K 19/3001; C09K 19/3028; C09K 19/0225; C09K 2019/0407; C09K 2019/0466; C09K 2019/122; C09K 2019/123; C09K 2019/301; C09K 2019/3012; C09K 2019/3016; C09K 2019/3019; C09K 2019/3075; C09K 2019/3077; C09K 2019/3027; C09K 2019/304; G02F 1/1333
USPC .......................... 252/299.01, 299.63; 428/1.1
See application file for complete search history.

(56) References Cited

U.S. PATENT DOCUMENTS

| | | | |
|---|---|---|---|
| 8,277,684 B2 * | 10/2012 | Klasen-Memmer | ........... C09K 19/3003 252/299.01 |
| 8,435,422 B2 * | 5/2013 | Kobayashi | ......... C09K 19/3003 252/299.01 |

FOREIGN PATENT DOCUMENTS

EP     2 031 040 B1 *  7/2008  ............. C09K 19/42

* cited by examiner

*Primary Examiner* — Geraldina Visconti
(74) *Attorney, Agent, or Firm* — Westerman, Hattori, Daniels & Adrian, LLP

(57) ABSTRACT

There is provided a liquid crystal composition which enables a significant reduction in crystallization temperature as compared with addition of a homolog while having a similar skeleton structure, which has an excellent compatibility, and which enables an increase in the absolute value of negative dielectric anisotropy ($\Delta\epsilon$). The liquid crystal composition contains two or more compounds which each have two to four ring structures between two side chains. At least one of the ring structures is a 2,3-difluorobenzene skeleton. The two side chains are bonded to different ring structures. The positions of the 2,3-difluorobenzene skeletons are different from each other, and the number of the ring structures are the same as each other.

11 Claims, No Drawings

LIQUID-CRYSTAL COMPOSITION

TECHNICAL FIELD

The present invention relates to a liquid crystal composition.

BACKGROUND ART

Ferroelectric liquid crystal (PLC) exhibits ferroelectricity through spontaneous polarization. It is known that liquid crystal having a permanent dipole moment in a direction vertical to the direction of the molecular long axis has a layered structure in a smectic phase, that the permanent dipole moment is not cancelled in a shift to a chiral smectic C (hereinafter referred to as SmC*) phase, in which the molecular long axis in this layered structure is tilted, even though it is averaged as a whole, and that spontaneous polarization is therefore generated with the result that the liquid crystal exhibits ferroelectricity. Application of voltage to the ferroelectric liquid crystal causes the permanent dipole moment to be oriented in the direction of the electric field and simultaneously causes the whole molecules to be aligned. The ferroelectric liquid crystal in an SmC* phase has been widely used in displays. Ferroelectric liquid crystal imparts optical activity (chirality) to smectic liquid crystal itself, such as p-decyloxybenzylidene p'-amino 2-methylbutyl cinnamate (DOBAMBC) of which the molecular design and synthesis were made by R. B., Meyer et al. in 1975. Even in the case where an optically active compound itself does not have liquid crystalline properties (not a liquid crystal compound), addition of the optically active compound enables generation of an SmC* phase. In such a case, a liquid crystal matrix exhibiting a non-chiral smectic C (hereinafter referred to as SmC) phase is generally used.

Among smectic phases having layered structures, in the SmC* phase, the direction of the alignment of the liquid crystal molecules has a certain tilt with respect to the layer normal. In addition, the individual layers have slight difference in the tilt angle from a layer plane (direction angle), which produces a helical structure in the molecular alignment.

Display devices using ferroelectric liquid crystal have a response speed which is at least 10 times larger than that of display devices using nematic liquid crystal. The first ferroelectric liquid crystal applied to displays is surface-stabilized ferroelectric liquid crystal (SSFLC) made by Clark and Lagerwall. Ferroelectric liquid crystal has been intensively studied since this application. Besides ferroelectric liquid crystal, for instance, nematic liquid crystal is known, such as FLC (ferroelectric liquid crystal), a TM (twisted nematic) type, an STN (super twisted nematic) type, a DS (dynamic light scattering) type, a GH (guest-host) type, an IPS (in-plane switching) type, an OCB (optically compensated birefringence) type, an OCB (electrically controlled birefringence) type, a VA (vertical alignment) type, or a CSH (color super homeotropic) type.

In general, it is known that phenylpyrimidine readily exhibits a chiral smectic C phase, and phenylpyrimidine is therefore widely used in a ferroelectric liquid crystal composition. The composition containing phenylpyrimidine, however, has a problem in obtaining sufficiently high specific resistance, whereas a liquid crystal material having a high specific resistance is necessary for driving by a TFT when a ferroelectric liquid crystal composition is used, as in the case of using a nematic liquid crystal; thus, screen burn-in and flicker are likely to be caused, which has been problematic in terms of a reduction in the reliability of LCDs. In order to produce a highly reliable LCD driven by a TFT, a nematic liquid crystal material to which a fluorine substituent has been introduced and which has a high specific resistance is widely used because it is useful for, for example, liquid crystal television sets. In regard to a smectic liquid crystal having a fluorine substituent, there has been a report in which 2,3-difluoro-1,4-phenylene derivatives and terphenyls exhibit a smectic C phase (see Hon Patent Literatures 1 and 2). In particular, 2,3-difluoro-4-alkyloxy-4'-trans-4-alkylcyclohexyl ethyl)biphenyl does not exhibit a smectic C phase but has a high melting point (see Non Patent Literature 3).

A mixture of a variety of liquid crystal compounds containing highly linear liquid crystal molecules, such as 2,3-difluoro-1,4-phenylene derivatives and terphenyls, is used as a liquid crystal composition (e.g., see Patent Literature 1). Among such compounds, 2,3-difluoro-biphenyl derivatives have a problem in which birefringence $\Delta n$ is high.

Almost all of known 2,3-difluoro-1,4-phenylene derivatives are, however, compounds having ring structures that are a trans-1,4-cyclohexylene group and a 1,4-phenylene group; unfortunately, such derivatives have a disadvantage in which they do not always have good compatibility with other liquid crystal compounds. It is therefore difficult to prepare a liquid crystal composition having a broad temperature range, particularly a liquid crystal composition which is less likely to suffer from crystal precipitation and phase separation even after being stored at low temperature for a long time; hence, there has been a need in which the melting point of a composition is decreased through an increase in solubility due to mixing of a number of various compounds with, for instance, a homologue (homologue having a difference only in the number of the carbon atoms of a side-chain alkyl group).

A liquid crystal compound has been studied as another technique that is different from the use of a homologue; the compound has enhanced properties specific to an n-type liquid crystal and enables expansion of the temperature range of a composition by introduction of a new skeleton structure different from a 2,3-difluoro-1,4-phenylene skeleton, such as a fluorine-substituted naphthalene structure or a tetrahydronaphthalene structure.

The addition of such a compound having a new skeleton structure, however, is highly restrictive in terms of, for example, compatibility with other liquid crystal compounds and effects on the physical properties and electro-optical properties of a liquid crystal composition, which has been problematic.

CITATION LIST

Patent Literature

PTL 1: WO 99/21815

Non Patent Literature

NPL 1: V. Reiffenrath; J. Krause; H. J. Plach; and G. Weber; New liquid-crystalline compounds with negative dielectric anisotropy. *Liquid Crystals* 1989, Vol. 5, No. 1, 159-170

NPL 2: Margaret E. Glendenning; John W. Goodby; Michael Hird; and Kenneth J. Toyne; The synthesis and mesomorphic properties of 2,2',3-tri- and 2,2',3,3'-tetra-fluoro-1,1':

4',1"-terphenyls for high dielectric biaxialityferroelectric liquid crystal mixtures. *J. Chem. Soc.* 1999, Perkin Trans. 2, 481-491

NPL 3: Michael Bird; George W. Gray; and Kenneth J. Toyne; The synthesis and transition temperatures of some trans-4-alkylcyclohexylethyl-substituted 2,3-difluorobiphenyls. *Liquid Crystals* 1992, vol. II, No. 4, 531-546

SUMMARY OF INVENTION

Technical Problem

It is an object of the present invention to provide a liquid crystal composition which enables a significant reduction in crystallization temperature as compared with addition of a homologue while having a similar skeleton structure, which has a good compatibility, and which enables an increase in the absolute value of negative dielectric anisotropy ($\Delta \in$).

Solution to Problem

The inventors have studied a variety of liquid crystal compositions to achieve the above-mentioned object and found that mixing liquid crystal compounds with each other in a specific combination enables a significant reduction in crystallization temperature, thereby accomplishing the present invention.

An aspect of the present invention provides a liquid crystal composition containing two or more compounds each having two to four ring structures between two side chains, at least one of the ring structures being a 2,3-difluorobenzene skeleton, and the two side chains being bonded to different ring structures, wherein in the compounds, the positions of the 2,3-difluorobenzene skeletons are different from each other, and the numbers of the ring structures are the same as each other under the following conditions:

(1) in the case where the number of the ring structures is two and where the two side chains have different molecular weights, the position of the ring structure to which the side chain having a larger molecular weight is bonded is defined as 1, and the position of the ring structure to which the side chain having a smaller molecular weight is bonded is defined as 2; in the case where the two side chains have the same molecular weight; the position of each ring structure is defined as 1;

(2) in the case where the number of the ring structures is three and where the two side chains have different molecular weights, the position of the ring structure to which the side chain having a larger molecular weight is bonded is defined as 1, the position of the ring structure to which the side chain having a smaller molecular weight is bonded is defined as 3, and the position of the ring structure to which no side chain is bonded is defined as 2; in the case where the two side chains have the same molecular weight, the position of each ring structure to which a side chain is bonded is defined as 1, and the position of the ring structure to which no side chain is bonded is defined as 2; and (3) in the case where the number of the ring structures is four and where the two side chains have different molecular weights, the position of the ring structure to which the side chain having a larger molecular weight is bonded is defined as 1, the position of the ring structure to which the side chain having a smaller molecular weight is bonded is defined as 4, the position of the ring structure adjoining the ring structure at the position 1 is defined as 2, and the position of the ring structure adjoining the ring structure at the position 4 is defined as 3; in the case where the two side chains have the same molecular weight, the position of each ring structure to which a side chain is bonded is defined as 1, and the position of the ring structure to which no side chain is bonded is defined as 2.

Advantageous Effects of Invention

According to the liquid crystal composition of the present invention, combined use of liquid crystal compounds having similar skeleton structures enables a significant reduction in crystallization temperature; thus, the liquid crystal composition having a low crystallization temperature and good compatibility can be provided.

DESCRIPTION OF EMBODIMENTS

The present invention will now be described on the basis of preferred embodiments.

The liquid crystal composition of the present invention is a composition containing two or more compounds each having a 2,3-difluorobenzene skeleton (hereinafter referred to as 2,3-difluorobenzene-skeleton-containing compounds); in the two or more 2,3-difluorobenzene-skeleton-containing compounds, positions of the 2,3-difluorobenzene skeletons are different from each other, and the numbers of the ring structures are the same as each other.

It is preferred that the 2,3-difluorobenzene-skeleton-containing compounds each have two side chains and two to four ring structures therebetween, that at least one of the ring structures be the 2,3-difluorobenzene skeleton, and that the two side chains be bonded to different ring structures. In this case, the position of the 2,3-difluorobenzene skeleton is defined as follows.

(1) in the case where the number of the ring structures is two and where the two side chains have different molecular weights, the position of the ring structure to which the side chain having a larger molecular weight is bonded is defined as 1, and the position of the ring structure to which the side chain having a smaller molecular weight is bonded is defined as 2; in the case where the two side chains have the same molecular weight, the position of each ring Structure is defined as 1;

(2) in the case where the number of the ring structures is three and where the two side chains have different molecular weights, the position of the ring structure to which the side chain having a larger molecular weight is bonded is defined as 1, the position of the ring structure to which the side chain having a smaller molecular weight is bonded is defined as 3, and the position of the ring structure to which no side chain is bonded is defined as 2; in the case where the two side chains have the same molecular weight, the position of each ring structure to which a side chain is bonded is defined as 1, and the position of the ring structure to which no side chain is bonded is defined as 2; and (3) in the case where the number of the ring structures is four and where the two side chains have different molecular weights, the position of the ring structure to which the side chain having a larger molecular weight is bonded is defined as 1, the position of the ring structure to which the side chain having a smaller molecular weight is bonded is defined as 4, the position of the ring structure adjoining the ring structure at the position 1 is defined as 2, and the position, of the ring structure adjoining the ring structure at the position 4 is defined as 3; in the case where the two side chains have the same molecular weight, the position of each ring structure to which a side chain is bonded is defined as 1, and the position of the ring structure to which no side chain is bonded is defined as 2.

In particular, assuming that the number of the ring structures is N, in the case where the two side chains have different molecular weights, the position of the ring structure to which the side chain having a larger molecular weight is bonded is defined as 1, the position of the ring structure to which the side chain having a smaller molecular weight is bonded is defined as N, and consecutive numbers from 1 to N are assigned, including the other one or more ring structures therebetween, to the ring structures in sequence. In the case where the two side chains have the same molecular weight, only the number which is smaller than N/2 is employed so that the same numbers are assigned starting from either of the ring structures bonded to the side chains; the position of each ring structure to which a side chain is bonded is defined as 1, and the position of the ring structure to which no side chain is bonded is defined as 2. In the case where the number of the ring structures is two, there is no ring structure to which a side chain is not bonded.

The 2,3-difluorobenzene-skeleton-containing compound used in the liquid crystal composition of the present invention preferably has a cyclic group selected from a phenylene group, a cyclohexylene group, a dioxolanediyl group, a cyclohexenylene group, a bicyclo[2.2.2]octylene group, a piperidinediyl group, a naphthalenediyl group, a decahydronaphthalenediyl group, a tetrahydronaphthalenediyl group, and an indanediyl group as a ring structure other than the 2,3-difluorobenzene skeleton; in the phenylene group, the naphthalenediyl group, the tetrahydronaphthalenediyl group, and the indanediyl group, at least one —CH═ group in each ring is optionally substituted with a nitrogen atom; in the cyclohexylene group, the dioxolanediyl group, the cyclohexenylene group, the bicycle[2.2.2]octylene group, the piperidinediyl group, the decahydronaphthalenediyl group, the tetrahydronaphthalenediyl group, and the indanediyl group, one —CH$_2$— group or two or more —CH$_2$— groups not adjoining each other in each ring are optionally substituted with —O— and/or —S—; and at least one hydrogen atom of each cyclic group is optionally substituted with a fluorine atom, a chlorine atom, a bromine atom, a CN group, an NO$_2$ group, or an alkyl, alkoxy, alkylcarbonyl, or alkoxycarbonyl group which has 1 to 7 carbon atoms and of which one or more hydrogen atoms are each optionally substituted with a fluorine atom or a chlorine atom.

In the liquid crystal composition of the present invention, two or more 2,3-difluorobenzene-skeleton-containing compounds which each have a 2,3-difluorobenzene skeleton at a different position and the same number of ring structures each preferably have at least one same ring structure besides the 2,3-difluorobenzene skeleton. In particular, in the two or more 2,3-difluorobenzene-skeleton-containing compounds,
(1) in the case where the number of the ring structures is two, it is preferred that the ring structures other than the 2,3-difluorobenzene skeletons be the same as each other;
(2) in the case where the number of the ring structures is three, it is preferred that one of the ring structures other than the 2,3-difluorobenzene skeleton in one compound be the same as one of them in the other compound, and it is more preferred that all of the two ring structures in one compound be the same as all of the two ring structures in the other compound;
(3) in the case where the number of the ring structures is four, it is preferred that one of the ring structures other than the 2,3-difluorobenzene skeleton in one compound be the same as one of them in the other compound, it is more preferred that two of the ring structures in one compound be the same as two of them in the other compound, and it is further preferred that all of the three ring structures in one compound be the same as all of them in the other compound.

In the two or more 2,3-difluorobenzene-skeleton-containing compounds, one or more linking groups that link the ring structures to each other in one compound are preferably different from one or more such linking groups in the other compound. In particular, in the two or more 2,3-difluorobenzene-skeleton-containing compounds,
(1) in the case where the number of the ring structures is two, it is preferred that the linking group in one compound be different from the linking group in the other compound;
(2) in the case where the number of the ring structures is three, it is preferred that one of the two linking groups in one compound be different from one of them in the other compound, and it is more preferred that all of them in one compound be different from all of them in the other compound;
(3) in the case where the number of the ring structures is four, it is preferred that one of the three linking groups in one compound be different from one of them in the other compound, and it is more preferred that two of them in one compound be different from two of them in the other compound; and it is further preferred that all of them in one compound be different from all of them in the other compound.

The composition has at least one combination of the two or more 2,3-difluorobenzene-skeleton-containing compounds in which the positions of the 2,3-difluorobenzene skeletons are different from each other and in which the numbers of the ring structures are the same as each other; it is preferred that the composition have multiple combinations thereof. In determination of the number of such combinations, a compound once counted among a combination is not re-counted.

The combination is determined according to the following rules:
(1) a combination of compounds in which the ring structures other than the 2,3-difluorobenzene skeletons are the same as each other is most prior to any other combination;
(2) in the case where multiple compounds in which the ring structures other than the 2,3-difluorobenzene skeletons are the same as each other are used, a combination of compounds having different linking groups from each other has a priority; and
(3) in the case where multiple compounds having different linking groups from each other are used, a combination of compounds having the same side chains as each other has a priority.

The two or more 2,3-difluorobenzene-skeleton-containing compounds to be combined are each preferably used in substantially the same amount. In particular, the difference in an amount therebetween is preferably 10%, and more preferably 5%.

The liquid crystal composition of the present invention preferably contains, as liquid crystal compounds having negative dielectric anisotropy $\Delta\epsilon$, only a combination of the two or more 2,3-difluorobenzene-skeleton-containing compounds which each have a 2,3-difluorobenzene skeleton at a different position and the same number of ring structures.

The 2,3-difluorobenzene-skeleton-containing compound is preferably a compound selected from the group consisting of compounds represented by General Formula (X).

[Chem. 1]

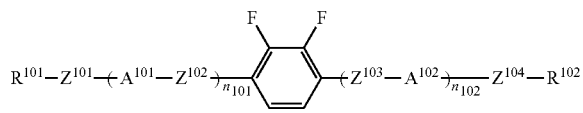
(X)

(in the formula, $R^{101}$ and $R^{102}$ each independently represent a linear or branched alkyl group having 1 to 18 carbon atoms, a hydrogen atom, or a fluorine atom; in the alkyl group, one —$CH_2$— group or two or more —$CH_2$— groups not adjoining each other are each optionally substituted with —O—, —S—, —CO—, —CO—O—, —O—CO—, —CO—S—, —S—CO—, —O—$SO_2$—, —$SO_2$—O—, —O—CO—O—, —CH=CH—, —C≡C—, a cyclopropylene group, or —Si$(CH_3)_2$—; at least one hydrogen atom of the alkyl group is optionally substituted with a fluorine atom, a chlorine atom, a bromine atom, or a CN group;

$Z^{101}$ to $Z^{104}$ each independently represent —O—, —S—, —CO—, —CO—O—, —O—CO—, —O—CO—O—, —CO—N($R^a$)—, —N($R^a$)—CO—, —$OCH_2$—, —$CH_2$O—, —$SCH_2$—, —$CH_2$S—, —O—$SO_2$—, —$SO_2$—O—, —$CF_2$O—, —$OCF_2$—, —$CF_2$S—, —$SCF_2$—, —$CH_2CH_2$—, —$CF_2CH_2$—, —$CH_2CF_2$—, —$CF_2CF_2$—, —CH=CH—, —CF=CH—, —CH=CF—, —CF=CF—, —C≡C—, —CH=CH—CO—O—, —O—CO—CH=CH—, or a single bond; $R^a$ of —CO—N($R^a$)— or —N($R^a$)—CO— represents a hydrogen atom or a linear or branched alkyl group having 1 to 4 carbon atoms;

$A^{101}$ and $A^{102}$ each independently represent a cyclic group selected from a phenylene group, a cyclohexylene group, a dioxolanediyl group, a cyclohexenylene group, a bicyclo[2.2.2]octylene group, a piperidinediyl group, a naphthalenediyl group, a decahydronaphthalenediyl group, a tetrahydronaphthalenediyl group, and an indanediyl group; in the phenylene group, the naphthalenediyl group, the tetrahydronaphthalenediyl group, and the indanediyl group, at least one —CH= group in each ring is optionally substituted with a nitrogen atom; in the cyclohexylene group, the dioxolanediyl group, the cyclohexenylene group, the bicyclo[2.2.2]octylene group, the piperidinediyl group, the decahydronaphthalenediyl group, the tetrahydronaphthalenediyl group, and the indanediyl group, one —$CH_2$— group or two or more —$CH_2$— groups not adjoining each other in each ring are optionally substituted with —O— and/or —S—; at least one hydrogen atom of each cyclic group is optionally substituted with a fluorine atom, a chlorine atom, a bromine atom, a CN group, an $NO_2$ group, or an alkyl, alkoxy, alkylcarbonyl, or alkoxycarbonyl group which has 1 to 7 carbon atoms and of which at least one hydrogen atom is optionally substituted with a fluorine atom or a chlorine atom;

$n_{101}$ and $n_{102}$ are each independently 0, 1, 2, or 3; and $n_{101}+n_{102}$ is 1, 2, or 3)

In General Formula (X), each of $A^{101}$, $A^{102}$, and the 2,3-difluoro-1,4-phenylene group therebetween is the "ring structure", and each of $R^{101}$—$Z^{101}$ and $Z^{104}$—$R^{102}$ is the "side chain". The number of the ring structures in the compound is the sum total of $n_{101}$ which is the number of $A^{101}$, $n_{102}$ which is the number of $A^{102}$, and one which is the number of the 2,3-difluoro-1,4-phenylene group therebetween, namely, $n_{101}+n_{102}+1$.

When 2,3-difluorobenzene-skeleton-containing compounds represented by General Formula (X) are represented by different general formulae based on differences in the number of the ring structures and in the position of the 2,3-difluorobenzene skeleton, a compound having two ring structures is represented by any of General Formulae (I-1) and (I-2), a compound having three ring structures is represented by any of General Formulae (II-1) to (II-3), and a compound having four ring structures is represented by any of General Formulae (III-1) to (III-4).

[Chem. 2]

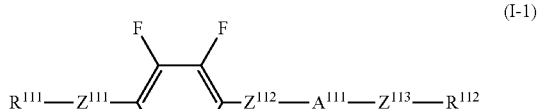
(I-1)

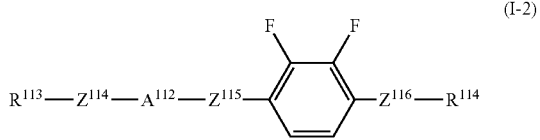
(I-2)

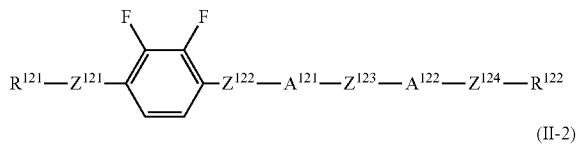
(II-1)

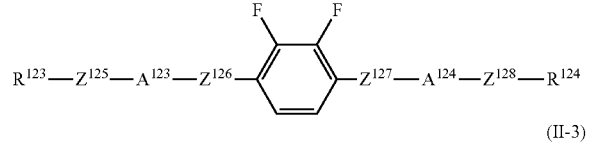
(II-2)

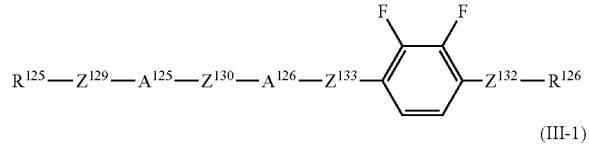
(II-3)

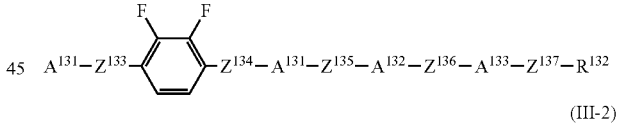
(III-1)

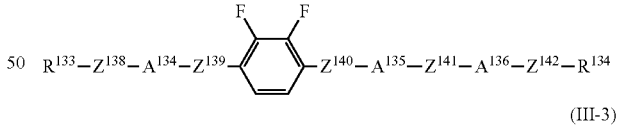
(III-2)

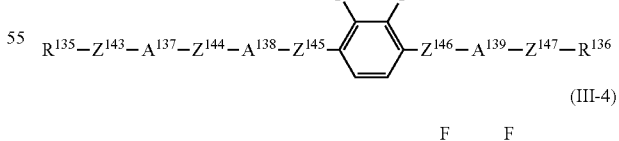
(III-3)

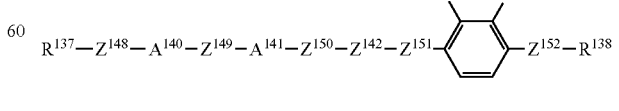
(III-4)

(in the formulae, $R^{111}$ to $R^{114}$, $R^{121}$ to $R^{126}$, and $R^{131}$ to $R^{138}$ each independently represent a linear or branched alkyl group having 1 to 18 carbon atoms, a hydrogen atom, or a fluorine atom; in the alkyl group, one —$CH_2$— group or two or more —CH$_2$— groups not adjoining each other are each optionally substituted with —O—, —S—, —CO—, —CO—O—, —O—CO—, —CO—S—, —S—CO—, —O—SO$_2$—, —SO$_2$—O—, —O—CO—O—, —CH=CH—, —C≡C—, a cyclopropylene group, or —Si(CH$_3$)$_2$—; at least one hydrogen atom of the alkyl group is optionally substituted with a fluorine atom, a chlorine atom, a bromine atom, or a CN group;

$Z^{111}$ to $Z^{116}$ and $Z^{121}$ to $Z^{152}$ each independently represent —O—, —S—, —CO—, —CO—O—, —O—CO—, —O—CO—O—, —CO—N(R$^a$)—, —N(R$^a$)—CO—, —OCH$_2$—, —CH$_2$O—, —SCH$_2$—, —CH$_2$S—, —O—SO$_2$—, —SO$_2$—O—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=CH—, —CF=CH—, —CH=CF—, —CF=CF—, —C≡C—, —CH=CH—CO—O—, —O—CO—CH=CH—, or a single bond; R$^a$ of —CO—N(R$^a$)— or —N(R$^a$)—CO— represents a hydrogen atom or a linear or branched alkyl group having 1 to 4 carbon atoms;

$A^{111}$ and $A^{112}$, $A^{121}$ to $A^{126}$, and $A^{131}$ to $A^{142}$ each independently represent a cyclic group selected from a phenylene group, a cyclohexylene group, a dioxolanediyl group, a cyclohexenylene group, a bicycle[2.2.2]octylene group, a piperidinediyl group, a naphthalenediyl group, a decahydronaphthalenediyl group, a tetrahydronaphthalenediyl group, and an indanediyl group; in the phenylene group, the naphthalenediyl group, the tetrahydronaphthalenediyl group, and the indanediyl group, at least one —CH— group in each ring is optionally substituted with a nitrogen atom; in the cyclohexylene group, the dioxolanediyl group, the cyclohexenylene group, the bicyclo[2.2.2]octylene group, the piperidinediyl group, the decahydronaphthalenediyl group, the tetrahydronaphthalenediyl group, and the indanediyl group, one —CH$_3$— group or two or more —CH$_2$— groups not adjoining each other in each ring are optionally substituted with —O— and/or —S—; and at least one hydrogen atom of each cyclic group is optionally substituted with a fluorine atom, a chlorine atom, a bromine atom, a CN group, an NO$_2$ group, or an alkyl, alkoxy, alkylcarbonyl, or alkoxycarbonyl group which has 1 to 7 carbon atoms and of which at least one hydrogen atom is optionally substituted with a fluorine atom or a chlorine atom)

The liquid crystal composition of the present invention preferably satisfies any one or more of the following requirements (i) to (iii).

(i) in the case where the liquid crystal composition contains two or more 2,3-difluorobenzene-skeleton-containing compounds each having two ring structures, these compounds are preferably at least two compounds of which one or more compounds are selected from each of at least two groups out of the group consisting of compounds represented by General Formula (I-1) and the group consisting of compounds represented by General Formula (I-2). In this case, a 2,3-difluorobenzene-skeleton-containing compound having three or four ring structures may be further used.

(ii) In the case where the liquid crystal composition contains two or more 2,3-difluorobenzene-skeleton-containing compounds each having three ring structures, these compounds are preferably at least two compounds of which one or more compounds are selected from each of at least two groups out of the group consisting of compounds represented by General Formula (II-1), the group consisting of compounds represented by General Formula (II-2), and the group consisting of compounds represented by General Formula (II-3). In this case, a 2,3-difluorobenzene-skeleton-containing compound having two or four ring structures may be further used.

(iii) In the case where the liquid crystal composition contains two or more 2,3-difluorobenzene-skeleton-containing compounds each having four ring structures, these compounds are preferably at least two compounds of which one or more compounds are selected, from each of at least two groups out of the group consisting of compounds represented by General Formula (III-1), the group consisting of compounds represented by General Formula (III-2), the group consisting of compounds represented by General Formula (III-3), and the group consisting of compounds represented by General Formula (III-4). In this case, a 2,3-difluorobenzene-skeleton-containing compound having two or three ring structures may be further used.

In each of General Formulae (I-1) and (I-2), (II-1) to (II-3), and (III-1) to (III-4), in the case where a 2,3-difluorobenzene-skeleton-containing compound contains only a single 2,3-difluorobenzene skeleton, compounds in which $A^{111}$ and $A^{112}$, $A^{121}$ to $A^{126}$, and $A^{131}$ to $A^{142}$ are 2,3-difluorobenzene skeletons are excluded. The 2,3-difluorobenzene skeleton is preferably a 2,3-difluoro-1,4-phenylene group.

In Formula (I-1), in the case where the molecular weight of the side chain $R^{111}$—$Z^{111}$ is the same as or larger than that of the side chain $Z^{113}$—$R^{112}$, the position of the 2,3-difluorobenzene skeleton is 1.

In Formula (I-2), in the case where the molecular weight of the side chain $R^{113}$—$Z^{114}$ is larger than that of the side chain $Z^{116}$—$R^{114}$, the position of the 2,3-difluorobenzene skeleton is 2.

In Formula (II-1), in the case where the molecular weight of the side chain $R^{121}$—$Z^{121}$ is the same as or larger than that of the side chain $Z^{124}$—$R^{122}$, the position of the 2,3-difluorobenzene skeleton is 1.

In Formula (II-2), in the case where the molecular weight of the side chain $R^{123}$—$Z^{125}$ is the same as or larger than that of the side chain $Z^{128}$—$R^{124}$, the position of the 2,3-difluorobenzene skeleton is 2.

In Formula (II-3), in the case where the molecular weight of the side chain $R^{125}$—$Z^{129}$ is larger than that of the side chain $Z^{132}$—$R^{124}$, the position of the 2,3-difluorobenzene skeleton is 3.

In Formula (III-1), in the case where the molecular weight of the side chain $R^{131}$—$Z^{133}$ is the same as or larger than that of the side chain $Z^{137}$—$R^{132}$, the position of the 2,3-difluorobenzene skeleton is 1.

In Formula (III-2), in the case where the molecular weight of the side chain $R^{133}$—$Z^{138}$, is the same as or larger than that of the side chain $Z^{142}$—$R^{134}$ the position of the 2,3-difluorobenzene skeleton is 2.

In Formula (III-3), in the case where the molecular weight of the side chain $R^{135}$—$Z^{143}$ is larger than that of the side chain $Z^{147}$—$R^{136}$, the position of the 2,3-difluorobenzene skeleton is 3.

In Formula (III-4), in the case where the molecular weight of the side chain $R^{137}$—$Z^{148}$ is larger than that of the side chain $Z^{152}$—$R^{138}$, the position of the 2,3-difluorobenzene skeleton is 4.

In the case where 2,3-difluorobenzene-skeleton-containing compounds each having three ring structures are used, the following combinations (ii-a) to (ii-c) are preferred. Even when a compound in which the position of the 2,3-difluorobenzene skeleton is 1 and a compound in which the position of the 2,3-difluorobenzene skeleton is 3 are considered to belong to the same compound group, a combination of different compound groups is provided. A 2,3-difluorobenzene-skeleton-containing compound having two or four ring-structures may be further used in each case.

(ii-a) (Position 1+Position 2 Mixture)
A mixture containing at least one compound in which the position of the 2,3-difluorobenzene skeleton is 1 and at least one compound in which the position of the 2,3-difluorobenzene skeleton is 2.

(ii-b) (Position 2+Position 3 Mixture)
A mixture containing at least one compound in which the position of the 2,3-difluorobenzene skeleton is 2 and at least one compound in which the position of the 2,3-difluorobenzene skeleton is 3.

(ii-c) (Position 1+Position 2+Position 3 Mixture)
A mixture containing at least one compound in which the position of the 2,3-difluorobenzene skeleton is 1, at least one compound in which the position of the 2,3-difluorobenzene skeleton is 2, and at least one compound in which the position of the 2,3-difluorobenzene skeleton is 3.

In the case where 2,3-difluorobenzene-skeleton-containing compounds each having four ring structures are used, the following combinations (iii-a) to (iii-i) are preferred. Even when a compound in which the position of the 2,3-difluorobenzene skeleton is 1 and a compound in which the position of the 2,3-difluorobenzene skeleton is 4 are considered to belong to the same compound group and when a compound in which the position of the 2,3-difluorobenzene skeleton is 2 and a compound in which the position of the 2,3-difluorobenzene skeleton is 3 are considered to belong to the same compound group, a combination of different compound groups is provided. A 2,3-difluorobenzene-skeleton-containing compound having two or three ring structures may be further used in each case.

(iii-a) (Position 1+Position 2 Mixture)
A mixture containing at least one compound in which the position of the 2,3-difluorobenzene skeleton is 1 and at least one compound in which the position of the 2,3-difluorobenzene skeleton is 2.

(iii-b) (Position 1+Position 3 Mixture)
A mixture containing at least one compound in which the position of the 2,3-difluorobenzene skeleton is 1 and at least one compound in which the position of the 2,3-difluorobenzene skeleton is 3.

(iii-c) (Position 2+Position 4 Mixture)
A mixture containing at least one compound in which the position of the 2,3-difluorobenzene skeleton is 2 and at least one compound in which the position of the 2,3-difluorobenzene skeleton is 4.

(iii-d) (Position 3+Position 4 Mixture)
A mixture containing at least one compound in which the position of the 2,3-difluorobenzene skeleton is 3 and at least one compound in which the position of the 2,3-difluorobenzene skeleton is 4.

(iii-e) (Position 1+Position 2+Position 3 Mixture)
A mixture containing at least one compound in which the position of the 2,3-difluorobenzene skeleton is 1, at least one compound in which the position of the 2,3-difluorobenzene skeleton is 2, and at least one compound in which the position of the 2,3-difluorobenzene skeleton is 3.

(iii-f) (Position 1+Position 2+Position 4 Mixture)
A mixture containing at least one compound in which the position of the 2,3-difluorobenzene skeleton is 1, at least one compound in which the position of the 2,3-difluorobenzene skeleton is 2, and at least one compound in which the position of the 2,3-difluorobenzene skeleton is 4.

(iii-g) (Position 1+Position 3+Position 4 Mixture)
A mixture containing at least one compound in which the position of the 2,3-difluorobenzene skeleton is 1, at least one compound in which the position of the 2,3-difluorobenzene skeleton is 3, and at least one compound in which the position of the 2,3-difluorobenzene skeleton is 4.

(iii-h) (Position 2+Position 3+Position 4 Mixture)
A mixture containing at least one compound in which the position of the 2,3-difluorobenzene skeleton is 2, at least one compound in which the position of the 2,3-difluorobenzene skeleton is 3, and at least one compound in which the position of the 2,3-difluorobenzene skeleton is 4.

(iii-i) (Position 1+Position 2+Position 3+Position 4 Mixture)
A mixture containing at least one compound in which the position of the 2,3-difluorobenzene skeleton is 1, at least one compound in which the position of the 2,3-difluorobenzene skeleton is 2, at least one compound in which the position of the 2,3-difluorobenzene skeleton is 3, and at least one compound in which the position of the 2,3-difluorobenzene skeleton is 4.

In 2,3-difluorobenzene-skeleton-containing compounds represented by General Formula (X), it is preferred that the ring structure adjoining a 2,3-difluoro-1,4-phenylene group (in the case where two ring structures adjoin the 2,3-difluoro-1,4-phenylene group, at least one of them) be a substituted or unsubstituted phenylene group or cyclohexylene group and that such an adjacent ring structure and 2,3-difluoro-1,4-phenylene group be bonded to each other via a single bond.

In particular, the 2,3-difluorobenzene-skeleton-containing compounds are preferably at least two compounds selected from the groups consisting of compounds represented by General Formulae (Ia) and (Ib), at least two compounds selected from the groups consisting of compounds represented by General Formulae (IIa) and (IIb), or at least two compounds selected from the groups consisting of compounds represented by General Formulae (IIIa) to (IIIc).

[Chem. 3]

(Ia)

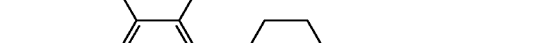

(Ib)

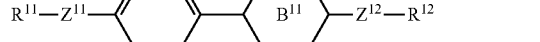

(IIa)

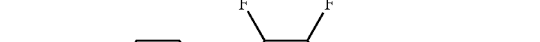

(IIb)

-continued

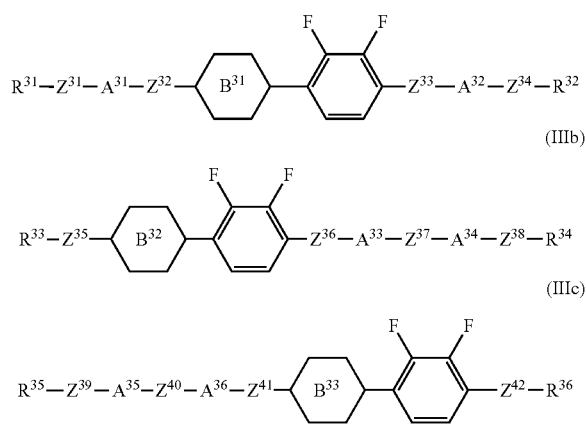

(IIIa)
(IIIb)
(IIIc)

(in the formulae $R^{11}$ to $R^{14}$, $R^{21}$ to $R^{24}$, and $R^{31}$ to $R^{36}$ each independently represent a linear or branched alkyl group having 1 to 18 carbon atoms, a hydrogen atom, or a fluorine atom; in the alkyl group, one —$CH_2$— group or two or more —$CH_2$— groups not adjoining each other are each optionally substituted with —O—, —S—, —CO—, —CO—O—, —O—CO—, —CO—S—, —S—CO—, —O—$SO_2$—, —$SO_2$—O—, —O—CO—O—, —CH=CH—, —C≡C—, a cyclopropylene group, or —Si($CH_3$)$_2$—; at least one hydrogen atom of the alkyl group is optionally substituted with a fluorine atom, a chlorine atom, a bromine atom, or a CN group;

$Z^{11}$ to $Z^{14}$, $Z^{21}$ to $Z^{26}$, and $Z^{31}$ to $Z^{42}$ each independently represent —O—, —S—, —CO—, —CO—O—, —O—CO—, —O—CO—O—, —CO—N($R^a$)—, —N($R^a$)—CO—, —$OCH_2$—, —$CH_2O$—, —$SCH_2$—, —$CH_2S$—, —O—$SO_2$—, —$SO_2$—O—, —$CF_2O$—, —$OCF_2$—, —$CF_2S$—, —$SCF_2$—, —$CH_2CH_2$—, —$CF_2CH_2$—, —$CH_2CF_2$—, —$CF_2CF_2$—, —CH=CH—, —CF=CH—, —CH=CF—, —CF=CF—, —C≡C—, —CH=CH—CO—O—, —O—CO—CH=CH—, or a single bond; $R^a$ of —CO—N($R^a$)— or —N($R^a$)—CO— represents a hydrogen atom or a linear or branched alkyl group having 1 to 4 carbon atoms;

$A^{21}$ and $A^{22}$ and $A^{31}$ to $A^{36}$ each independently represent a cyclic group selected from a phenylene group, a cyclohexylene group, a dioxolanediyl group, a cyclohexenylene group, a bicyclo[2.2.2]octylene group, a piperidinediyl group, a naphthalenediyl group, a decahydronaphthalenediyl group, a tetrahydronaphthalenediyl group, and an indanediyl group; in the phenylene group, the naphthalenediyl group, the tetrahydronaphthalenediyl group, and the indanediyl group, at least one —CH= group in each ring is optionally substituted with a nitrogen atom; in the cyclohexylene group, the dioxolanediyl group, the cyclohexenylene group, the bicycle[2.2.2]octylene group, the piperidinediyl group, the decahydronaphthalenediyl group, the tetrahydronaphthalenediyl group, and the indanediyl group, one —$CH_2$— group or two or more —$CH_2$— groups not adjoining each other in each ring are optionally substituted with —O— and/or —S—; at least one hydrogen atom of each cyclic group is optionally substituted with a fluorine atom, a chlorine atom, a bromine atom, a CN group, an $NO_2$ group, or an alkyl, alkoxy, alkylcarbonyl, or alkoxycarbonyl group which has 1 to 7 carbon atoms and of which one or more hydrogen atoms are each optionally substituted with a fluorine atom or a chlorine atom;

$B^{11}$ and $B^{12}$, $B^{21}$ and $B^{22}$, and $B^{31}$ to $B^{33}$ each independently represent a phenylene group or cyclohexylene group of which one hydrogen atom is optionally substituted with a fluorine atom.)

Crystallization of liquid crystal compositions is caused as follows: a decrease in temperature leads to enhancement in intermolecular interaction between liquid crystal molecules, and then thermal fluctuation of the molecules is decreased, which results in the crystallization. In particular, compounds having highly linear liquid crystal molecules, such as terphenyls, have a high crystallization temperature and a low compatibility. In order to decrease the crystallization temperature, it is preferred that thermal fluctuation of molecules be enhanced or that the steric hindrance of the molecules be enhanced to inhibit the linearity. From this viewpoint, a cyclohexane ring, an ethylene linking group, and a phenylene group of which a fluorine atom is introduced to a lateral position (e.g., a 2,3-difluoro-1,4-phenylene group, a 2-fluoro-1,4-phenylene group, or 3-fluoro-1,4-phenylene group) are preferably combined.

$B^{11}$ and $B^{12}$, $B^{21}$ and $B^{22}$, and $B^{31}$ to $B^{33}$ preferably each independently represent a phenylene group or cyclohexylene group of which one hydrogen atom is optionally substituted with a fluorine atom, and more preferably each independently the phenylene group.

$A^{21}$ and $A^{22}$ and $A^{31}$ to $A^{36}$ preferably each independently represent a phenylene group or cyclohexylene group of which one hydrogen atom is optionally substituted with a fluorine atom, and more preferably each independently the cyclohexylene group.

$Z^{22}$, $Z^{25}$, $Z^{32}$, $Z^{33}$, $Z^{36}$, and $Z^{41}$ preferably each independently represent —$CH_2CH_2$—, —$OCH_2$—, —$CH_2O$—, or a single bond.

Each of 2,3-difluorobenzene-skeleton-containing compounds represented by General Formulae (X), (I-1) and (I-2), (II-1) to (II-3), (III-1) to (III-4), (Ia) and (Ib), (IIa) and (IIb), and (IIIa) to (IIIc) exhibits large polarization in the direction of its short molecular axis and thus is likely to be a compound having a negative dielectric anisotropy Δ∈ with a large absolute value; hence, such a compound can be suitably used as a liquid crystal compound in a liquid crystal composition having a negative dielectric anisotropy and applied to, for instance, vertical, alignment display or IPS (in-plane switching) display.

The liquid crystal composition is preferably a nematic liquid crystal composition, or a smectic liquid crystal composition.

In the case where the liquid crystal composition is a smectic liquid crystal composition, phase sequence, phase transition temperature, spontaneous polarization, dielectric anisotropy, and refractive index anisotropy are adjusted on its use on the basis of the intended purpose; hence, the amount of the 2,3-difluorobenzene-skeleton-containing compounds in the composition is preferably in the range of 2% to 100%, preferably 5% to 95%, preferably 15% to 85%, and preferably 20% to 80%. In the case where the liquid crystal composition is a nematic liquid crystal composition, the amount of the 2,3-difluorobenzene-skeleton-containing compounds is adjusted on its use so that dielectric anisotropy, refractive index anisotropy, rotational viscosity γ1, elastic modulus, and another property are suitable for the intended LCD; hence, the amount thereof in the composition is preferably in the range of 2% to 98%, preferably 10% to 90%, preferably 20% to 80%, and preferably 40% to 80%.

<Liquid Crystal Compound>

The liquid crystal composition preferably contains, as a host liquid crystal compound, at least one compound selected from the group consisting of compounds represented by General formulae (LC1) to (LC4).

[Chem. 4]

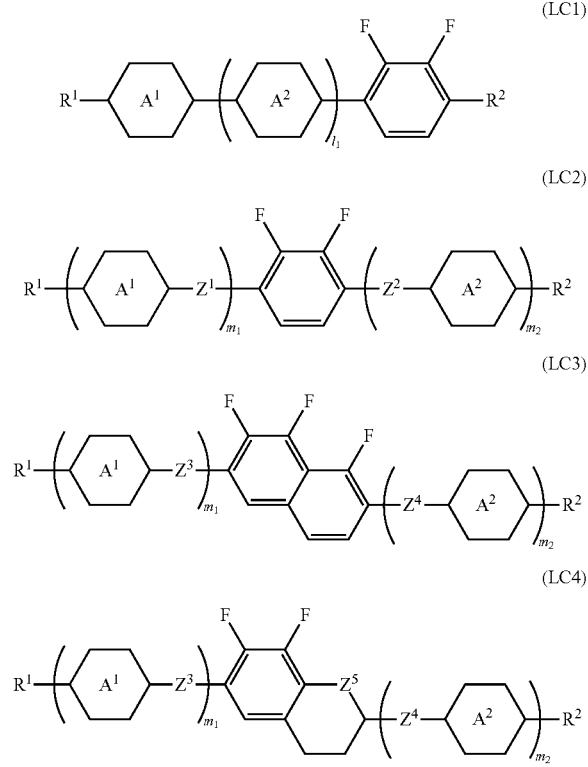

(in the formulae, $R^1$ and $R^2$ each independently represent an alkyl group having 1 to 18 carbon atoms; at least one $CH_2$ group in the alkyl group is optionally substituted with —O—, —CH=CH—, —CO—, —OCO—, —COO—, —C≡C—, —CF$_2$O—, or —OCF$_2$— such that oxygen atoms do not directly adjoin each other; at least one hydrogen atom of the alkyl group is optionally substituted with a halogen atom;

$A^1$ and $A^2$ each independently represent any of the following structures (a-1) to (a-5)

[Chem. 5]

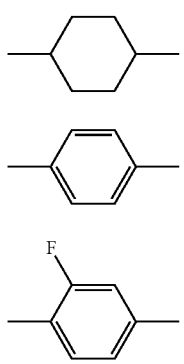

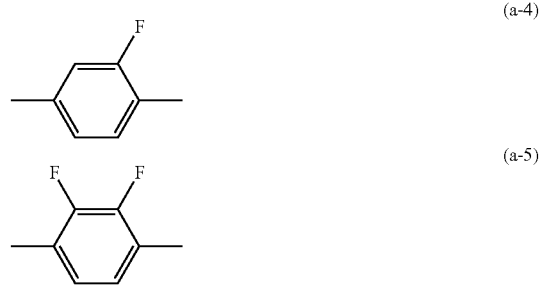

(one or more $CH_2$ groups in the cyclohexane ring in the structure (a-1) are optionally substituted with oxygen atoms; one or more CH groups in the benzene ring in each of the structures (a-2) to (a-5) are optionally substituted with nitrogen atoms; one or more hydrogen atoms of the structures (a-1) to (a-5) are optionally substituted with Cl, $CF_3$, or $OCF_3$);

$Z^1$ to $Z^4$ each independently represent a single bond, —CH=CH—, —C≡C—, —CH$_2$CH$_2$—, —(CH$_2$)$_4$—, —OCO—, —COO—, —OCH$_2$—, —CH$_2$O—, —OCF$_2$—, or —CF$_2$O—; $Z^5$ represents a $CH_2$ group or an oxygen atom; in the case where $m_1$ or $m_2$ in (LC2) is 0, at least one $Z^1$ or $Z^2$ that is present is not a single bond; $l_1$ represents 0 or 1; $m_1$ and $m_2$ each independently represent an integer from 0 to 3; and $m_1+m_2$ is 1, 2, or 3)

In General Formulae (LC1) to (LC4), $R^1$ and $R^2$ are preferably each independently a linear or branched alkyl group having 1 to 18 carbon atoms, a linear or branched alkoxy group having 1 to 18 carbon atoms, a linear or branched alkenyl group having 2 to 18 carbon atoms, or a linear or branched alkenyloxy group having 2 to 18 carbon atoms; in the case where the compounds are used in a nematic phase, any one of $R^1$ and $R^2$ is preferably each independently an alkyl group having 1 to 7 carbon atoms, an alkoxy group having 1 to 7 carbon atoms, an alkenyl group having 2 to 7 carbon atoms, or an alkenyloxy group having 2 to 7 carbon atoms. In the case where the compounds are used in a smectic phase, $R^1$ and $R^2$ are preferably each independently an alkyl group having 3 to 18 carbon atoms, an alkoxy group having 3 to 18 carbon atoms, an alkenyl group having 4 to 18 carbon atoms, or an alkenyloxy group having 4 to 18 carbon atoms.

$A^1$ and $A^2$ are preferably each independently any of the following structures.

[Chem. 6]

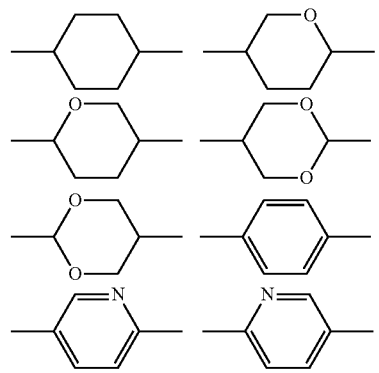

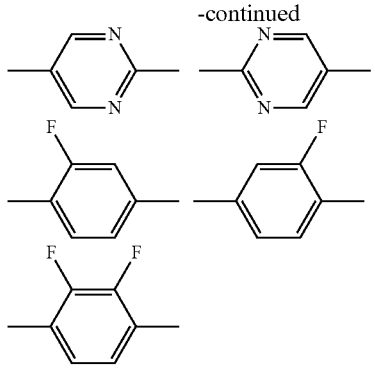

Is General Formulae (LC1) to (LC4), $Z^1$ to $Z^4$ are preferably each independently a single bond, —CH$_2$CH$_2$—, —OCO—, —COO—, —OCH$_2$—, —CH$_2$O—, —OCF$_2$—, or —CF$_2$O—. In order to avoid General Formula (LC2) from having the same structure as General Formula (LC1), in the case where m$_1$ or m$_2$ in General Formula (LC2) is 0, at least one $Z^1$ or $Z^2$ that is present is defined as being not a single bond. In particular, in the case of m$_1$>0 and m$_2$=0, at least one of $Z^1$ that is present in the number of m$_1$ is not a single bond; in the case of m$_1$=0 and m$_2$>0, at least one of $Z^2$ that is present in the number of m$_2$ is not a single bond.

In the case of m$_1$>0 and m$_2$>0 in General Formula (LC2), a compound in which at least one of $Z^1$ and $Z^2$ that are present in the number of m$_1$+m$_2$ is not a single bond may be used, or a compound in which all of $Z^1$ and $Z^2$ that are present in the number of m$_1$+m$_2$ are single bonds may be used.

Among the compounds represented by General Formulae (LC1) to (LC4), each of the compounds represented by General Formulae (LC1) and (LC2) corresponds to the above-mentioned 2,3-difluorobenzene-skeleton-containing compound. The liquid crystal composition of the present invention preferably contains at least two compounds each corresponding to a compound represented by General Formula (LC1) or (LC2), having a difference in the position of a 2,3-difluorobenzene skeleton, and having the same number of ring structures.

The liquid crystal composition preferably further contains at least one compound represented by General Formula (LC5).

[Chem. 7]

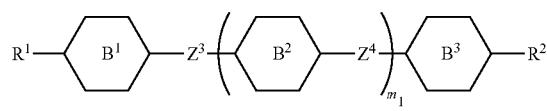

(LC5)

(in the formula, R$^1$ and R$^2$ each independently represent an alkyl group having 1 to 18 carbon atoms; in the alkyl group, at least one CH$_2$ group is optionally substituted with —O—, —CH=CH—, —CO—, —OCO—, —COO—, —C≡C—, —CF$_2$O—, or —OCF$_2$— such that oxygen atoms do not directly adjoin each other; at least one hydrogen atom of the alkyl group is optionally substituted with a halogen atom;

B$^1$ to B$^3$ each independently represent any of structures represented by Formulae (b-1) to (b-4);

[Chem. 8]

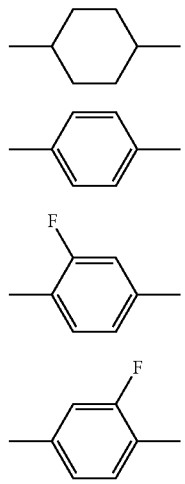

(b-1)

(b-2)

(b-3)

(b-4)

(in Formula (b-1), one or more CH$_2$CH$_2$ groups in the cyclohexane ring are optionally substituted with —CH=CH—, —CH$_2$O—, —OCH$_2$—, —CF$_2$O—, or —OCF$_2$—; in each of Formulae (b-2) to (b-4), one or more CH groups in the benzene ring are optionally substituted with nitrogen atoms);

$Z^3$ and $Z^4$ each independently represent a single bond, —CH=CH—, —C≡C—, —CH$_2$CH$_2$—, —(CH$_2$)$_4$—, —OCO—, —COO—, —OCH$_2$—, —CH$_2$O—, —OCF$_2$—, or —CF$_2$O—; and m$_1$ represents an integer from 0 to 3)

In General Formula (LC5), R$^1$ and R$^2$ are preferably each independently any of an alkyl group having 1 to 7 carbon atoms, an alkoxy group having 1 to 7 carbon atoms, and an alkenyl group having 2 to 7 carbon atoms, in the case where the compound is used in a smectic phase, R$^1$ and R$^2$ are preferably each independently an alkyl group having 3 to 18 carbon atoms, an alkoxy group having 3 to 18 carbon atoms, an alkenyl group having 4 to 18 carbon atoms, or an alkenyloxy group having 4 to 18 carbon atoms.

B$^1$ to B$^3$ are preferably each independently the following structure.

[Chem. 9]

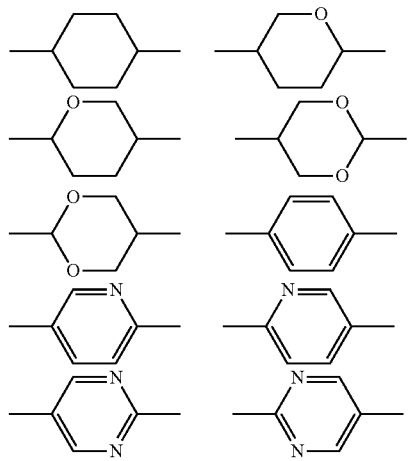

-continued

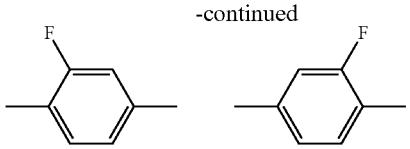

In General Formula (LC5), $Z^3$ and $Z^4$ are preferably each independently a single bond, —CH$_2$CH$_2$—, —OCO—, —COO—, —OCH$_2$—, —CH—O—, —OCF$_2$—, or —CF$_2$O—.

The compound represented by General Formula (LC1) is preferably at least one compound selected from the group consisting of compounds represented by General Formulae (LC1-1) to (LC1-7).

[Chem. 10]

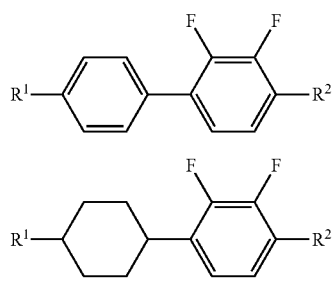 (LC1-1)

(LC1-2)

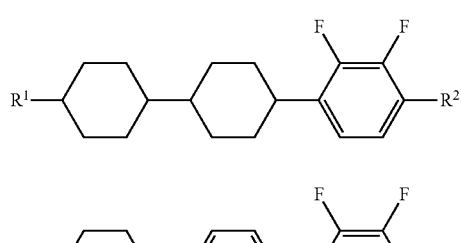 (LC1-3)

(LC1-4)

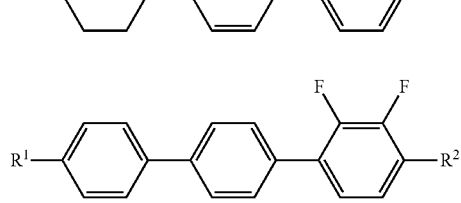 (LC1-5)

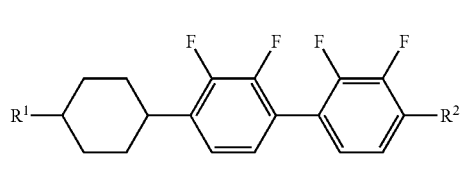 (LC1-6)

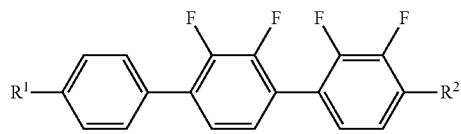 (LC1-7)

(in the formulae, $R^1$ and $R^2$ each independently represent an alkyl group having 1 to 18 carbon atoms, an alkoxy group having 1 to 18 carbon atoms, an alkenyl group having 2 to 18 carbon atoms, or an alkenyloxy group having 2 to 18 carbon atoms)

The compound represented by General Formula (LC2) is preferably at least one compound selected from the group consisting of compounds represented by General Formulae (LC2-1) to (LC2-20).

[Chem. 11]

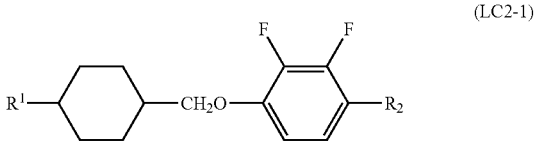 (LC2-1)

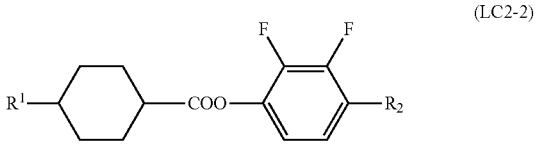 (LC2-2)

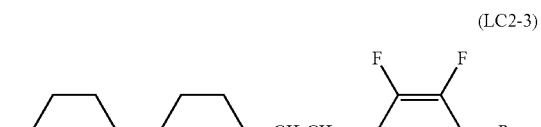 (LC2-3)

 (LC2-4)

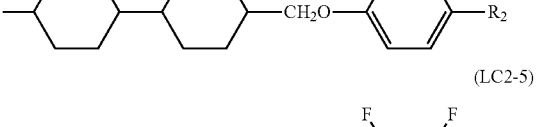 (LC2-5)

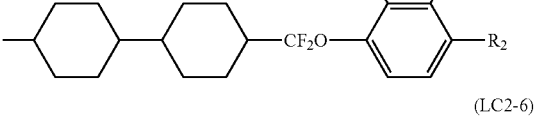 (LC2-6)

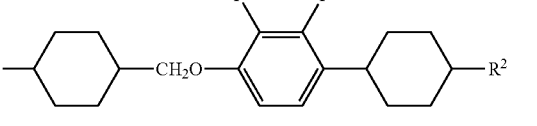 (LC2-7)

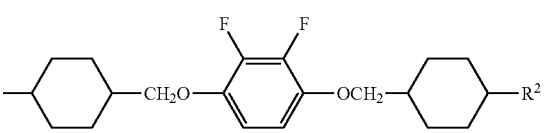 (LC2-8)

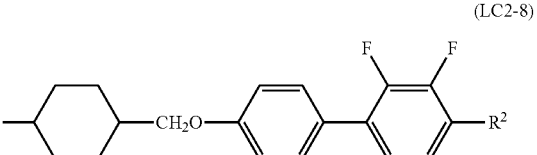 (LC2-9)

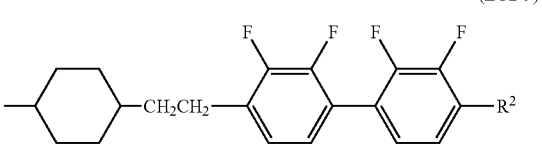

-continued (LC2-10)
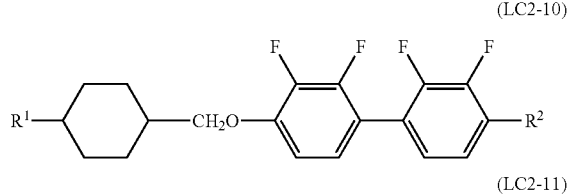

(LC2-11)
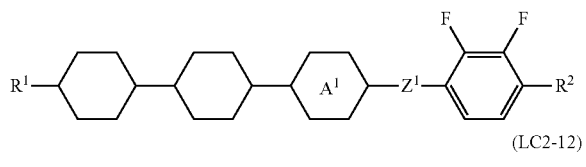

(LC2-12)
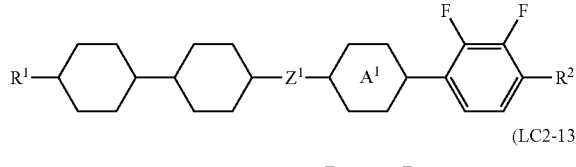

(LC2-13)
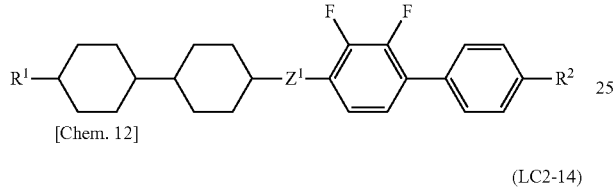

[Chem. 12]

(LC2-14)
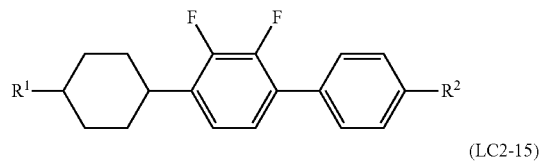

(LC2-15)
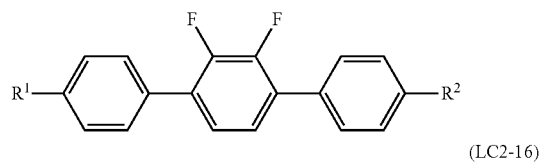

(LC2-16)
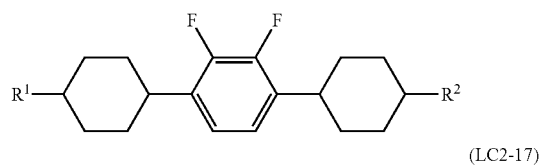

(LC2-17)
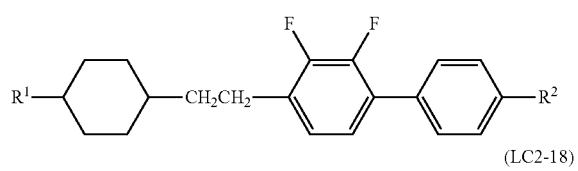

(LC2-18)
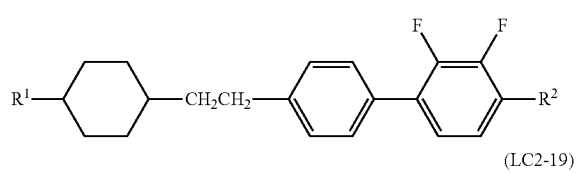

(LC2-19)
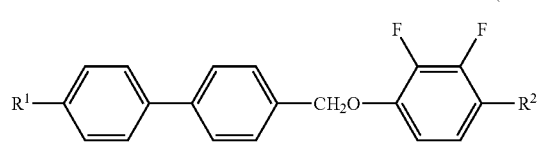

-continued (LC2-20)
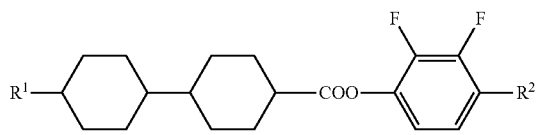

(in the formulae, $R^1$ and $R^2$ each independently represent an alkyl group having 1 to 18 carbon atoms, an alkoxy group having 1 to 18 carbon atoms, an alkenyl group having 2 to 18 carbon atoms, or an alkenyloxy group having 2 to 18 carbon atoms; $Z^1$ represents —$CH_2CH_2$—, —$OCH_2$—, —$CH_2O$—, —$OCF_2$—, or —$CF_2O$—; and $A^1$ represents

[Chem. 13]

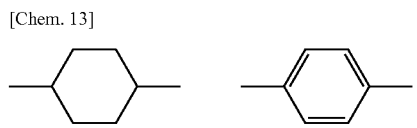

any of these structures)

The compound represented by General formula (LC3) is any of compounds represented by General Formulae (LC3-1) to (LC3-6)

[Chem. 14]

(LC3-1)
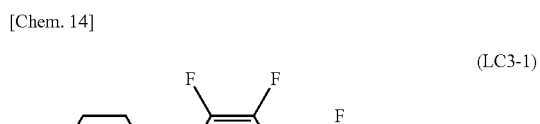

(LC3-2)
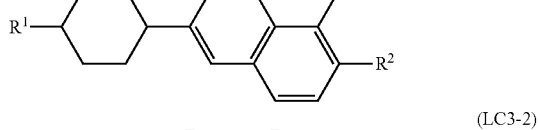

(LC3-3)

(LC3-4)
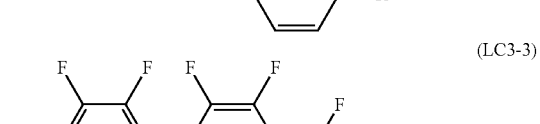

(LC3-5)
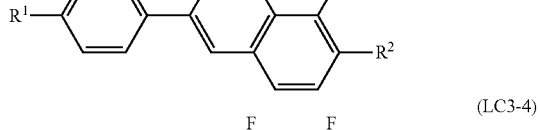

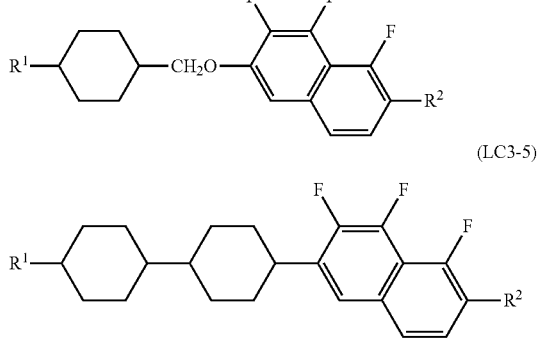

(LC3-6)

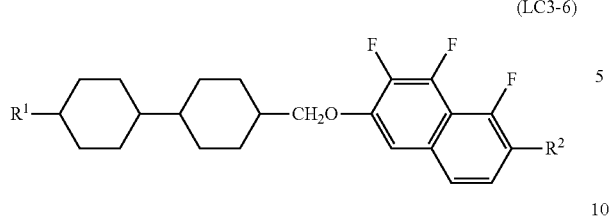

The compound represented by General formula (LC4) is preferably at least one compound selected, from the group consisting of compounds represented by General Formulae (LC4-1) to (LC4-4).

[Chem. 15]

(LC4-1)

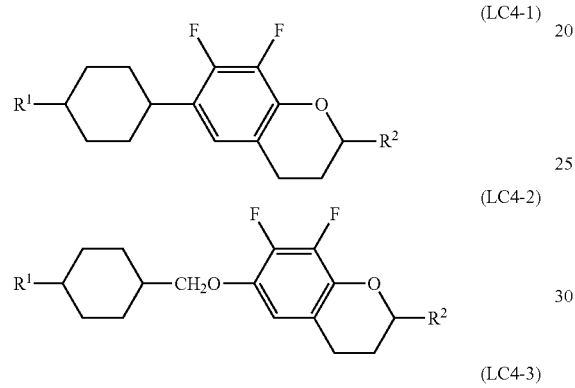

(LC4-2)

(LC4-3)

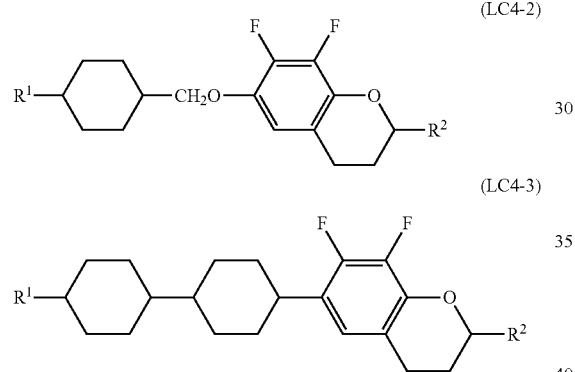

(LC4-4)

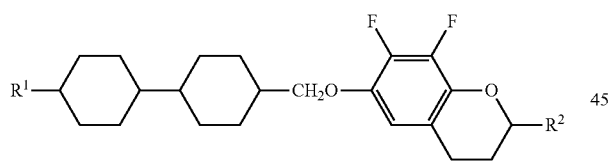

(in General Formulae (LC3-1) to (LC3-6) and (LC4-1) to (LC4-4), $R^1$ and $R^2$ each independently represent an alkyl group having 1 to 18 carbon atoms, an alkoxy group having 1 to 18 carbon atoms, an alkenyl group having 2 to 18 carbon atoms, or an alkenyloxy group having 2 to 18 carbon atoms)

The compound represented by General Formula (LC5) is preferably at least one compound selected from the group consisting of compounds represented by General Formulae (LC5-1) to (LC5-14).

[Chem. 16]

(LC5-1)

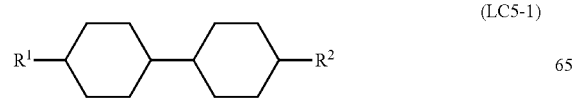

(LC5-2)

(LC5-3)

(LC5-4)

(LC5-5)

(LC5-6)

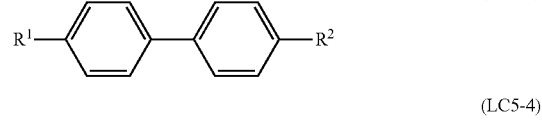

(LC5-7)

(LC5-8)

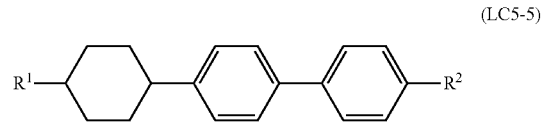

(LC5-9)

(LC5-10)

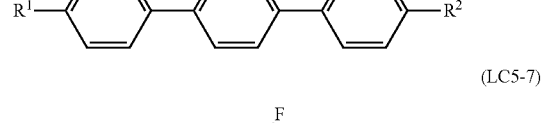

(LC5-11)

(LC5-12)

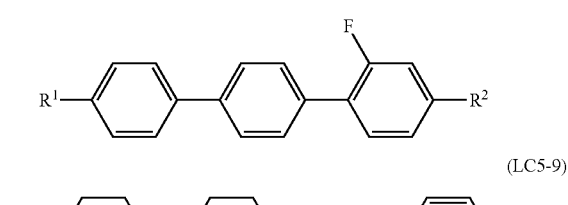

(LC5-13)

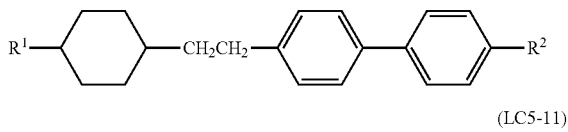

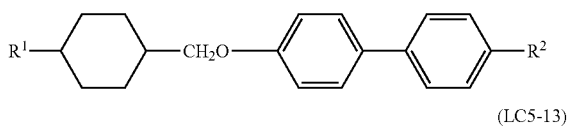

(LC5-14)

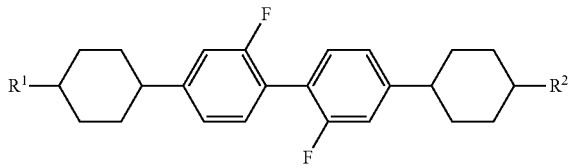

(in the formulae, $R^1$ and $R^2$ each independently represent an alkyl group having 1 to 18 carbon atoms, an alkoxy group having 1 to 18 carbon atoms, an alkenyl group having 2 to 18 carbon atoms, or an alkenyloxy group having 2 to 13 carbon atoms)

In General Formula (LC5), $R^1$ and $R^2$ are preferably each independently a linear or branched alkyl group having 1 to 18 carbon atoms, a linear or branched alkoxy group having 1 to 18 carbon atoms, a linear or branched alkenyl group having 2 to 18 carbon atoms, or a linear or branched alkenyloxy group having 2 to 18 carbon atoms; in the case where the compound is used in a nematic phase, any one of $R^1$ and $R^2$ is preferably each independently an alkyl group having 1 to 7 carbon atoms, an alkoxy group having 1 to 7 carbon atoms, an alkenyl group having 2 to 7 carbon atoms, or an alkenyloxy group having 2 to 7 carbon atoms. In the case where the compound is used in a smectic phase, $R^1$ and $R^2$ are preferably each independently an alkyl group having 3 to 18 carbon atoms, an alkoxy group having 3 to 18 carbon atoms, an alkenyl group having 4 to 18 carbon atoms, or an alkenyloxy group having 4 to 18 carbon atoms.

<Liquid Crystal Composition>

The liquid crystal composition used in the present invention can contain a chiral compound (dopant) in the host liquid crystal (liquid crystal matrix) and further arbitrarily contain a monomer (polymerizable compound) for polymer stabilization.

Use of such a liquid crystal composition can stabilize alignment and improve response speed in intermediate gradation. In order to fix a state of liquid crystal molecules aligned by, for example, an alignment film without the occurrence of defective alignment, at least phase transition from a nematic phase to a smectic phase by slow cooling is preferably carried out as in the case of non-use of the monomer; more preferably, the substrate surface of a liquid crystal cell to be used is flat. In addition, it is necessary to polymerize the monomer into a network shape or a dispersed state in a liquid crystal phase such as a nematic phase or a smectic phase. Furthermore, in order to prevent the formation of a phase separation structure, it is preferred that the amount of a monomer be reduced for adjustment of the amount and composition of a polymer precursor so that a network polymer is formed among liquid crystal molecules in a state in which the liquid crystal molecules are aligned. In photopolymerization, it is preferred that UV exposure time, UV exposure intensity, and temperature be adjusted for formation of a network polymer, thereby eliminating defective alignment of liquid crystal molecules.

<Chiral Compounds>

The chiral compound used in the liquid crystal composition of the present invention may be either a compound having an asymmetric atom, a compound having axial chirality, a compound having planar chirality, or an atropisomer and may optionally have a polymerizable group.

In the compound having an asymmetric atom, if the asymmetric atom is an asymmetric carbon atom, the asymmetric atom is less likely to cause stereoinversion and is therefore preferred. A hetero atom may be the asymmetric atom. The asymmetric atom may be introduced to a part of a chain structure or may be introduced to a part of a cyclic structure.

The liquid crystal composition preferably contains, as the compound having an asymmetry atom, any of optically active compounds represented by General Formula (IV).

[Chem. 17]

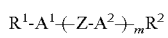  (IV)

(in Formula (IV), $R^1$ and $R^2$ each independently represent a linear or branched alkyl group having 1 to 30 carbon atoms, a hydrogen atom, or a fluorine atom in the alkyl group, one —$CH_2$— group or two or more —$CH_2$— groups not adjoining each other are each optionally substituted with —O—, —S—, —NH—, —($CH_3$)—, —CO—, —CO—O—, —O—CO—, —O—CO—O—, —S—CO—, —CO—S—, —O—$SO_2$—, —$SO_2$—O—, —CH=CH—, —C≡C—, a cyclopropylene group, or —Si($CH_3$)$_2$—; in the alkyl group, at least one hydrogen atom is optionally substituted with a fluorine atom, a chlorine atom, a bromine atom, or a CN group; the alkyl group optionally has a polymerizable group; the alkyl group optionally contains a fused or spiro ring system; the alkyl group optionally contains one or more aromatic or aliphatic rings which optionally contain one or more hetero atoms and which are each optionally substituted with an alkyl group, an alkoxy group, or a halogen atom;

any one or both of $R^1$ and $R^2$ are groups having asymmetric atoms;

Z each independently represents —O—, —S—, —CO—, —CO—O—, —O—CO—, —O—CO—O—, —CO—N($R^a$)—, —N($R^a$)—CO—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$CF_2CH_2$—, —$CH_2CF_2$—, —$CF_2CF_2$—, —CH=CH—, —CF=CH—, —CH=CF—, —CF=CF—, —C≡C—, —CH=CH—CO—O—, —O—CO—CH=CH—, or a single bond; $R^a$ of —CO—N($R^a$)— or —N($R^a$)—CO— represents a hydrogen atom or a linear or branched alkyl group having 1 to 4 carbon atoms; $A^1$ and $A^2$ each independently represent a cyclic group selected from a phenylene group, a cyclohexylene group, a dioxolanediyl group, a cyclohexenylene group, a bicycle [2.2.2]octylene group, a piperidinediyl group, a naphthalenediyl group, a decahydronaphthalenediyl group, a tetrahydronaphthalenediyl group, and an indanediyl group; in the phenylene group, the naphthalenediyl group, the tetrahydronaphthalenediyl group, and the indanediyl group, at least one —CH= group in each ring is optionally substituted with a nitrogen atom; in the cyclohexylene group, the dioxolanediyl group, the cyclohexenylene group, the bicycle [2.2.2]octylene group, the piperidinediyl group, the decahydronaphthalenediyl group, the tetrahydronaphthalenediyl group, and the indanediyl group, one —$CH_2$— group or two —$CH_2$— groups not adjoining each other in each ring are optionally substituted with —O— and/or —S—, at least one hydrogen atom of each cyclic group is optionally substituted with a fluorine atom, a chlorine atom, a bromine atom, a CN group, an $NO_2$ group, or an alkyl, alkoxy, alkylcarbonyl, or alkoxycarbonyl group which has 1 to 7 carbon atoms and of which one or more hydrogen atoms are each optionally substituted with a fluorine atom or a chlorine atom; and m is 1, 2, 3, 4, or 5)

The compound represented by General Formula (IV) is preferably a dichiral compound in which both $R^1$ and $R^2$ are chiral groups. Specific examples of the dichiral compound include compounds represented by General Formulae (IV-a1) to (IV-a11).

[Chem. 18]

(IV-a1)

(IV-a2)

(IV-a3)

(IV-a4)

(IV-a5)

[Chem. 19]

(IV-a6)

(IV-a7)

(IV-a8)

(IV-a9)

(IV-a10)

[Chem. 20]

(IV-a11)

In General Formulae (IV-a1) to (IV-a11), $R^3$ each independently represents a linear or branched alkyl group having 1 to 10 carbon atoms; in the alkyl group, one —$CH_2$— group or two or more —$CH_2$— groups not adjoining each other are optionally substituted with —O—, —S—, —NH—, —N($CH_3$)—, —CO—, —CO—O—, —O—CO—, —O—CO—O—, —S—CO—, —CO—S—, —O—$SO_2$—, —$SO_2$—O—, —CH=CH—, —C≡C—, a cyclopropylene group, or —Si($CH_3$)$_2$—; in the alkyl group, at least one hydrogen atom is optionally substituted with a fluorine atom, a chlorine atom, a bromine atom, or a CN group; and the alkyl group optionally has a polymerizable group. Examples of the polymerizable group include a vinyl, group, an allyl group, and a (meth)acryloyl group.

$X^3$ and $X^4$ are each preferably a halogen atom (F, Cl, Br, or I), a cyano group, a phenyl group (of which at least any one hydrogen atom is optionally substituted with a halogen atom (F, Cl, Br, or I), a methyl group, a methoxy group, —$CF_3$, or —$OCF_3$), a methyl, group, a methoxy group, —$CF_3$, or —$OCF_3$. In each of General Formulae (IV-a3) and (IV-a8), in order that the atoms at the positions indicated by the symbol * are asymmetric, the groups represented by $X^4$ and $X^3$ are different from each other.

$n_3$ is an integer from 0 to 20.

$R^5$ in each of General Formulae (IV-a4) and (IV-a9) is preferably a hydrogen atom or a methyl group.

Q in each of General Formulae (IV-a5) and (IV-a10) is a divalent hydrocarbon group such as a methylene group, an isopropylidene group, or a cyclohexylidene group.

k in General Formula (IV-a11) is an integer from 0 to 5.

In a preferred example, $R^3$ is a linear or branched alkyl group having 4 to 8 carbon atoms, such as $C_4H_9$, $C_6H_{13}$, or $C_8H_{17}$. $X^3$ is preferably $CH_3$.

-$A^1$-(Z-$A^2$)$_a$- which is part of each of the structures represented by General Formulae (IV) and (IV-a1) to (IV-a11) is preferably represented by Formula (IV-b).

[Chem. 21]

(IV-b)

(in the formula, rings A, B, and C are each independently a phenylene group, a cyclohexylene group, or a naphthalenediyl group; in such groups, at least any one hydrogen atom of a benzene ring is optionally substituted with a halogen atom (F, Cl, or Br), a methyl group, a methoxy group, —CF$_3$, or —OCF$_3$; and at least any one carbon atom of a benzene ring is optionally substituted with a nitrogen atom; and the definition of Z is the same as that in Formula (IV)) -A$^1$-(Z-A$^2$)$_m$- is more preferably represented by any of Formulae (IV-b1) to (IV-b6).

[Chem. 22]

(IV-b1)

(IV-b2)

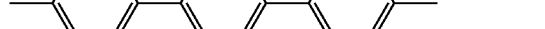
(IV-b3)

(IV-b4)

(IV-b5)

(IV-b6)

(in each of these formula, at least any one hydrogen atom of a benzene ring is optionally substituted with a halogen atom (F, Cl, or Br), a methyl group, a methoxy group, —CF$_3$, or —OCF$_3$; and at least any one carbon atom of a benzene ring is optionally substituted with a nitrogen atom; and the definition of Z is the same as that in Formula (IV))

In terms of expanding the temperature range of liquid crystal for a decrease in the melting point, a compound containing a heterocycle such as a pyridine ring or a pyrimidine ring is properly used; however, in such a case, the polarizability of the compound is relatively high. In the case where a hydrocarbon ring such as a benzene ring or a cyclohexane ring is employed, the polarizability of the compound is low. Accordingly, an appropriate amount is preferably selected on the basis of the polar inability of a chiral compound.

The chiral compound used in the liquid crystal composition of the present invention can be also a compound having axial chirality or an atropisomer.

In a compound in which the rotation of the bond axis is inhibited, such as the following allene derivative

[Chem. 23]

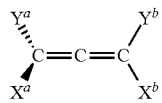

or the following biphenyl derivative,

[Chem. 24]

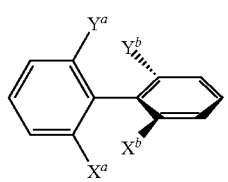

axial chirality is generated when substituents X$^a$ and Y$^a$ at one side of the axis are different from each other and when substituents X$^b$ and Y$^b$ at the other side of the axis are also different from each other. Compounds, such as biphenyl derivatives, in which the rotation of the bond axes is inhibited by an effect of, for example, steric hindrance are referred to as atropicisomers. These compounds do not induce spontaneous polarization but can be used as chiral dopants. In addition, such compounds can be used in combination with chiral compounds which induce spontaneous polarization.

Examples of the compounds used in the liquid crystal composition of the present invention and having an axial chirality include the following compounds.

[Chem. 25]

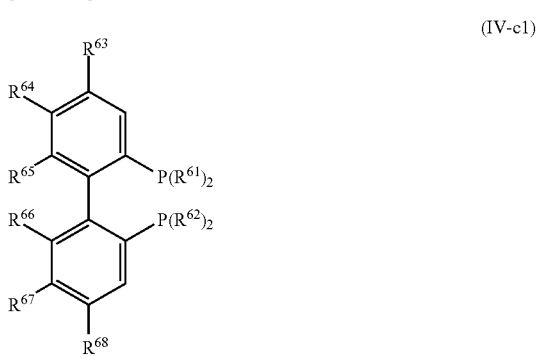
(IV-c1)

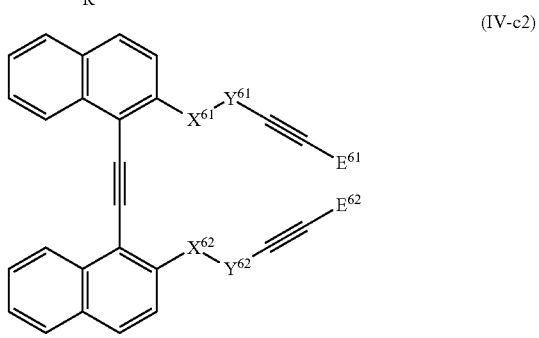
(IV-c2)

In (IV-c1) and (IV-c2), at least any one of X$^{61}$ and Y$^{61}$ and at least any one of X$^{62}$ and Y$^{62}$ are present; and X$^{61}$, X$^{62}$, Y$^{61}$, and Y$^{62}$ each independently represent CH$_2$, C=O, O, N, S, P, B, or Si. In the case where X$^{61}$, X$^{62}$, Y$^{61}$, and Y$^{62}$ are each N, P, B, or Si, they are optionally bonded to a substituent, such as an alkyl group, an alkoxy group, or an acyl group, so as to have a desired valence.

E$^{61}$ and E$^{62}$ each independently represent a hydrogen atom, an alkyl group, an aryl group, an allyl group, a benzyl group, an alkenyl group, an alkynyl group, an alkylether group, an alkyl ester group, an alkylketone group, a heterocyclic group, or derivatives thereof.

In Formula (IV-c1), $R^{61}$ and $R^{62}$ each independently represent a phenyl group, cyclopentyl group, or cyclohexyl group which is optionally substituted with an alkyl group, an alkoxyl group, or a halogen atom; $R^{63}$, $R^{64}$, $R^{65}$, $R^{66}$, $R^{67}$, and $R^{68}$ each independently represent a hydrogen atom, an alkyl group, an alkoxyl group, an acyloxy group, a halogen atom, a haloalkyl group, or a dialkylamino group;

any two of $R^{63}$, $R^{64}$, and $R^{65}$ optionally form a methylene chain optionally having a substituents or a mono- or polymethylenedioxy group optionally having a substituent; and any two of $R^{66}$, $R^{67}$, and $R^{68}$ optionally form a methylene chain optionally having a substituent or a mono- or polymethylenedioxy group optionally having a substituent. Compounds in which both $R^{65}$ and $R^{66}$ are hydrogen atoms are excluded.

The chiral compound used in the liquid crystal composition of the present invention can be a compound having a planar chirality.

Examples of the compound having a planar chirality include helicene derivatives represented by Formula (IV-c3).

[Chem. 26]

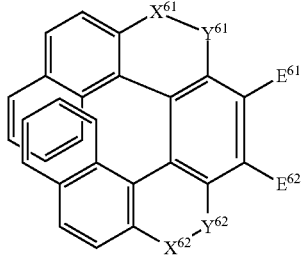

(IV-c3)

(in the formula, at least any one of $X^{61}$ and $Y^{61}$ and at least any one of $X^{62}$ and $Y^{62}$ are present; $X^{61}$, $X^{62}$, $Y^{61}$, and $Y^{62}$ each independently represent $CH_2$, C=O, O, N, S, P, B, or Si; in the case where $X^{61}$, $X^{62}$, $Y^{61}$, and $Y^{62}$ are each N, P, B, or Si, they are optionally bonded to a substituent, such as an alkyl group, an alkoxy group, or an acyl group, so as to have a desired valence; and $E^{61}$ and $E^{62}$ each independently represent a hydrogen atom, an alkyl group, an aryl group, an allyl group, a benzyl group, an alkenyl group, an alkynyl group, an alkylether group, an alkyl ester group, an alkylketone group, an heterocyclic group, or derivatives thereof)

In such helicene derivatives, since the overlapping rings cannot freely change the positional relationship, a right-handed helical structure of rings and a left-handed helical structure of rings are distinguished from each other, which generates chirality.

A chiral compound used in the liquid crystal composition is preferably a compound having a large helical twisting power which enables small pitch of the helical structure. The necessary amount of the compound having a large helical twisting power for obtaining a predetermined pitch can be small; hence, an increase in a driving voltage can be suppressed, and such a compound is therefore preferred. From this point of view, examples of a preferred chiral compound include compounds (IV-d1) to (IV-d3) having asymmetric atoms

[Chem. 27]

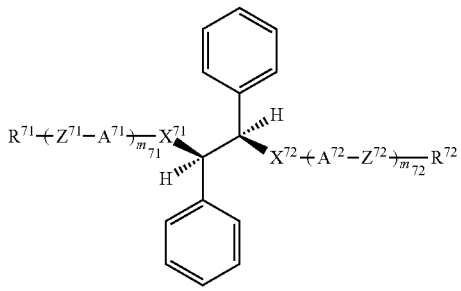

(IV-d1)

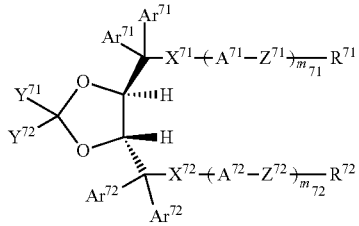

(IV-d2)

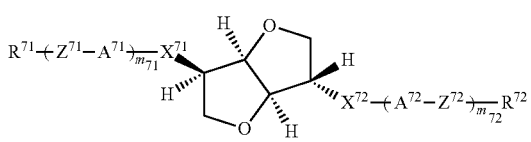

(IV-d3)

and compounds (IV-d4) to (IV-d5) having axial chirality.

[Chem. 28]

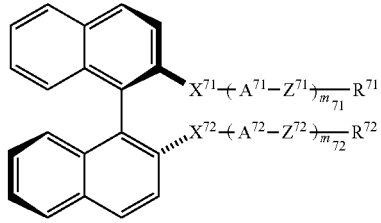

(IV-d4)

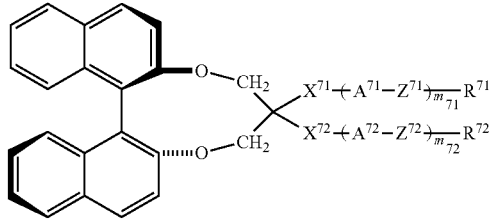

(IV-d5)

In Formulae (IV-d1) to (IV-d5), $R^{71}$ and $R^{72}$ each independently represent a hydrogen atom, a halogen, atom, a cyano (CN) group, an isocyanate (NCO) group, an isothiocyanate (NCS) group, or an alkyl group having 1 to 20 carbon atoms; in the alkyl group, at least any one —$CH_2$— group is optionally substituted with —O—, —S—, —COO—, —OCO—, —CH=CH—, —CF=CF—, or —C≡C—; any hydrogen atom of the alkyl group is optionally substituted with a halogen atom;

$A^{71}$ and $A^{72}$ each independently represent an aromatic or non-aromatic 3- to 8-membered ring or a fused ring having 9 or more carbon atoms, in which arbitrary hydrogen atoms of these rings are each optionally substituted with a halogen atom or an alkyl or haloalkyl group having 1 to 3 carbon atoms, in which one or more —$CH_2$— groups of each ring are each optionally substituted with —O—, —S—, or —NH— and in which one or more —CH═ groups of each ring are each optionally substituted with —N═;

$Z^{71}$ and $Z^{72}$ each independently represent a single bond or an alkylene group having 1 to 8 carbon atoms; any —$CH_2$— group is optionally substituted with —O—, —S—, —COO—, —OCO—, —CSO—, —OCS—, —N═N—, —CH═N—, —N═CH—, —N(O)═N—, —N═N(O)—, —CH═CH—, —CF═CF—, or —C≡C—; any hydrogen atom is optionally substituted with a halogen atom;

$X^{71}$ and $X^{72}$ each independently represent a single bond, —COO—, —OCO—, —$CH_2O$—, —$OCH_2$—, —$CF_2O$—, —$OCF_2$—, or —$CH_2CH_2$—; $m_{71}$ and $m_{72}$ each independently represent an integer form 1 to 4; and in Formula (IV-d5), any one of $m_{71}$ and $m_{72}$ is optionally 0.

In Formula (IV-d2), $Ar^{71}$ and $Ar^{72}$ each independently represent a phenyl group or a naphthyl group; in each of these groups, at least any one hydrogen atom of the benzene ring is optionally substituted with a halogen atom (F, Cl, Br, or I), a methyl group, a methoxy group, —$CF_3$, or —$OCF_3$.

In the liquid crystal composition of the present invention, a chiral compound having a mesogen can be also used. Examples of such a chiral compound include the following compounds.

[Chem. 29]

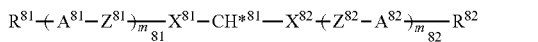
(IV-e1)

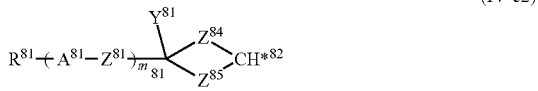
(IV-e2)

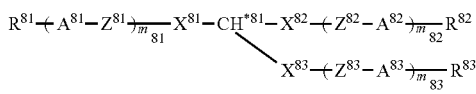
(IV-e3)

In Formulae (IV-e1) to (IV-e3), $R^{81}$, $R^{82}$, $R^{83}$, and $Y^{81}$ each independently represent a linear or branched alkyl group having 1 to 30 carbon atoms, a hydrogen atom, or a fluorine atom in the alkyl group, one —$CH_2$— group or two or more —$CH_2$— groups not adjoining each other are each optionally substituted with —O—, —S—, —NH—, —N($CH_3$)—, —CO—, —CO—O—, —O—CO—, —O—CO—O—, —S—CO—, —CO—S—, —O—$SO_2$—, —$SO_2$—O—, —CH═CH—, —C≡C—, a cyclopropylene group, or —Si($CH_3$)$_2$—; in the alkyl group, at least one hydrogen atom is optionally substituted with a fluorine atom, a chlorine atom, a bromine atom, or a CN group; the alkyl group optionally has a polymerizable group; the alkyl group optionally contains a fused or spiro ring system; the alkyl group optionally contains one or more aromatic or aliphatic rings which optionally contain one or more hetero atoms and which axe each optionally substituted with an alkyl group, an alkoxy group, or a halogen atom;

$Z^{81}$, $Z^{82}$, $Z^{83}$, $Z^{84}$, and $Z^{85}$ each independently represent an alkylene group having 1 to 40 carbon atoms; in the alkyl group, one or more $CH_2$ groups are optionally substituted with —O—, —S—, —NH—, —N($CH_3$)—, —CO—, —COO—, —OCO—, —OCOO—, —S—CO—, —CO—S—, —CH═CH—, —CH═CF—, —CF═CH—, —CF═CF—, —$CF_2$—, or —C≡C—;

$Z^{81}$, $X^{82}$, and $X^{83}$ each independently represent —O—, —S—, —CO—, —COO—, —OCO—, —OCOO—, —CO—NH—, —NH—CO—, —$CH_2CH_2$—, —$OCH_2$—, —$CH_2O$—, —$SCH_2$—, —$CH_2S$—, —CF═CF—, —CH═CH—, —OCO—CH═CH—, —C≡C—, or a single bond;

$A^{81}$, $A^{82}$, and $A^{83}$ each independently represent a cyclic group selected from a phenylene group, a cyclohexylene group, a dioxolanediyl group, a cyclohexenylene group, a bicyclo[2.2.2]octylene group, a piperidinediyl group, a naphthalenediyl group, a decahydronaphthalenediyl group, a tetrahydronaphthalenediyl group, and an indanediyl group; in the phenylene group, the naphthalenediyl group, the tetrahydronaphthalenediyl group, and the indanediyl group, at least one —CH═ group in each ring is optionally substituted with a nitrogen atom; in the cyclohexylene group, the dioxolanediyl group, the cyclohexenylene group, the bicyclo[2.2.2]octylene group, the piperidinediyl group, the decahydronaphthalenediyl group, the tetrahydronaphthalenediyl group, and the indanediyl group, one —$CH_2$— group or two —$CH_2$— groups not adjoining each other in each ring are optionally substituted with —O— and/or —S—; at least one hydrogen atom of each cyclic group is optionally substituted with a fluorine atom, a chlorine atom, a bromine atom, a CN group, an $NO_2$ group, or an alkyl, alkoxy, alkylcarbonyl, or alkoxycarbonyl group which has 1 to 7 carbon atoms and of which one or more hydrogen atoms are each optionally substituted with a fluorine atom or a chlorine atom;

$m_{81}$, and $m_{82}$, and $m_{83}$ are each 0 or 1; $m_{81}+m_{82}+m_{83}$ is 1, 2, or 3;

$CH^{+81}$ and $CH^{+82}$ each independently represent a chiral divalent group; and $CH^{+83}$ represents a chiral trivalent group.

The chiral divalent group which each of $CH^{+81}$ and $CH^{+82}$ represents is preferably any of the following divalent groups having asymmetric atoms

[Chem. 30]

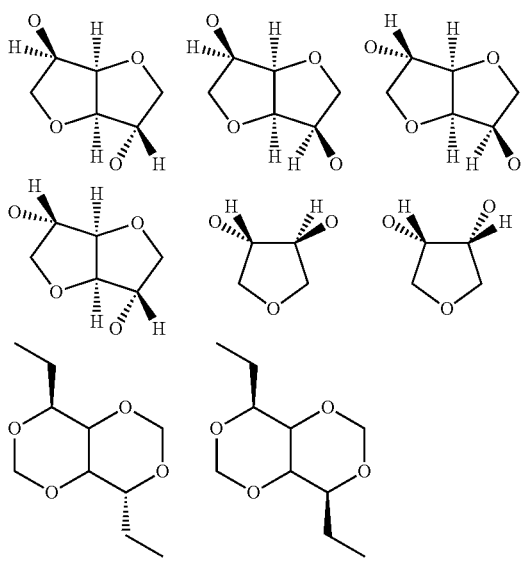

-continued

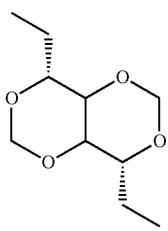

[Chem. 31]

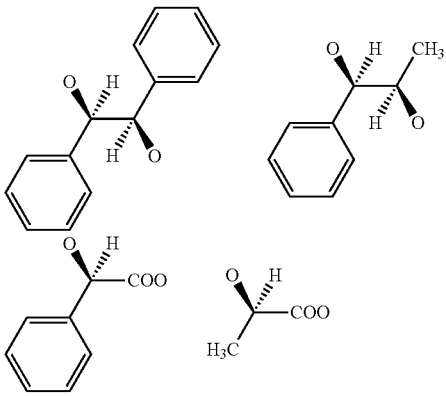

or the following divalent group having axial chirality.

[Chem. 32]

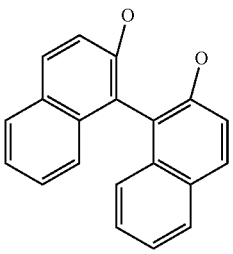

In each of these divalent groups which CH$^{+81}$ and CH$^{+82}$ represent, at least any one hydrogen atom of a benzene ring is optionally substituted with a halogen atom (F, Cl, Br, or I), a methyl group, a methoxy group, —CF$_3$, or —OCF$_3$; and at least any one carbon atom of a benzene ring is optionally substituted with a nitrogen atom.

The chiral trivalent group which CH$^{+83}$ represents may be any trivalent group formed by bonding of —X$^{83}$(Z$^{83}$A$^{83}$)$_{m_{83}}$R$^{83}$ to any position of the chiral divalent group which each of CH$^{+81}$ and CH$^{+82}$ represents.

The following compound having an isosorbide skeleton as the chiral divalent group is preferred.

[Chem. 33]

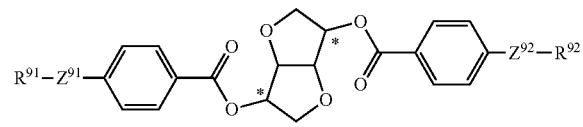

In the formula, R$^{91}$ and R$^{92}$ each independently represent a linear or branched alkyl group having 1 to 30 carbon atoms, a hydrogen atom, or a fluorine atom; in the alkyl group, one —CH$_2$— group or two or more —CH$_2$— groups not adjoining each other are each optionally substituted with —O—, —S—, —NH—, —N(CH$_3$)—, —CO—, —CO—O—, —O—CO—, —O—CO—O—, —S—CO—, —CO—S—, —O—SO$_2$—, —SO$_2$—O—, —CH=CH—, —C≡C—, a cyclopropylene group, or —Si(CH$_3$)$_2$—; in the alkyl group, at least one hydrogen atom is optionally substituted with a fluorine atom, a chlorine atom, a bromine atom, or a CN group; the alkyl group optionally has a polymerizable group; the alkyl group optionally contains a fused or spiro ring system; the alkyl group optionally contains one or more aromatic or aliphatic rings which optionally contain one or more hetero atoms and which are each optionally substituted with an alkyl group, an alkoxy group, or a halogen atom;

Z$^{91}$ and Z$^{92}$ each independently represent —O—, —S—, —CO—, —CO—O—, —O—CO—, —O—CO—O—, —CO—N(R$^a$)—, —N(R$^a$)—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=CH—, —CF=CH—, —CH=CF—, —CF=CF—, —C≡C—, —CH=CH—CO—O—, —O—CO—CH=CH—, or a single bond; and R$^a$ of —CO—N(R$^a$)— or —N(R$^a$)—CO— represents a hydrogen atom or a linear or branched alkyl group having 1 to 4 carbon atoms.

<Ferroelectric Liquid Crystal Compositions>

In the liquid crystal composition used in the present invention, a chiral compound (dopant) can be added to the host liquid crystal, and the pitch in a chiral nematic phase and the pitch in the chiral smectic C phase are adjusted on its use on the basis of the display mode of a liquid crystal device to which the liquid crystal composition is applied.

In the case where a homogeneous alignment is employed in a display mode, the pitch in a chiral nematic phase is preferably long as much as possible; for this purpose, it is preferred that the pitch be elongated through cancellation of the pitch by the combined use of chiral compounds having different chiral pitches as a pitch canceller which is an additive for cancelling a pitch. In such a case, it is preferred to select chiral compounds having the same sign to avoid cancellation of the spontaneous polarization; or it is preferred to use chiral compounds having high spontaneous polarization and low spontaneous polarization in combination to obtain sufficient spontaneous polarization as a whole, even if the signs of the spontaneous polarization are different from each other. Alternatively, it is also preferred to select a chiral compound that can exhibit sufficiently high molecular alignment even if such cancellation of the pitch is not performed.

In the case where a homeotropic alignment is employed in a display mode, the pitch in a chiral nematic phase is preferably at least larger than a cell thickness, and such a pitch is preferably substantially unwound when the phase shifts to another lower liquid crystal phase. In order to unwind the pitch, it is preferred that the temperature range of the chiral nematic phase be adjusted to be 10° C. or more, thereby unwinding the helix through a temperature change in the chiral nematic phase; and it is also preferred that the helix be unwound with the aid of a pitch canceller. In the chiral smectic C phase, it is preferred that the helical pitch be shortened for a selective reflection wavelength induced by the helix to be less than or equal to ultraviolet or greater than or equal to near infrared light, thereby preventing transmission of light in a visible light range.

<Polymerizable Compound>

The liquid crystal composition of the present invention may contain a polymerizable compound, which makes the liquid crystal composition be a polymer-stabilized liquid crystal composition.

<Polymerizable Compound (V)>

A polymerizable compound (V) used in the liquid crystal composition of the present invention is preferably any of polymerizable compounds represented by General Formula (V-a).

[Chem. 34]

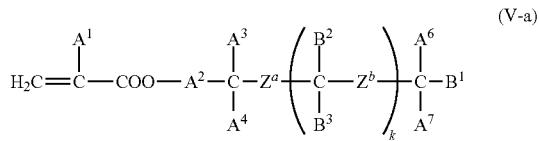

(V-a)

(in Formula (V-a),
$A^1$ represents a hydrogen atom or a methyl group;
$A^2$ represents a single bond or an alkylene group having 1 to 15 carbon atoms (one or more methylene groups in the alkylene group are each independently optionally substituted with an oxygen atom, —CO—, —COO—, or —OCO— such that oxygen, atoms are not directly bonded to each other; and one or more hydrogen atoms in the alkylene group are each independently optionally substituted, with a fluorine atom, a methyl group, or an ethyl group);
$A^3$ and $A^6$ each independently represent a hydrogen atom or an alkyl group having 1 to 18 carbon atoms (one or more methylene groups in the alkyl group are each independently optionally substituted with an oxygen atom, —CO—, —COO—, or —OCO— such that oxygen atoms are not directly bonded to each other; and one or more hydrogen atoms in the alkyl group are each independently optionally substituted with a halogen atom or an alkyl group having 1 to 17 carbon atoms);
$A^4$ and $A^7$ each independently represent a hydrogen atom or an alkyl group having 1 to 10 carbon atoms (one or more methylene groups in the alkyl group are each independently optionally substituted with an oxygen atom, —CO—, —COO—, or —OCO— such that oxygen atoms are not directly bonded to each other; and one or more hydrogen atoms in the alkyl group are each independently optionally substituted with a halogen atom or an alkyl group having 1 to 9 carbon atoms);
k represents 1 to 40;
$Z^a$ and $Z^b$ each independently represent a single bond, —CO—, —COO—, or —OCO—; $B^1$, $B^2$, and $B^3$ each independently represent a hydrogen atom or a linear or branched alkyl group having 1 to 10 carbon atoms (one or more methylene groups in the alkyl group are each independently optionally substituted with an oxygen atom, —CO—, —COO—, or —OCO— such that oxygen atoms are not directly bonded to each other), or a structure represented by General Formula (V-b)

[Chem. 35]

(V-b)

(in Formula (V-b), $A^9$ represents a hydrogen atom or a methyl group;

$A^8$ represents a single bond or an alkylene group having 1 to 15 carbon atoms (one or more methylene groups in the alkylene group are each independently optionally substituted with an oxygen atom, —CO—, —COO—, or —OCO— such that oxygen atoms are not directly bonded to each other; and one or more hydrogen atoms in the alkylene group are each independently optionally substituted with a fluorine atom, a methyl group, or an ethyl group); and among $B^1$, $B^2$, and $B^3$ which are present in the total number of 2k+1, the number of the structures represented by General Formula (V-b) is in the range of 0 to 3) The glass transition temperature of the polymer of such a polymerizable compound is preferably in the range of −100° C. to 25° C.

In the present invention, the term "alkylene group" refers to a divalent group "—$(CH_2)_n$—" (n is an integer of 1 or more) formed by extracting one hydrogen atom from each of the oxygen atoms at the two terminals of a linear aliphatic hydrocarbon, unless otherwise specified. In the case where the hydrogen atom is substituted with a halogen atom or an alkyl group or where a methylene group is substituted with an oxygen atom, —CO—, —COO—, or —OCO—, such substitution is specified. The term "alkylene chain length" refers to n in the general formula "—$(CH_2)_n$—" of "alkylene group".

The non-liquid crystal monomer (V) may be a combination of compounds represented by General Formula (V-a) in which there are differences in the length of the main chain and in the length of the alkyl side chain.

A preferred polymerizable compound (V) represented by General Formula (V-a) is at least one compound selected from the group consisting of compounds represented by General Formulae (V-c), (V-d), (V-e), and (V-f).

[Chem. 36]

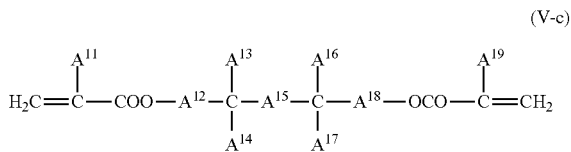

(V-c)

(in Formula (V-c), $A^{11}$ and $A^{19}$ each independently represent a hydrogen atom or a methyl group; $A^{12}$ and $A^{18}$ each independently represent a single bond or an alkylene group having 1 to 15 carbon atoms (one or more methylene groups in the alkylene group are each independently optionally substituted with an oxygen atom, —CO—, —COO—, or —OCO— such that oxygen atoms are not directly bonded to each other; and one or more hydrogen atoms in the alkylene group are each independently optionally substituted with a fluorine atom, a methyl group, or an ethyl group);
$A^{13}$ and $A^{16}$ each independently represent a linear alkyl group having 2 to 20 carbon atoms (one or more methylene groups in the linear alkyl group are each independently optionally substituted with an oxygen atom, —CO—, —COO—, or —OCO— such that oxygen atoms are not directly bonded to each other);
$A^{14}$ and $A^{17}$ each independently represent a hydrogen atom or an alkyl group having 1 to 10 carbon atoms (one or more methylene groups in the alkyl group are each independently optionally substituted with an oxygen atom, —CO—, —COO—, or —OCO— such that oxygen atoms are not directly bonded to each other; and one or more hydrogen atoms in the alkyl group are each independently optionally substituted with a halogen atom or an alkyl group having 1 to 9 carbon atoms); and $A^{15}$ represents an alkylene group having 9 to 16 carbon atoms (in at least one to five methylene groups in the alkylene group, one hydrogen atom of each methylene group is independently substituted with a linear or branched alkyl group having 1 to 10 carbon atoms; and one or more methylene groups in the alkylene group are each independently optionally substituted with an oxygen atom, —CO—, —COO—, or —OCO— such that oxygen atoms are not directly bonded to each other)

[Chem. 37]

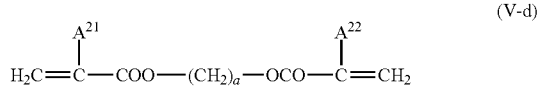

(V-d)

(in Formula (V-d), $A^{21}$ and $A^{22}$ each independently represent a hydrogen atom or a methyl group, and a represents an integer from 6 to 22)

[Chem. 38]

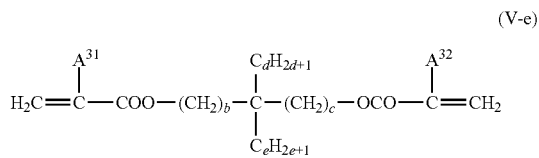

(V-e)

(in Formula (V-e), $A^{31}$ and $A^{32}$ each independently represent a hydrogen atom or a methyl group, b and c each independently represent an integer from 1 to 10, d represents an integer from 1 to 10, and e represents an integer from 0 to 6)

[Chem. 39]

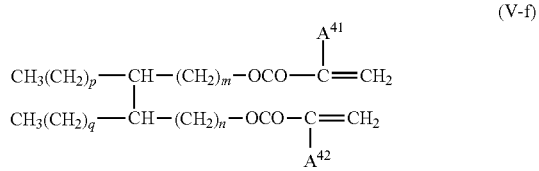

(V-f)

(in Formula (V-f), $A^{41}$ and $A^{42}$ each independently represent a hydrogen atom or a methyl group; and m, n, p, and q each independently represent an integer from 1 to 10) Among these compounds, a compound represented by Formula (V-c) is preferably employed.

In a preferred structure of the polymerizable compound represented by General Formula (V-c), $A^{11}$ and $A^{19}$ are each a hydrogen atom. The effects of the present invention can be provided even by use of a compound in which the substituents $A^{11}$ and $A^{19}$ are each a methyl group; however, the compound in which $A^{11}$ and $A^{19}$ are each a hydrogen atom enables an increase in a polymerization rate and thus is beneficial.

$A^{12}$ and $A^{16}$ are preferably each independently a single bond or an alkylene group having 1 to 3 carbon atoms. The distance between the two polymerizable functional groups can be adjusted by an independent change in the carbon chain length of each of $A^{12}$, $A^{18}$, and $A^{15}$. The compound represented by General Formula (V-c) is characterized in that the distance between polymerizable functional groups (distance between crosslinking points) is long; however, an excessive distance therebetween makes the polymerization rate extremely slow and results in an adverse effect on phase separation, and the distance between polymerizable functional groups therefore has an upper limit. The distance between two side chains $A^{13}$ and $A^{16}$ has an effect on the mobility of the main chain. In particular, a small distance between, the side chains $A^{13}$ and $A^{16}$ causes the interference between $A^{13}$ and $A^{16}$, which results in a reduction in the mobility. Accordingly, the distance between polymerizable functional, groups in the compound represented by General Formula (V-c) is determined by the sum total of the lengths of $A^{12}$, $A^{18}$, and $A^{15}$; and it is preferred that the length of $A^{15}$ be increased rather than those of $A^{12}$ and $A^{18}$.

The lengths of the side chains $A^{13}$, $A^{14}$, $A^{16}$, and $A^{17}$ are preferably as follows.

In General Formula (V-c), $A^{13}$ and $A^{14}$ are bonded to the same carbon atom in the main chain; in the case where they have different lengths, the side chain having a longer length is referred to as $A^{13}$ (if $A^{13}$ and $A^{14}$ have the same length, any one of them can be referred to as $A^{13}$). Similarly, in the case where $A^{16}$ and $A^{17}$ have different lengths, the side chain having a longer length is referred to as $A^{16}$ (if $A^{16}$ and $A^{17}$ have the same length, any one of them can be referred to as $A^{16}$).

Such $A^{13}$ and $A^{16}$ are each independently a linear alkyl group having 2 to 20 carbon atoms in the present invention (one or more methylene groups in the linear alkyl group are each independently optionally substituted with an oxygen atom, —CO—, —COO—, or —OCO— such that oxygen atoms are not directly bonded to each other); preferably each independently a linear alkyl group having 2 to 18 carbon atoms (one or more methylene groups in the linear alkyl group are each independently optionally substituted with an oxygen atom, —CO—, —COO—, or —OCO— such that oxygen atoms are not directly bonded to each other); and more preferably each independently a linear alkyl group having 3 to 15 carbon atoms (one or more methylene groups in the linear alkyl group are each independently optionally substituted with an oxygen atom, —CO—, —COO—, or —OCO— such that oxygen atoms are not directly bonded to each other).

Since a side chain has a higher mobility than the main chain, the presence of the side chain contributes to an improvement in the mobility of a polymer chain at low temperature; however, the occurrence of the above-mentioned spatial interference between two side chains reduces the mobility. In order to inhibit the spatial interference between side chains, it is effective to increase the distance between the side chains and to decrease the lengths of the side chains within a necessary range.

$A^{14}$ and $A^{17}$ are each independently a hydrogen atom or an alkyl group having 1 to 10 carbon atoms in the present invention (one or more methylene groups in the alkyl group are each independently optionally substituted with an oxygen atom, —CO—, —COO—, or —OCO— such that oxygen atoms are not directly bonded to each other; and one or more hydrogen atoms in the alkyl group are each independently optionally substituted with a halogen atom or an alkyl group having 1 to 9 carbon atoms);

preferably each independently a hydrogen atom or an alkyl group having 1 to 7 carbon atoms (one or more methylene groups in the alkyl group are each independently optionally substituted with an oxygen atom, —CO—, —COO—, or —OCO— such that oxygen atoms are not directly bonded to each other);

more preferably each independently a hydrogen atom or an alkyl group having 1 to 5 carbon, atoms (one or more methylene groups in the alkyl group are each independently optionally substituted with an oxygen atom, —CO—, —COO—, or —OCO— such that oxygen atoms are not directly bonded to each other); and further preferably each independently a hydrogen atom or an alkyl group having 1 to 3 carbon atoms (one or more methylene groups in the alkyl group are each independently optionally substituted with an oxygen atom, —CO—, —COO—, or —OCO— such that oxygen atoms are not directly bonded to each other).

Also in $A^{14}$ and $A^{17}$, the extraordinary lengths thereof cause spatial interference between the side chains and therefore are not preferred. In the case where the side chains $A^{14}$ and $A^{17}$ are alkyl chains each having a short length, it is believed that they can have high mobility and inhibit an approach between adjacent main-chain moieties and that they can prevent interference between polymer main-chain moieties with the result that the mobility of the main chain is enhanced, which can prevent an increase in anchoring energy at law temperature and is effective for improving the display properties of a polymer-stabilized liquid crystal display device in a low temperature region.

$A^{15}$ positioned between the two side chains preferably has a long length from a viewpoint of a change in the distance between, the side chains and from a viewpoint of an increase in the distance between crosslinking points for a reduction in the glass transition temperature. The extraordinary length of $A^{15}$, however, causes the molecular weight of the compound represented by General Formula (V-c) to be unnecessarily large, which reduces the compatibility with a liquid crystal composition and causes a polymerization rate to be too slow with the result that the phase separation is adversely affected. Hence, the upper limit of the length needs to be determined.

Accordingly, in the present invention, $A^{15}$ is preferably an alkylene group having 9 to 16 carbon atoms (one hydrogen atom of each of at least one to five methylene groups in the alkylene group is independently substituted with a linear or branched alkyl group having 1 to 10 carbon atoms, and one or more methylene groups in the alkylene group are each independently optionally substituted with an oxygen atom, —CO—, —COO—, or —OCO— such that oxygen atoms are not directly bonded to each other).

That is, in the present invention, $A^{15}$ preferably has an alkylene chain length of 9 to 16 carbon atoms. $A^{15}$ has, as a structural characteristic, a structure in which a hydrogen atom of the alkylene group is substituted with an alkyl group having 1 to 10 carbon atoms. The number of substitutions with the alkyl group is from one to five, preferably one to three, and more preferably two or three. The number of carbon atoms of the alkyl group as a substituent is preferably from one to five, and more preferably one to three.

The compound represented by General Formula (V-a) can be synthesized by known methods such as techniques disclosed in *Tetrahedron Letters*; Vol. 30; pp 4985, *Tetrahedron Letters*; Vol. 23, No 6; pp 681-684, and *Journal of Polymer Science: Part A: Polymer Chemistry*; Vol. 34; pp 217-225.

A compound represented by General Formula (V-c) in which $A^{14}$ and $A^{17}$ are hydrogen atoms can be, for example, prepared as follows: a compound having multiple epoxy groups is allowed to react with a polymerizable compound having active hydrogen which is reactive with the epoxy groups, such as acrylic acid or methacrylic acid, thereby synthesizing a hydroxyl-group-containing polymerizable compound; and then the resulting compound is allowed to react with saturated fatty acid.

Alternatively, the compound can be prepared as follows: a compound having multiple epoxy groups is allowed to react with saturated fatty acid, thereby synthesizing a hydroxyl-group-containing compound; and the hydroxyl-group-containing compound is allowed to react with a polymerizable compound having a group that is reactive with a hydroxyl group, such as an acrylic acid chloride.

A radically polymerizable compound represented by General Formula (V-c), for instance, in which $A^{14}$ and $A^{17}$ are alkyl groups and in which $A^{12}$ and $A^{18}$ are methylene groups each having one carbon atom can be prepared as follows: a compound having multiple oxetane groups is allowed to react with a compound that is reactive with the oxetane groups, such as a fatty acid chloride or fatty acid, and the reaction product is further allowed to react with a polymerizable compound having active hydrogen, such as acrylic acid; or a compound having one oxetane group is allowed to react with a polyvalent fatty acid chloride or fatty acid that is reactive with the oxetane group, and the reaction product is further allowed to react with a polymerizable compound, having active hydrogen, such as acrylic acid.

A polymerizable compound represented by General Formula (V-c) in which $A^{12}$ and $A^{18}$ are alkylene groups each having three carbon atoms (propylene group: —CH$_2$CH$_2$CH$_2$—) can be prepared by use of a compound having multiple furan groups instead of the oxetane groups. A polymerizable compound represented by General Formula (V-c) in which $A^{12}$ and $A^{18}$ are alkylene groups each having four carbon atoms (butylene group: —CH$_2$CH$_2$CH$_2$CH$_2$—) can be prepared by use of a compound having multiple pyran groups instead of the oxetane groups.

<Polymerizable Compound (VI)>

A polymerizable liquid crystal compound (VI) used in the polymer-stabilized liquid crystal composition of the present invention is at least one polymerizable compound (VI) selected from the group consisting of compounds represented by General Formulae (VI-a)

[Chem. 40]

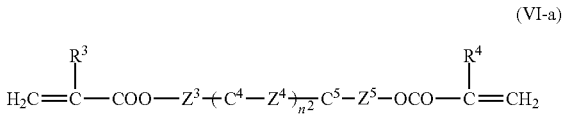

(VI-a)

(in Formula (VI-a), $R^3$ and $R^4$ each independently represent a hydrogen atom or a methyl group; $C^4$ and $C^5$ each independently represent a 1,4-phenylene group, a 1,4-cyclohexylene group, a pyridine-2,5-diyl group, a pyrimidine-2,5-diyl group, a pyridazine-3,6-diyl group, a 1,3-dioxane-2,5-diyl group, a cyclohexene-1,4-diyl group, a decahydronaphthalene-2,6-diyl group, a 1,2,3,4-tetrahydronaphthalene-2,6-diyl group, a 2,6-naphthylene group, or an indane-2,5-diyl group (among these groups, the 1,4-phenylene group, the 1,2,3,4-tetrahydronaphthalene-2,6-diyl group, the 2,6-naphthylene group, and the indane-2,5-diyl group are unsubstituted or each optionally substituted with, one or more of a fluorine atom, a chlorine atom, a methyl group, a methoxy group, a trifluoromethyl group, and a trifluoromethoxy group);

$Z^3$ and $Z^5$ each independently represent a single bond or an alkylene group having 1 to 15 carbon atoms (one or more methylene groups in the alkylene group are each independently optionally substituted with an oxygen atom, —CO—, —COO—, or —OCO— such that oxygen atoms are not directly bonded to each other; and one or more hydrogen atoms in the alkylene group are each independently optionally substituted with a fluorine atom, a methyl group, or an ethyl group);

$Z^4$ represents a single bond, —CH$_2$CH$_2$—, —CH$_2$O—, —OCH$_2$—, —CH$_2$CH$_2$O—, —OCH$_2$CH$_2$—, —CH$_2$CH$_2$CH$_2$O—, —OCH$_2$CH$_2$CH$_2$—, —CH$_2$CH$_2$OCO—, —COOCH$_2$CH$_2$—, —CH$_2$CH$_2$COO—, —OCOCH$_2$CH$_2$—, —CH=CH—, —C≡C—, —CF$_2$O—, —OCF$_2$—, —COO—, or —OCO—;

$n^2$ represents 0, 1, or 2; and in the case where $n^2$ represents 2, the multiple $C^4$'s may be the same as or different from each other, and the multiple $Z^4$'s may be the same as or different from each other), —COO—, or —OCO— such that oxygen atoms are not directly bonded to each other, and one or more hydrogen atoms of the alkylene group are each independently optionally substituted with a fluorine atom, a methyl group, or an ethyl group);

$Z^7$ represents a single bond, —CH$_2$CH$_2$—, —CH$_2$O—, —OCH$_2$—, —CH$_2$CH$_2$O—, —OCH$_2$CH$_2$—, —CH$_2$CH$_2$CH$_2$O—, —OCH$_2$CH$_2$CH$_2$—, —CH$_2$CH$_2$OCO—, —COOCH$_2$CH$_2$—, —CH$_2$CH$_2$COO—, —OCOCH$_2$CH$_2$—, —CH=CH—, —C≡C—, —CF$_2$O—, —OCF$_2$—, —COO—, or —OCO—;

$n^3$ represents 0, 1, or 2; and in the case where $n^3$ represents 2, the multiple $C^6$'s may be the same as or different from each other, and the multiple $Z^7$'s may be the same as or different from each other), and General Formula (VI-c)

[Chem. 42]

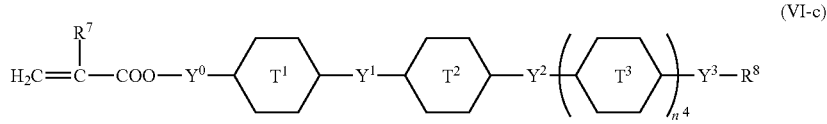

(VI-c)

General Formula (VI-b)

[Chem. 41]

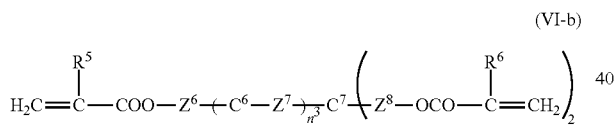

(VI-b)

(in Formula (VI-b), $R^5$ and $R^6$ each independently represent a hydrogen atom or a methyl group; $C^6$ represents a 1,4-phenylene group, a 1,4-cyclohexylene group, a pyridine-2,5-diyl group, a pyrimidine-2,5-diyl group, a pyridazine-3,6-diyl group, a 1,3-dioxane-2,5-diyl group, a cyclohexene-1,4-diyl group, a decahydronaphthalene-2,6-diyl group, a 1,2,3,4-tetrahydronaphthalene-2,6-diyl group, a 2,6-naphthylene group, or an indane-2,5-diyl group (among these groups, the 1,4-phenylene group, the 1,2,3,4-tetrahydronaphthalene-2,6-diyl group, the 2,6-naphthylene group, and the indane-2,5-diyl group are unsubstituted or each optionally substituted with one or more of a fluorine atom, a chlorine atom, a methyl group, a trifluoromethyl group, and a trifluoromethoxy group);

$C^7$ represents a benzene-1,2,4-triyl group, a benzene-1,3,4-triyl group, a benzene-1,3,5-triyl group, a cyclohexane-1,2,4-triyl group, a cyclohexane-1,3,4-triyl group, or a cyclohexane-1,3,5-triyl group;

$Z^6$ and $Z^8$ each independently represent a single bond or an alkylene group having 1 to 15 carbon atoms (one or more methylene groups of the alkylene group are each independently optionally substituted with an oxygen atom, —CO—, (in Formula (VI-c), $R^7$ represents a hydrogen atom or a methyl group; six-membered rings $T^1$, $T^2$, and $T^3$ each independently represent any of the followings

[Chem. 43]

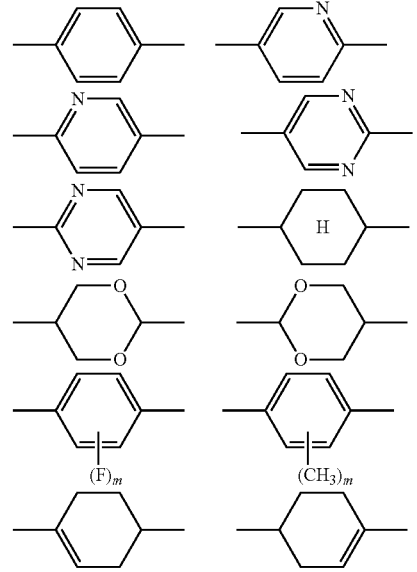

(where m represents an integer from 1 to 4);
$n^4$ represents an integer of 0 or 1;
$Y^0$, $Y^1$, and $Y^2$ each independently represent a single bond, —CH$_2$CH$_2$—, —CH$_2$O—, —OCH$_2$—, —COO—, —OCO—, —OC—, —CH=CH—, —CF=CF—, —(CH$_2$)$_4$—, —CH$_2$CH$_2$CH$_2$O—, —OCH$_2$CH$_2$CH$_2$—, —CH═CHCH$_2$CH$_2$—, or —CH$_2$CH$_2$CH═CH—;

Y$^3$ represents a single bond, —O—, —COO—, or —OCO—; and

R$^8$ represents a hydrogen atom, a halogen atom, a cyano group, an alkyl group having 1 to 20 carbon atoms, an alkenyl group having 1 to 20 carbon atoms, an alkoxy group having 1 to 20 carbon atoms, or a hydrocarbon group having 1 to 20 carbon atoms).

More specifically, use of any of compounds represented by General Formula (VI-d) or (VI-e) is preferred because it enables a production of optically isotropic compounds having high mechanical strength and excellent thermal resistance.

[Chem. 44]

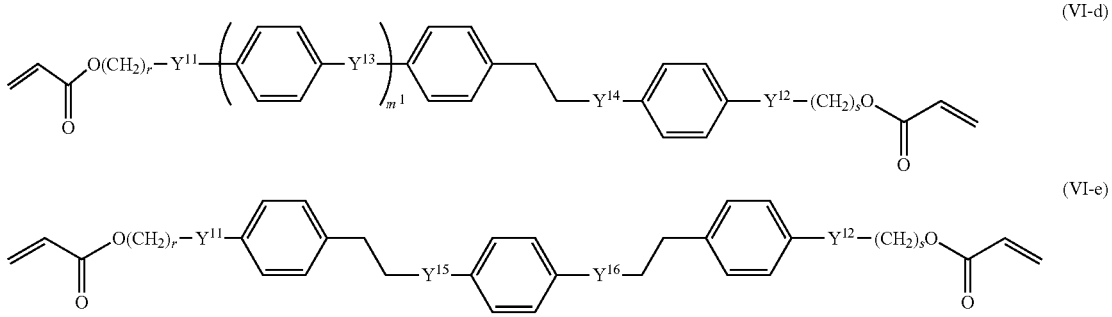

(in Formulae (VI-d) and (VI-e), m$^1$ represents 0 or 1; Y$^{11}$ and Y$^{12}$ each independently represents a single bond, —O—, —COO—, or —OCO—; Y$^{13}$ and Y$^{14}$ each independently represent —COO— or —OCO—; Y$^{15}$ and Y$^{16}$ each independently represent —COO— or —OCO—; r and s each independently represent an integer from 2 to 14; and the 1,4-phenylene group in each formula is unsubstituted or optionally substituted with at least one of a fluorine atom, a chlorine atom, a methyl group, a methoxy group, a trifluoromethyl group, and a trifluoromethoxy group)

Specific examples of the compounds represented by General Formula (VI-a) include the following compounds (VI-1) to (VI-10).

[Chem. 45]

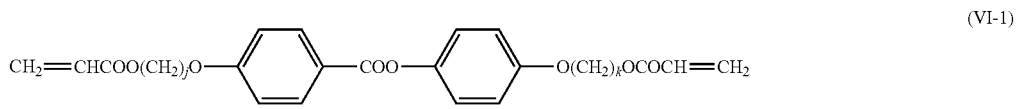

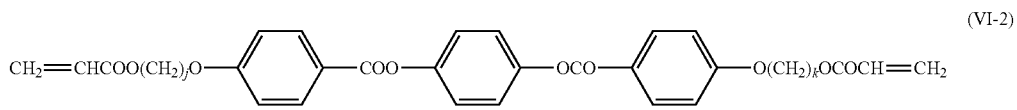

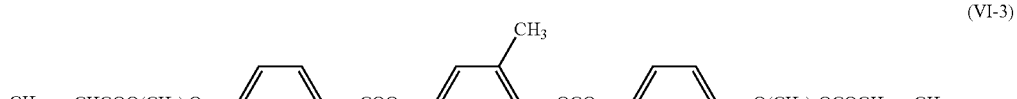

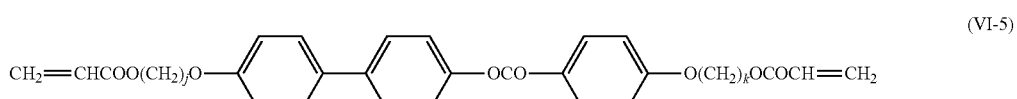

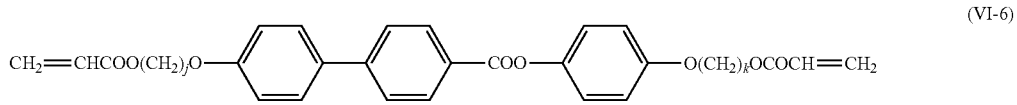

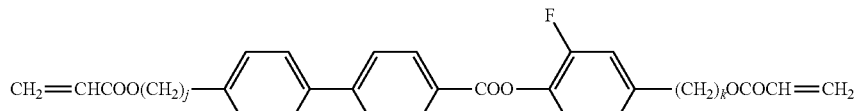
(VI-7)
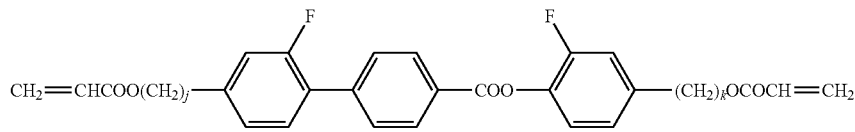
(VI-8)
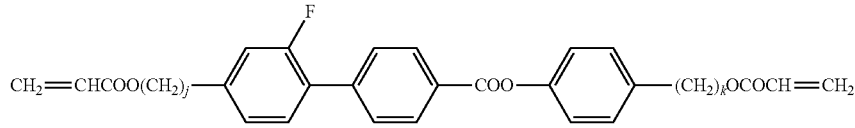
(VI-9)
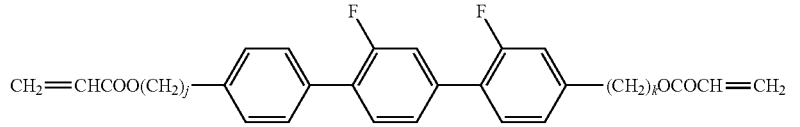
(VI-10)
(in the formulae, j and k each independently represent an integer from 2 to 14)
Specific examples of the compounds represented by General Formula (VI-d) or (VI-e) include the following compounds (VI-11) to (VI-20).
[Chem. 46]
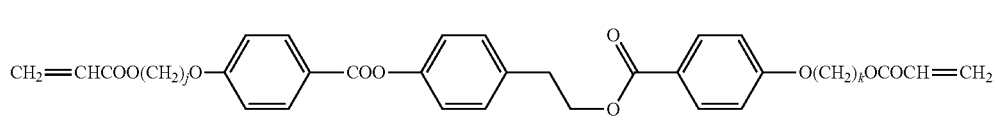
(VI-11)
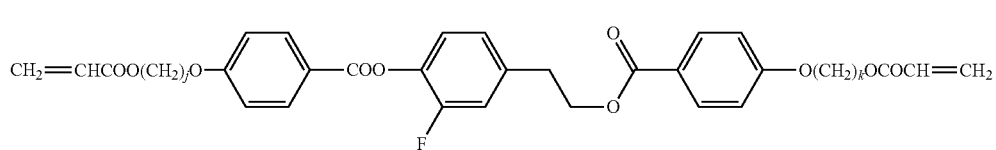
(VI-12)
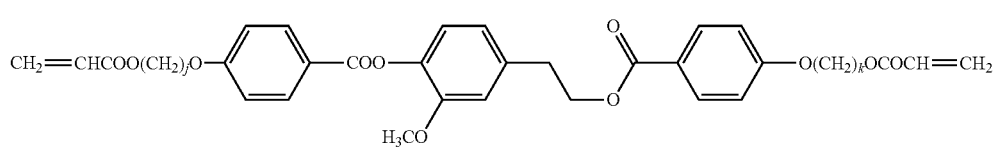
(VI-13)
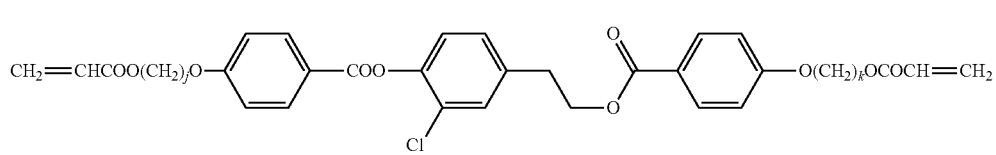
(VI-14)
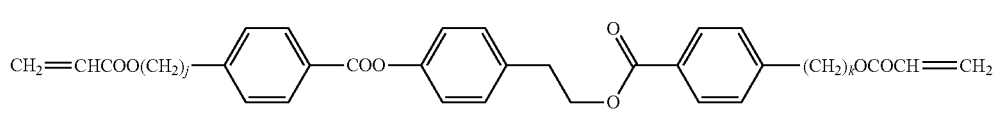
(VI-15)
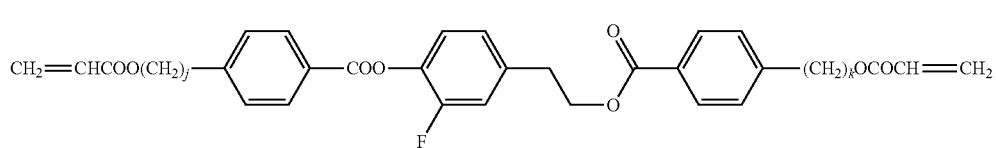
(VI-16)

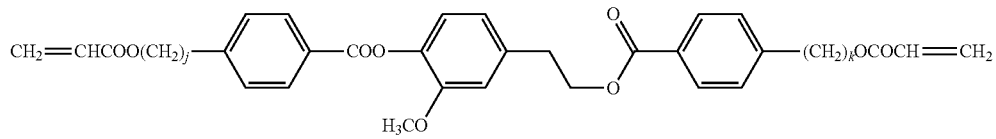

(VI-17)

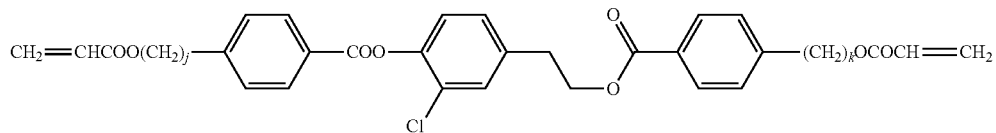

(VI-18)

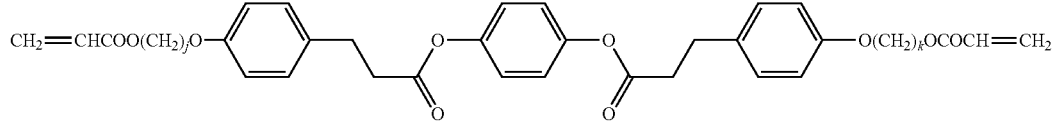

(VI-19)

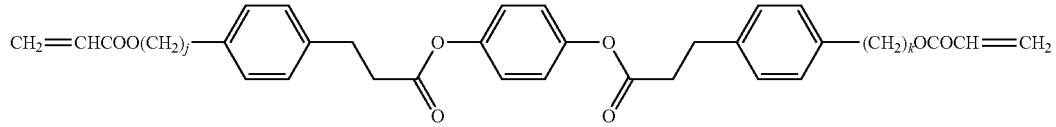

(VI-20)

(in the formulae, j and k each independently represent an integer from 2 to 14)

In the present invention, in addition to the polymerizable liquid crystal compound (VI), a polyfunctional liquid crystal monomer can be used. Examples of the polymerizable functional group of the polyfunctional liquid crystal monomer include an acryloyloxy group, a methacryloyloxy group, an acrylamide group, a methacrylamide group, an epoxy group, a vinyl group, a vinyloxy group, an ethynyl group, a mercapto group, a maleimide group, ClCH=CHCONH—, $CH_2$=CCl—, CHCl=CH—, and RCH=CHCOO— (where R represents a chlorine atom, a fluorine atom, or a hydrocarbon group having 1 to 18 carbon atoms). Among these, an acryloyloxy group, a methacryloyloxy group, an epoxy group, a mercapto group, and a vinyloxy group are preferred; a methacryloyloxy group and an acryloyloxy group are especially preferred; and an acryloyloxy group is most preferred.

The polyfunctional liquid crystal monomer has a molecular structure including a liquid crystal skeleton having two or more cyclic structures, a polymerizable functional group, and preferably at least two, more preferably three, flexible groups linking the liquid crystal skeleton to the polymerizable functional group. Examples of the flexible groups include alkylene spacer groups represented by —$(CH_2)_n$— (where n represents an integer) and siloxane spacer groups represented by —$(Si(CH_3)_2$—$O)_n$— (where n represents an integer). Among these, alkylene spacer groups are preferred. The part at which the flexible groups are linked to the liquid crystal skeleton or the polymerizable functional group may have a bond such as —O—, —COO—, or —CO— for mediating the linkage.

<Chiral Photopolymerizable Monomer>

The photopolymerizable monomer (polymerizable compound) may be not only the above-mentioned achiral materials but also chiral materials. Examples of the chiral photopolymerizable monomer include polymerizable compounds represented by General Formula (VI-x).

[Chem. 47]

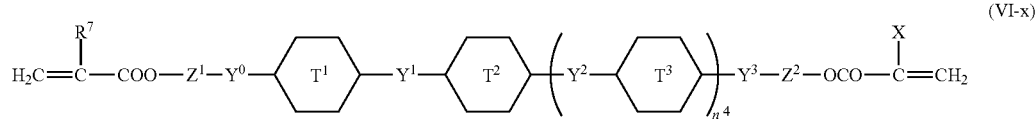

(VI-x)

In Formula (VI-x), X represents a hydrogen atom or a methyl group. $n^4$ represents an integer of 0 or 1. The six-membered rings $T^1$, $T^2$, and $T^3$ each represent a substituent having a six-membered ring structure, such as a 1,4-phenylene group or a trans-1,4-cyclohexylene group. Each of the six-membered rings $T^1$, $T^2$, and $T^3$ is not limited to such a substituent and may be a substituent having any one of the following structures.

[Chem. 48]

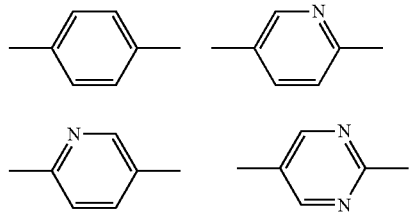

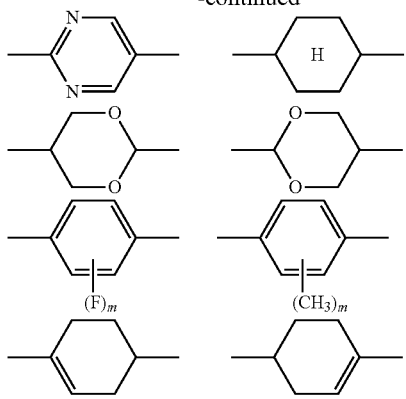

$T^1$, $T^2$, and $T^3$ may be the same as or different from each other. In the above substituents, m represents an integer from 1 to 4.

In Formula (VI-x), $Y^1$ and $Y^2$ each independently represent a linear or branched alkylene group having 1 to 10 carbon atoms; in such an alkylene group, one $CH_2$ group or two $CH_2$ groups not adjoining each other are optionally substituted with —O—, —S—, —CO—O—, or —O—CO—. $Y^1$ and $Y^2$ each optionally contain a single bond, —$CH_2CH_2$—, —$CH_2O$—, —$OCH_2$—, —COO—, —OCO—, —C≡C—, —CH=CH—, —CF=CF—, —$(CH_2)_4$—, —$CH_2CH_2CH_2O$—, —$OCH_2CH_2CH_2$—, —CH=$CHCH_2CH_2$—, or —$CH_2CH_2$CH=CH—; $Y^1$ and $Y^2$ each optionally contain an asymmetric carbon atom; and $Y^1$ and $Y^2$ may be the same as or different from each other provided that they have any of the above-mentioned structures.

$Y^0$ and $Y^3$ each represent a single bond, —O—, —OCO—, or —COO—.

$Z^1$ represents an alkylene group having 3 to 20 carbon atoms, containing an asymmetric carbon atom, and having a branched chain structure.

$Z^2$ represents an alkylene group having 1 to 20 carbon atoms and optionally containing an asymmetric carbon atom.

In the case where the ferroelectric liquid crystal composition of the present invention contains a polymerizable compound, polymerization, such as radical polymerization, anionic polymerization, or cationic polymerization, can be carried out; in particular, radical polymerization is preferred.

A radical polymerization initiator to be used can be a thermal polymerization initiator or a photopolymerization initiator, and a photopolymerization initiator is preferred. In particular, preferred examples thereof include the following compounds:

acetophenone compounds such as diethoxyacetophenone, 2-hydroxy-2-methyl-1-phenylpropane-1-one, benzyldimethylketal, 1-(4-isopropylphenyl)-2-hydroxy-2-methylpropane-1-one, 4-(2-hydroxyethoxy)phenyl-(2-hydroxy-2-propyl)ketone, 1-hydroxycyclohexyl-phenylketone, 2-methyl-2-morpholino(4-thiomethylphenyl)propane-1-one, and 2-benzyl-2-dimethylamino-1-(4-morpholinophenyl)-butanone;

benzoyl compounds such as benzoin, benzoin isopropyl ether, and benzoin isobutyl ether;

acylphosphine oxides such as 2,4,6-trimethylbenzoyl diphenylphosphine oxide benzyl esters and methylphenylglyoxy esters;

benzophenone compounds such as benzophenone, methyl o-benzoylbenzoate, 4-phenylbenzophenone, 4,4'-dichlorobenzophenone, hydroxybenzophenone, 4-benzoyl-4'-methyl-diphenyl sulfide, acrylated benzophenone, 3,3',4,4'-tetra(t-butylperoxycarbonyl)benzophenone, and 3,3'-dimethyl-4-methoxybenzophenone;

thioxanthone compounds such as 2-isopropylthioxanthone, 2,4-dimethylthioxanthone, 2,4-diethylthioxanthone, and 2,4-dichlorothioxanthone;

aminobenzophenone compounds such as Michler's ketone and 4,4'-diethylaminobenzophenone; and 10-butyl-2-chloroacridone, 2-ethylanthraquinone, 9,10-phenanthrenequinone, and camphorquinone. Among these compounds, benzyldimethylketal is most preferred.

In order to assist alignment of the molecules of a liquid crystal composition (as an alignment aid), nanoparticles, such as organic particles, inorganic particles, or organic-inorganic hybrid particles, may be used. Examples of the organic particles include polymer particles such as polystyrene, polymethyl methacrylate, polyhydroxy acrylate, and divinylbenzene. Examples of the inorganic particles include oxides such as barium titanate ($BaTiO_3$), $SiO_2$, $TiCO_2$, and $Al_2O_3$ and metals such as Au, Ag, Cu, and Pd. The organic particles and the inorganic particles may be hybrid particles having surfaces coated with other materials. The organic-inorganic hybrid particles may be inorganic particles having surfaces coated with organic materials. In the case where the organic material applied to the surface of inorganic particles has liquid crystalline properties, liquid crystal molecules around the particles are easily aligned, which is preferred.

Furthermore, for example, an antioxidant, an ultraviolet absorber, an unreactive oligomer, an inorganic filler, an organic filler, a polymerization inhibitor, an antifoaming agent, a leveling agent, a plasticizer, or a silane coupling agent can be appropriately used if needed. In addition, for instance, a biaxial compound, such as discotic liquid crystal, and a trapping material for ionic and polar compounds can be used.

If two polarizing plates are used, the viewing angle and the contrast can be improved by control of the polarization axis of each polarizing plate.

<Liquid Crystal Display Device>

The liquid crystal composition of the present invention can be used in devices such as liquid crystal display devices and optical modulators. In a liquid crystal display device in which a homeotropic alignment is employed, at least one of a pair of substrates each including two polarization plates arranged such that the planes of polarization are vertical to each other has a pair of pixel electrode and common electrode, and the liquid crystal composition of the present invention is disposed between such a pair of substrates. An electric field is applied to the inside of the display device preferably in a direction vertical to the layer normal; a preferred electrode structure which enables such an electric field is an electrode structure in which a pixel electrode and a common electrode are disposed in the plane of one substrate, such as an IPS (in-plane switching) type or an FFS (fringe field switching) type. It is preferred that the direction of an applied horizontal electric field which is vertical to the layer normal be controlled by bending of the structure of an interdigitated electrode in terms of a low driving voltage, high image quality, high brightness, and ultra-high brightness, as in the case of S-IPS (super IPS), AS-IPS (advanced super IPS), and IPS-Pro (IPS-provectus). The interdigitated electrode can be a metal electrode; however, in order to enhance efficiency for light utilization at an electrode portion, a transparent electrode, such as ITO, indium oxide-gallium-zinc (IGZO), or graphene, is preferably used. A reduction in the distribution of electric field intensity inside the display device is preferred in terms of a low driving voltage, high response speed, high contrast, and high image quality.

For the purpose of low-voltage driving, an electrode having, for example, an IPS (in-plane switching) or FFS electrode structure can be provided to each of a pair of substrates, a confined geometry (Lee, S.-D.; *IDW'09-Proceeding of the 16th International Display Workshots* 1, 2009; pp. 111-112) that is a device which has a protruding electrode inside a cell and in which the distribution of electric field Intensity is less likely to be reduced inside the cell can be used, or an FFS (fringe-field switching) electrode can be provided to each of a pair of substrates.

Since an alignment state in an off-mode is similar to vertical uniaxial alignment employed in a nematic liquid crystal display device of a VA mode, an optical compensation film such as an A-plate used in a VA mode, a uniaxially stretched negative C-plate, or a biaxially stretched Z-plate can be used for improvements of contrast and a viewing angle.

In homogeneous alignment, surface-stabilized ferroelectric liquid crystal (SSFLC) can be used in a display mode. In SSFLC, liquid crystal molecules are preferably aligned with the aid of a substrate subjected to a horizontal alignment treatment such that the layer normal is parallel to the surface of a substrate of a cell (homogeneous alignment); in addition, the helix in a chiral smectic C phase is preferably adjusted to be unwound owing to an effect brought about by a reduction in the thickness of a liquid crystal layer. The pitch in a chiral smectic C phase is preferably adjusted to be at least greater than or equal to the cell thickness such that the helix is unwound in a cell thickness ranging from 1.4 μm to 3 μm. Such adjustment for the unwinding of the helix enables liquid crystal molecules to be less likely to be tilted to the surface of a substrate, and the range of a direction angle can be restricted to be in two types, so that black-and-white binary display is enabled. It is important to select an alignment film which has a memory as a result of generation of memory (bistability) of alignment due to an effect of surface stabilization.

In order to fill the space between the substrates with liquid crystal without the occurrence of defective alignment, known vacuum injection, liquid crystal drop injection (one drop fill), or flexographic printing can be employed; it is preferred that an isotropic phase or a nematic phase be formed by heating and that phase transition be at least performed from the nematic phase to a smectic phase by slow cooling; it is preferred that the phase sequence of the liquid crystal composition be at least, from the high temperature side, an isotropic phase, a chiral nematic phase, a smectic A phase, and a chiral smectic C phase (ISO-N*-SmA-SmC*); and it is also preferred that the phase sequence be at least, from the high temperature side, an isotropic phase, a chiral nematic phase, and a chiral smectic C phase (ISO-N*-SmC*). In such a case, another phase such as a blue phase (BP) may be generated on the higher temperature side than the nematic phase; and examples of the phase sequence include a sequence of isotropic liquid, a blue phase, a chiral nematic phase, a smectic A phase, and a chiral smectic C-phase and a sequence of isotropic liquid, a blue phase, a chiral nematic phase, and a chiral smectic C-phase. In addition, liquid crystal which generates phase sequence of isotropic liquid and a chiral smectic C-phase (ISO-SmC*) can be also employed.

In order to increase the tilt angle of a liquid crystal compound, the phase sequence is preferably free from a smectic A phase, and specific examples thereof include INC (ISO-N*-SmC*) and IC (ISO-SmC*).

In the phase sequence of the liquid crystal composition, the helical pitch of a chiral nematic phase is preferably not less than 50 μm at a temperature of phase transition from a chiral nematic phase to a smectic A phase or a chiral smectic C-phase in a decrease in temperature or at a temperature higher than the lower limit temperature of the chiral nematic phase by 2° C. in this case, since the helical pitch is sufficiently larger than the cell thickness (gap) when the liquid crystal is in a chiral nematic phase, a helical structure is not formed in the chiral nematic phase, which can give good homeotropic alignment without the occurrence of defective alignment before transition to a smectic phase; thus, further uniform alignment can be produced. In order to unwind the helical pitch in a chiral nematic phase for transition to a smectic phase, the temperature range is preferably not less than 10° C.

A narrow temperature range results in transition to a smectic phase without unwinding of the helix in some cases, which causes defective alignment. In order to unwind the helix in a chiral nematic phase, a pitch canceller having a reverse helix can be added to adjust the helix.

The liquid crystal display device may have any light source, and an LSD is preferred because it consumes low energy. In order to further reduce power consumption, it is preferred to use flash controlling (technique of reducing light quantity or turning off light at a dark place), a multi-field driving method (technique of distinguishing driving frequency in moving picture display from that in still picture display), a technique of changing light quantity modes between indoors and outdoors or between night and day, or a technique of temporarily stopping driving by using the memory of a liquid crystal display device. A reflective display device is preferred because it can utilize exterior light sources (e.g., sunlight and indoor light) even when the apparatus does not have a light source.

The liquid crystal display device can also perform three-dimensional display by, for example, time division such as a field sequential system space division such as a polarization system, parallax barrier system, or integral imaging system; wavelength division such as a spectral system or anaglyph; or an FPS mode.

The contrast is preferably improved by flash controlling (technique of reducing light quantity or turning off light at a dark place), a device having an aperture ratio of not less than 50%, use of an alignment film which enables good alignment or use of an antiglare film, or use of a field sequential system (color-displaying system in which LEDS of RBG three colors are each sequentially lightened without use of color filters for a short time less than or equal to the temporal resolution of the human eyes for recognition of a color).

For a rapid response, it is preferred to use an over drive function (allowing the voltage for expressing a tone to be high at the time of rising and to be low at the time of falling) or to use smectic liquid crystal having negative dielectric anisotropy.

A film covering the surface of a touch panel preferably has a water and oil repellencies, antifouling properties, and fingerprint resistance in order to inhibit a decrease in display quality by being fouled. At least the electrode substrate on the pressed side is preferably a flexible substrate such as a plastic substrate or thin glass substrate.

The electrode is preferably made of graphene (a sheet consisting of carbon monoatomic layer) or an organic semiconductor.

Two substrates used in a liquid crystal cell can be made of a transparent material having flexibility, such as glass or a plastic material, and one of these substrates may be made of a non-transparent material such as silicon. The transparent substrate having a transparent electrode layer can be formed by, for example, sputtering of indium tin oxide (ITO) on a transparent plate such as a glass plate.

Color filters can be produced by, for instance, a pigment dispersion technique, a printing technique, an electrodeposition technique, or a staining technique. In production of the color filters by, for example, a pigment dispersion technique, a curable colored composition for a color filter is applied onto the transparent substrate, subjected to patterning, and then cured by being heated or irradiated with light. This process is carried out for each of three colors of red, green, and blue, thereby being able to produce the pixels of the color filters. Active elements such as a thin film transistor (TFT) using an organic semiconductor, an inorganic semiconductor, or an oxide semiconductor; a thin-film diode; a metal insulator; and a metal specific resistance element also may be provided on the resulting substrate to form the pixel electrodes.

The liquid crystal composition may be subjected to removal of impurities for an enhancement in reliability or for TFT driving or may be subjected to purification with, for instance, silica or alumina for a further increase in specific resistance. The specific resistance of a liquid crystal composition for TFT driving is preferably not less than $10^{11}$ Ω·cm, more preferably not less than $10^{12}$ Ω·cm, and further preferably not less than $10^{18}$ Ω·cm. In order to prevent the effect of cations which are present as impurities in a liquid crystal composition, a cationic inclusion compound such as podand, coronand, or cryptand may be used. In TFT driving, image information is recorded at a certain time interval, and a charge is maintained between electrodes during this time to display an image. Since switching operation reduces the charge maintained between the electrodes owing to the effect of polarization reversal current caused by spontaneous polarization, an auxiliary capacitor is preferably connected to the pixel. An auxiliary capacitor that is suitable for spontaneous depolarization of liquid crystal used can be connected.

In order to maintain the performance of the liquid crystal display device even under low temperature environment, the liquid crystal composition preferably has a low-temperature storage stability. The low-temperature storage stability of the liquid crystal composition preferably enables SmC* to be maintained at 0° C. or less for at least 24 hours, more preferably at −20° C. or less for at least 500 hours, and farther preferably at −30° C. or less for at least 700 hours.

<Alignment Film>

The liquid-crystal-supporting surfaces of substrates can be each provided with an alignment film. The alignment film can be a general alignment film, such as a polyimide film, or a photo-alignment film.

The alignment film is preferably a vertical alignment film.

The alignment film is preferably a polyimide vertical alignment film, and specific examples thereof include polyamic acids prepared by reaction of acid anhydride having a substituted long alkyl chain or alicyciic group and diamine having a substituted long alkyl chain or alicyciic group with acid dianhydride and polyimides prepared by dehydration and decyclization of such polyamic acids. A liquid crystal aligning agent composed of such polyimide, polyamide, or polyamic acid having a bulky group can be used to form a film on a substrate, thereby producing liquid crystal alignment film having vertical alignment properties.

Examples of the acid anhydride include compounds represented by Formulae (VII-a1) to (VII-a3). Examples of the diamine include compounds represented by Formulae (VII-b1) to (VII-b3).

[Chem. 49]

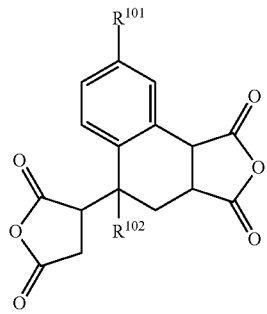

(VII-a1)

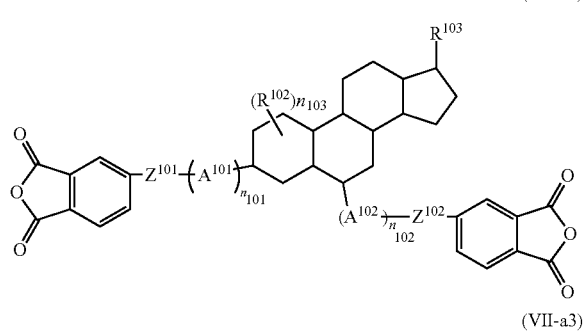

(VII-a2)

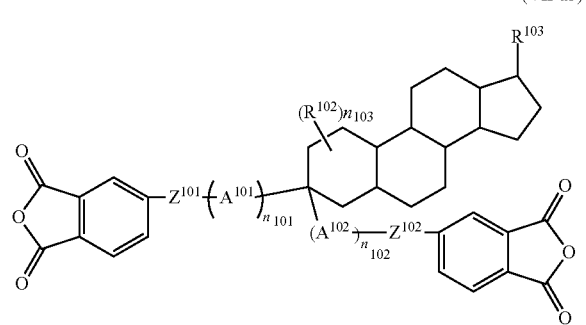

(VII-a3)

[Chem. 50]

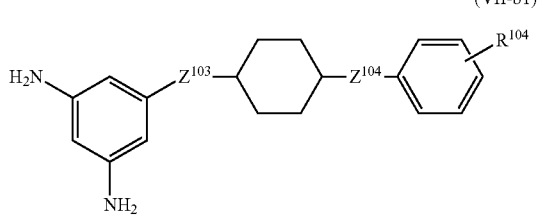

(VII-b1)

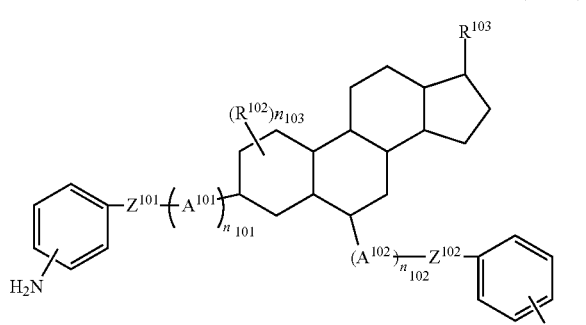

(VII-b2)

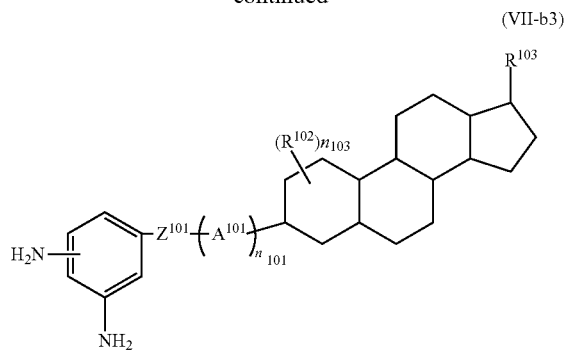

In Formulae (VII-a1) to (VII-a3) and (VII-b1) to (VII-b3), $R^{101}$, $R^{102}$, $R^{103}$, and $R^{104}$ each independently represent a linear or branched alkyl group having 1 to 30 carbon atoms, a hydrogen atom, or a fluorine atom in the alkyl group, one —$CH_2$— group or two or more —$CH_2$— groups not adjoining each other are each optionally substituted with —O—, —S—, —NH—, —N($CH_3$)—, —CO—, —CO—O—, —O—CO—, —O—CO—O—, —S—CO—, —CO—S—, —O—$SO_3$—, —$SO_2$—O—, —CH=CH—, —C≡C—, a cyclopropylene group, or —Si($CH_3$)$_2$—; and at least one hydrogen atom of the alkyl group is optionally substituted with a fluorine atom, a chlorine atom, or a bromine atom, or a CN group;

$Z^{101}$, $Z^{102}$, $Z^{103}$, $Z^{105}$, and $Z^{104}$ each independently represent —O—, —S—, —CO—, —CO—O—, —O—CO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$CF_2CH_2$—, —$CH_2CF_2$—, —$CF_2CF_2$—, —CH=CH—, —CF=CH—, —CH=CF—, —CF=CF—, —C≡C—, —CH=CH—CO—O—, —O—CO—CH=CH—, or a single bond;

$A^{101}$ and $A^{102}$ each independently represent a cyclic group selected from a phenylene group, a cyclohexylene group, a dioxolanediyl group, a cyclohexenylene group, a bicyclo[2.2.2]octylene group, a piperidinediyl group, a naphthalenediyl group, a decahydronaphthalenediyl group, a tetrahydronaphthalenediyl group, and an indanediyl group; in the phenylene group, the naphthalenediyl group, the tetrahydronaphthalenediyl group, and the indanediyl group, one or more —CH= groups in each ring are each optionally substituted with a nitrogen atom; in the cyclohexylene group, the dioxolanediyl group, the cyclohexenylene group, the bicyclo[2.2.2]octylene group, the piperidinediyl group, the decahydronaphthalenediyl group, the tetrahydronaphthalenediyl group, and the indanediyl group, one —$CH_2$— group or two —$CH_2$— groups not adjoining each other in each ring are each optionally substituted with —O— and/or —S—; at least one hydrogen atom of the cyclic group is optionally substituted with a fluorine atom, a chlorine atom, a bromine atom, a CN group, an $NO_2$ group, or an alkyl, alkoxy, alkylcarbonyl, or alkoxycarbonyl group which has 1 to 7 carbon atoms and of which one or more hydrogen atoms are each optionally substituted with a fluorine atom or a chlorine atom;

$n^{101}$ and $n^{102}$ each independently represent 0 or 1; and $n^{103}$ represents an integer from 0 to 5.

In each of General Formulae (VII-a2) and (VII-a3) and (VII-b2) and (VII-b3), a —$CH_2$— group of the steroid skeleton is optionally substituted with —O— and/or —S—, and the steroid skeleton optionally contains one or more unsaturated bonds (C=C) at arbitrary positions.

In a horizontal-electric-field-type liquid crystal display device in which an electric field is applied in a horizontal direction, an alignment film containing, as a liquid crystal aligning agent, a polyamic acid or polyimide having a structure represented by Formula (VII-c1) or (VII-c2) is preferred because it has excellent afterimage characteristics and can reduce light transmittance in a dark state in which an electric field is not applied.

[Chem. 51]

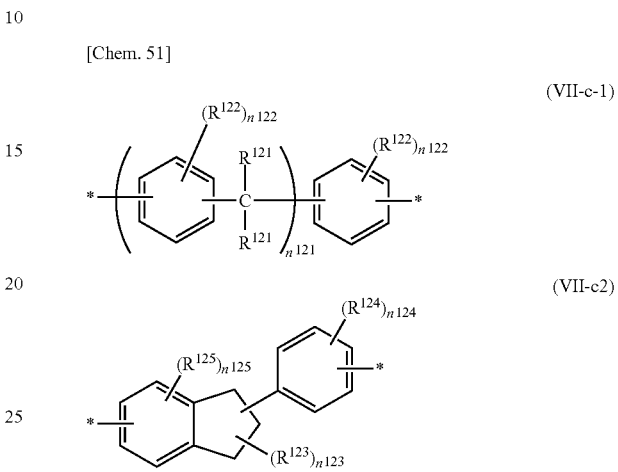

In Formula (VII-c1), $R^{121}$'s each independently represent an alkyl group having 1 to 6 carbon atoms; $R^{122}$'s each independently represent an alkyl group having 1 to 6 carbon atoms, a halogen atom, a cyano group, a hydroxyl group, or a carboxyl group;

$n^{121}$ represents an integer from 1 to 10; $n^{122}$'s each independently represent an integer from 0 to 4; and the symbol "*" represents a bond.

In Formula (VII-c2), $R^{123}$ each independently represent an alkyl group having 1 to 6 carbon atoms; $R^{124}$ each independently represent an alkyl group having 1 to 6 carbon atoms, a halogen atom, a cyano group, a hydroxyl group, or a carboxyl group; $R^{125}$ each independently represent an alkyl group having 1 to 6 carbon atoms, a halogen atom, a cyano group, a hydroxyl group, or a carboxyl group;

$n^{123}$ represents an integer from 0 to 5; $n^{124}$ represents an integer from 0 to 4; $n^{125}$ represents an integer from 0 to 3; and the symbol "*" represents a bond.

A polyamic acid having both a structure represented by Formula (VII-c1) and a structure represented by Formula (VII-c2) in at least part of its molecules can be prepared by, for example, reaction of a tetracarboxylic dianhydride having a structure represented by Formula (VII-c1) and a tetracarboxylic dianhydride having a structure represented by Formula (VII-c2) with a diamine or by reaction of a diamine having a structure represented by Formula (VII-c1) and a diamine having a structure represented by Formula (VII-c2) with a tetracarboxylic dianhydride.

Specific examples of the tetracarboxylic dianhydride having a structure represented by Formula (VII-c1) or (VII-c2) include compounds of which the benzene rings each having a bond represented by the symbol "*" at the two ends are phthalic anhydride groups.

Specific examples of the diamine having a structure represented by Formula (VII-c1) or (VII-c2) include compounds of which the benzene rings each having a bond represented by the symbol "*" at the two ends are aniline groups.

Examples of the photo-alignment film include photo-alignment films having a structure such as azobenzene, stilbene, α-hydrazano-β-keto ester, or coumarin and formed by photoisomerization; photo-alignment films having a structure such as azobenzene, stilbene, benzylidene phthalic diimide, or cinnamoyl and formed by photo-geometric isomerization; photo-alignment films having a structure such as spiropyran or spirooxazine and formed by photocycloreversion or photocyclization; photo-alignment films having a structure such as cinnamoyl, chalcone, coumarin, or diphenylacetylene and formed by photodimerization; photo-alignment films having a structure such as soluble polyimide or cyclobutane polyimide and formed by photolysis through photoirradiation; and photo-alignment films formed by photoirradiation of polyimide prepared through reaction, of biphenyltetracarboxylic dianhydride with diaminodiphenyl ether (BPDA/DPE).

The photo-alignment film can be produced as follows: a coating film containing a compound having a photo-alignment group is irradiated with light having anisotropy for arrangement of the photo-alignment group, and then the photo-aligned state is fixed.

In the case where the compound having a photo-alignment group has a polymerizable group, the compound is preferably polymerized after the light irradiation for producing liquid-crystal-aligning ability. Polymerization may be either photopolymerization or thermal polymerization. In photopolymerization, a photopolymerization initiator is added to a photo-alignment agent, and photopolymerization is performed by emission of, for example, light beams having different wavelengths after the light irradiation. In thermal polymerization, a thermal polymerization initiator is added to a photo-alignment agent, and thermal polymerization is carried out by heating after the light irradiation.

In order to fix the photo-aligned state of a photo-alignment film, a photo-crosslinkable polymer may be also used. Examples of the photo-crosslinkable polymer for the photo-alignment film include the following compounds (VIII-a) and (VIII-b).

[Chem. 52]

(VIII-a)

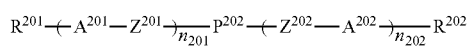
(VIII-b)

(in the formulae, $R^{201}$ and $R^{202}$ each independently represent a linear or branched alkyl group having 1 to 30 carbon atoms, a hydrogen atom, or a fluorine atom; in the alkyl group, one —$CH_2$— group or two or more —$CH_2$— groups not adjoining each other are each optionally substituted with —O—, —S—, —NH—, —N($CH_3$)—, —CO—, —CO—O—, —O—CO—, —O—CO—O—, —S—CO—, —CO—S—, —O—$SO_2$—, —$SO_2$—O—, —CH=CH—, —C≡C—, a cyclopropylene group, or —Si($CH_3$)$_2$—; at least one hydrogen atom of the alkyl group is optionally substituted with a fluorine atom, a chlorine atom, a bromine atom, or a CM group; the alkyl group optionally contains a polymerizable group; the alkyl group optionally contains a fused or spiro ring system; the alkyl group optionally contains at least one aromatic or aliphatic ring which optionally contains one or more hetero atoms and which is optionally substituted with an alkyl group, an alkoxy group, or a halogen atom;

$Z^{201}$ and $Z^{202}$ each independently represent —O—, —S—, —CO—, —CO—O—, —O—CO—, —O—CO—O—, —CO—N($R^a$)—, —N($R^a$)—CO—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$CF_2CH_2$—, —$CH_2CF_2$—, —$CF_2CF_2$—, —CH=CH—, —CF=CH—, —CH=CF—, —CF=CF—, —C≡C—, —CH=CH—CO—O—, —O—CO—CH=CH—, or a single bond; $R^a$ of —CO—N($R^a$)— or —N($R^a$)—CO— represents a hydrogen atom or a linear or branched alkyl group having 1 to 4 carbon atoms;

$A^{201}$ and $A^{202}$ each independently represent a cyclic group selected from a phenylene group, a cyclohexylene group, a dioxolanediyl group, a cyclohexenylene group, a bicyclo[2.2.2]octylene group, a piperidinediyl group, a naphthalenediyl group, a decahydronaphthalenediyl group, a tetrahydronaphthalenediyl group, and an indanediyl group; in the phenylene group, the naphthalenediyl group, the tetrahydronaphthalenediyl group, and the indanediyl group, one or more —CH= groups in each ring are each optionally substituted with a nitrogen atom; in the cyclohexylene group, the dioxolanediyl group, the cyclohexenylene group, the bicyclo[2.2.2]octylene group, the piperidinediyl group, the decahydronaphthalenediyl group, the tetrahydronaphthalenediyl group, and the indanediyl group, one —$CH_2$— group or two —$CH_2$— groups not adjoining each other in each ring are each optionally substituted with —O— and/or —S—; at least one hydrogen atom of the cyclic group is optionally substituted with a fluorine atom, a chlorine atom, a bromine atom, a CN group, an $NO_2$ group, or an alkyl, alkoxy, alkylcarbonyl, or alkoxycarbonyl group which has 1 to 7 carbon atoms and of which one or more hydrogen atoms are each optionally substituted with a fluorine atom or a chlorine atom;

$n^{201}$ and $n_{202}$ each independently represent an integer from 1 to 3;

$P^{201}$ and $P^{202}$ each independently represent a photo-alignment group such as cinnamoyl, coumarin, benzylidene phthaldiimide, chalcone, azobenzene, or stilbene; $P^{201}$ is a monovalent group; and $P^{202}$ is a divalent group.

Preferred examples of such compounds include compounds represented by Formula (VIII-c) and having a cinnamoyl group, compounds represented by Formula (VIII-d) and having a coumarin group, and compounds represented by Formula (VIII-e) and having a benzylidene phthaldiimide group

[Chem. 53]

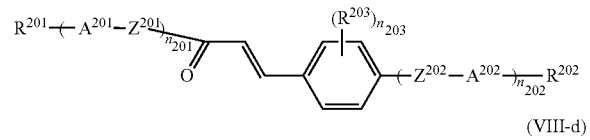
(VIII-c)

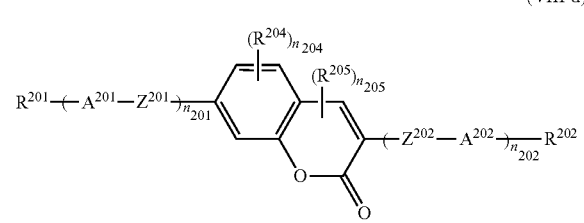
(VIII-d)

-continued

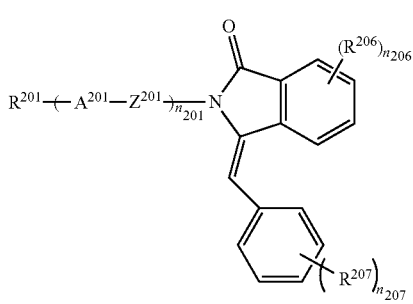

(VIII-e)

In Formulae (VIII-c), (VIII-d), and (VIII-e), definitions of $R^{201}$, $R^{202}$, $A^{201}$, $A^{202}$, $Z^{201}$, $Z^{202}$, $n_{201}$, and $n_{202}$ are the same as those in Formulae (VIII-a) and (VIII-b);

$R^{203}$, $R^{204}$, $R^{205}$, $R^{206}$, and $R^{207}$ each independently represent a halogen atom (F, Cl, Br, or I), a methyl group, a methoxy group, —$CF_3$, —$OCF_3$, a car boxy group, a sulfo group, a nitro group, an amino group, or a hydroxy group;

$n^{203}$ represents an integer from 0 to 4; $n^{204}$ represents an integer from 0 to 3; $n^{205}$ represents an integer of 0 or 1; $n^{206}$ represents an integer from 0 to 4; and $n^{207}$ represents an integer from 0 to 5.

EXAMPLES

The present invention will now be specifically described with reference to Examples; however, the present invention is not limited thereto. The symbol "%" refers to "mass %" unless otherwise specified.

In the description of phase transition temperature, "Cr" refers to a crystal phase, "SmC" refers to a smectic C phase. "SmA" refers to a smectic A phase, "N" refers to a nematic phase, and "I" or "Iso" refers to an isotropic phase. In the chemical formulae of compounds shown in Tables 1, 3, 5, and 7, an alkyl group and alkoxy groups ($C_5H_{11}$, $OC_8H_{17}$, $OC_{10}H_{21}$, and $OC_{12}H_{25}$) as side chains are each linear.

Examples 1 and Comparative Examples 1

Six compounds shown in Table 1 were selected as cyclohexylbiphenyl liquid crystal compounds, and two of them were mixed with each other in amounts of 50% as shown in Table 2, thereby preparing compositions.

TABLE 1

| Symbol | Chemical Formula and Phase Transition Temperature of Compound (° C.) |
|---|---|
| BB-3003 | ![structure] $C_5H_{11}$—⟨cyclohexyl⟩—⟨phenyl⟩—⟨difluorophenyl⟩—$OC_8H_{17}$<br>Cr 53 SmC 57 SmA 126 N 142 I |
| BB-3004 | $C_5H_{11}$—⟨cyclohexyl⟩—⟨phenyl⟩—⟨difluorophenyl⟩—$OC_{12}H_{25}$<br>Cr 57 (SmC 52) SmA 122 N 129 I |

TABLE 1-continued

| Symbol | Chemical Formula and Phase Transition Temperature of Compound (° C.) |
|---|---|
| BB-3005 | $C_5H_{11}$—⟨cyclohexyl⟩—⟨phenyl⟩—⟨difluorophenyl⟩—$OC_{10}H_{21}$<br>Cr 55 (SmC 55) SmA 109 N 135 I |
| BB-3006 | $C_5H_{11}$—⟨cyclohexyl⟩—⟨difluorophenyl⟩—⟨phenyl⟩—$OC_8H_{17}$<br>Cr 73.5 (SmC 73) SmA 94 N 141 I |
| BB-3007 | $C_5H_{11}$—⟨cyclohexyl⟩—⟨difluorophenyl⟩—⟨phenyl⟩—$OC_{10}H_{21}$<br>Cr 68 (SmC 64) SmA 110 N 135 I |
| BB-3008 | $C_5H_{11}$—⟨cyclohexyl⟩—⟨difluorophenyl⟩—⟨phenyl⟩—$OC_{12}H_{25}$<br>Cr 73 (SmC 58) SmA 114 N 129 I |

TABLE 2

| | Composition | | Phase Transition Temperature (° C.) | | | |
|---|---|---|---|---|---|---|
| | | | Cr | SmC | SmA | N-Iso |
| Example 1-1 | BB-3003 50% | BB-3006 50% | 2.8 | 68.6 | 117.5 | 145.9 |
| Example 1-2 | BB-3003 50% | BB-3007 50% | −2.2 | 66.0 | 118.7 | 140.3 |
| Example 1-3 | BB-3003 50% | BB-3008 50% | 0.3 | 58.7 | 118.5 | 137.1 |
| Comparative Example 1-1 | BB-3003 50% | BB-3004 50% | 9.8 | 53.2 | 123.4 | 136.8 |
| Comparative Example 1-2 | BB-3003 50% | BB-3005 50% | 10.7 | 57.2 | 126.8 | 141 |
| Comparative Example 1-3 | BB-3004 50% | BB-3005 50% | 26.4 | 56.3 | 125.6 | 135 |
| Comparative Example 1-4 | BB-3006 50% | BB-3007 50% | 30.1 | 73.2 | 105.0 | 140.2 |
| Comparative Example 1-5 | BB-3006 50% | BB-3008 50% | 15.7 | 66.7 | 107.3 | 136.8 |
| Comparative Example 1-6 | BB-3007 50% | BB-3008 50% | 29.5 | 65.8 | 113.7 | 133.9 |

As for phase transition temperature in Table 2, transition temperature between a nematic phase and an isotropic phase is shown in the column of "N-Iso"; and temperatures at which the phase shifted therefrom to an SmA phase, an SmC phase, and a crystal phase owing to a decrease in temperature are shown in the columns of "SmA", "SmC", and "Cr", respectively (the same holds true for Tables 4, 6, and 8).

Each of the liquid crystal compositions of Examples 1 (Examples 1-1 to Examples 1-3) was a mixture of liquid crystal compounds having a difference in the position of a 2,3-difluorobenzene structure and containing the same number of ring structures.

Each of the liquid crystal compositions of Comparative Examples 1 (Comparative Examples 1-1 to Comparative Examples 1-6) was a mixture of liquid crystal compounds each having a 2,3-difluorobenzene structure at the same position and containing the same number of ring structures.

The phase transition temperatures in Table 2 show that crystallization temperature (see the column "Cr" in the table) was lower in Examples 1 than in Comparative Examples 1 and that the temperature range of a SmC phase was wider in Examples 1 than in Comparative Examples 1.

Examples 2 and Comparative Examples 2

Six compounds shown in Table 3 were selected as cyclohexylethylbiphenyl liquid crystal compounds, and two of them were mixed with each other in amounts of 50% as shown in Table 4, thereby preparing compositions.

TABLE 4

|  | Composition | | Phase Transition Temperature (° C.) | | | |
|---|---|---|---|---|---|---|
|  |  |  | Cr | SmC | SmA | N-Iso |
| Example 2-1 | BB-3012 50% | BB-3009 50% | −17.1 | 54.9 | 113.7 | 128.3 |
| Example 2-2 | BB-3013 50% | BB-3009 50% | −12.8 | 54.2 | 116.7 | 127.3 |
| Example 2-3 | BB-3014 50% | BB-3009 50% | −3.6 | 50.8 | 116.2 | 124.5 |
| Comparative Example 2-1 | BB-3012 50% | BB-3013 50% | −10.7 | 66.9 | 108.1 | 127.7 |
| Comparative Example 2-2 | BB-3012 50% | BB-3014 50% | −0.3 | 63.8 | 109.5 | 125 |
| Comparative Example 2-3 | BB-3013 50% | BB-3014 50% | 5.6 | 64.5 | 113.3 | 122.9 |
| Comparative Example 2-4 | BB-3009 50% | BB-3010 50% | 32.1 | 44.3 | 120.1 | 125.9 |

TABLE 3

Symbol | Chemical Formula and Phase Transition Temperature of Compound (° C.)

BB-3009

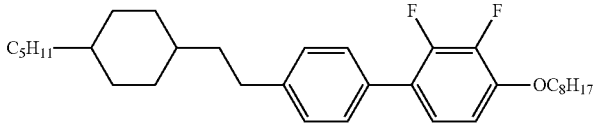

Cr 62 SmC 108 SmA 120 N 127 I

BB-3010

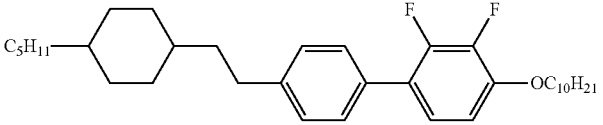

Cr 63 SmC 97 SmA 120 N 122 I

BB-3011

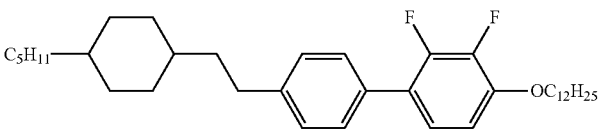

Cr 67 SmC 90 SmA 117 N 118 I

BB-3012

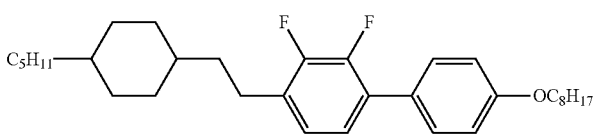

Cr 35 SmC 70 SmA 103 N 127 I

BB-3013

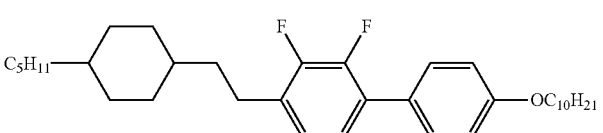

Cr 49 SmC 65 SmA 111 N 123 I

BB-3014

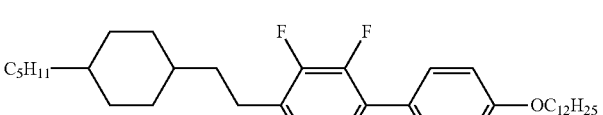

Cr 46 SmC 97 SmA 114 N 119 I

TABLE 4-continued

| | Composition | | Phase Transition Temperature (° C.) | | | |
|---|---|---|---|---|---|---|
| | | | Cr | SmC | SmA | N-Iso |
| Comparative Example 2-5 | BB-3009 50% | BB-3011 50% | 14.7 | 45.0 | 118.3 | 123.4 |
| Comparative Example 2-6 | BB-3010 50% | BB-3011 50% | 34.5 | 51.9 | 119.0 | 121.8 |

Each of the liquid crystal compositions of Examples 2 (Examples 2-1 to Examples 2-3) was a mixture of liquid crystal compounds having a difference in the position of a 2,3-difluorobenzene structure and containing the same number of ring structures.

Each of the liquid crystal compositions of Comparative Examples 2 (Comparative Examples 2-1 to Comparative Examples 2-61 was a mixture of liquid crystal compounds each having a 2,3-difluorobenzene structure at the same position and containing the same number of ring structures.

The phase transition temperatures in Table 4 show that crystallization temperature (see the column "Cr" in the table) was lower than 0° C. in Examples 2; the crystallization temperature in Example 2-1 reached −17° C. Examples 2 each had a lower crystallization temperature and a wider temperature range of a SmC phase than Comparative Examples 2.

Examples 3 and Comparative Examples 3

One cyclohexylbiphenyl liquid crystal compound and one cyclohexylethylbiphenyl liquid crystal compound were selected, and the selected two compounds were mixed with each other in amounts of 50% as shown in Table 5, thereby preparing compositions.

TABLE 6

| | Composition | | Phase Transition Temperature (° C.) | | | |
|---|---|---|---|---|---|---|
| | | | Cr | SmC | SmA | N-Iso |
| Example 3 | BB-3003 50% | BB-3012 50% | <−20.5 | 63.8 | 112.5 | 135.5 |
| Comparative Example 3 | BB-3003 50% | BB-3009 50% | 7.3 | 44.3 | 122.8 | 135 |

The liquid crystal composition of Example 3 was a mixture of liquid crystal compounds in which the alkyl side chains had the same number of carbon atoms in order to avoid an influence of a homologue and which had a difference in the position of a 2,3-difluorobenzene structure and contained the same number of ring structures for the purpose or comparison of an effect brought about by the positions of fluorine substituents of the 2,3-difluorophenyl structures.

The liquid crystal composition of Comparative Example 3 was a mixture of liquid crystal compounds each having a 2,3-difluorobenzene structure at the same position and containing the same number of ring structures.

The phase transition temperatures in Table 6 show that crystallization temperature (see the column "Cr" in the table) was lower than −20° C. in Example 3, and the temperature range of a SmC phase was greatly wider in Example 3 than in Comparative Examples 2.

Example 4

The liquid crystal composition shown in Table 7 was prepared in Example 4. This composition corresponds to a composition formed by addition of 5% of terphenyl liquid crystal compound to the liquid crystal composition of Example 3. In this example, the following combination of the two liquid crystal compounds BB-3003 and BB-3012 was a combination of two or more 2,3-difluorobenzene-skeleton-containing compounds having a difference in the position of a 2,3-difluorobenzene skeleton and containing the same number of ring structures.

TABLE 5

| | Composition | | |
|---|---|---|---|
| Example 3 | $C_5H_{11}$—⬡—⬡—⬡(F,F)—$OC_8H_{17}$ | BB-3003 | 50% |
| | $C_5H_{11}$—⬡—$CH_2CH_2$—⬡(F,F)—⬡—$OC_8H_{17}$ | BB-3012 | 50% |
| Comparative Example 3 | $C_5H_{11}$—⬡—⬡—⬡(F,F)—$OC_8H_{17}$ | BB-3003 | 50% |
| | $C_5H_{11}$—⬡—$CH_2CH_2$—⬡—⬡(F,F)—$OC_8H_{17}$ | BB-3009 | 50% |

TABLE 7

| Composition | | |
|---|---|---|
| Example 4 | 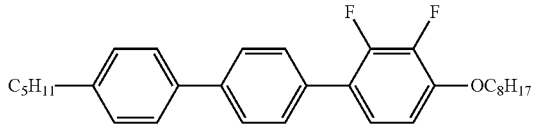 BB-3016 | 5% |
| | 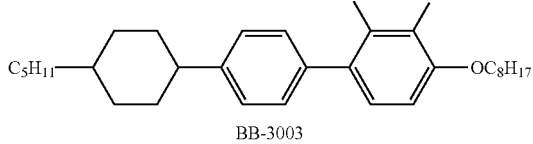 BB-3003 | 47.5% ⎫ |
| | 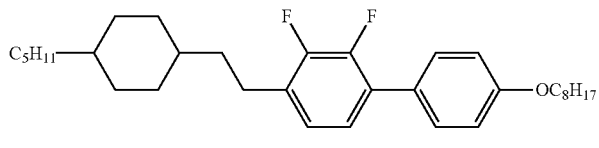 BB-3012 | 47.5% ⎬ Combination ⎭ |

TABLE 8

| | Phase Transition Temperature (° C.) | | | |
|---|---|---|---|---|
| | Cr | SmC | SmA | N-Iso |
| Example 4 | <−23 | 67.7 | 113.9 | 136.8 |

The liquid crystal composition of Example 4 was a mixture containing at least two liquid crystal compounds which had a difference in the position of a 2,3-difluorobenzene structure and which contained the same number of ring structures.

As shown in the phase transition temperatures in Table 8, in Example 4, crystallization temperature (see the column "Cr" in the table) was lower than −23° C., and the temperature range of a SmC phase was significantly wide.

Example 5

The liquid crystal composition shown in Table 9 was prepared in Example 5. In this example, each of a combination of BB-3003 and BB-3012 and a combination of BB-3009 and 8B-3013 was a combination of two or more 2,3-difluorobenzene-skeleton-containing compounds having a difference in the position of a 2,3-difluorobenzene skeleton and containing the same number of ring structures. Table 9 shows the phase transition temperatures (° C.) of the liquid crystal composition as well.

TABLE 9

| Example 5 | | | |
|---|---|---|---|
| | 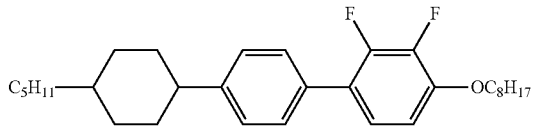 | BB-3003 | 25% |
| | 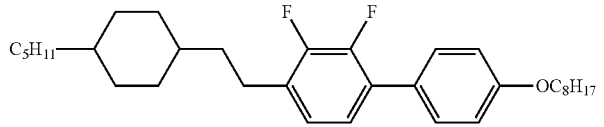 | BB-3012 | 25% |
| | 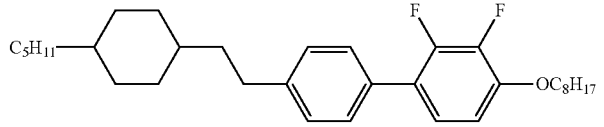 | BB-3009 | 25% |
| | 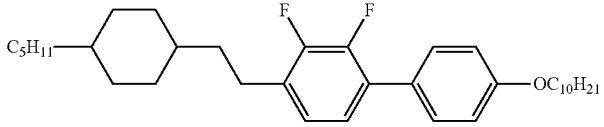 | BB-3013 | 25% |

Cr <−23 SmC 58.3 SmA 114 N 130.5 Iso

As shown in Table 9, in Example 5, crystallization temperature of the liquid crystal composition was lower than −23° C., and the temperature range of the SmC phase was significantly wide.

Examples 6 to 9

Liquid crystal compositions shown in Table 10 were prepared in Examples 6 and 9. Each of these liquid crystal compositions was a mixture of liquid crystal compounds having a difference in the position of a 2,3-difluorobenzene structure and containing the same number of ring structures. Table 10 shows the phase transition temperatures (° C.) of the liquid crystal compositions as well.

TABLE 10

| Example 6 | ![structure] | BB-3003 | 50% |
| | $C_5H_{11}$—[Cy]—[Ph]—[Ph(2,3-F)]—$OC_8H_{17}$ | | |
| | ![structure] | NN-001 | 50% |
| | CH₂=CH—[Cy]—CH₂—O—[Ph(2,3-F)]—O—CH₂—[Cy]—$C_2H_5$ | | |
| | Cr −17 N 107 Iso | | |
| Example 7 | ![structure] | NN-001 | 50% |
| | CH₂=CH—[Cy]—CH₂—O—[Ph(2,3-F)]—O—CH₂—[Cy]—$C_2H_5$ | | |
| | ![structure] | NN-002 | 50% |
| | $C_2H_5$—[Cy]—[Cy]—CH₂—O—[Ph(2,3-F)]—$OC_2H_5$ | | |
| | Cr −3.9 N 102.3 Iso | | |
| Example 8 | ![structure] | NN-002 | 50% |
| | $C_2H_5$—[Cy]—[Cy]—CH₂—O—[Ph(2,3-F)]—$OC_2H_5$ | | |
| | ![structure] | BB-3012 | 50% |
| | $C_5H_{11}$—[Cy]—CH₂CH₂—[Ph(2,3-F)]—[Ph]—$OC_8H_{17}$ | | |
| | Cry −19 N 131.1 Iso | | |
| Example 9 | ![structure] | NN-002 | 50% |
| | $C_2H_5$—[Cy]—[Cy]—CH₂—O—[Ph(2,3-F)]—$OC_2H_5$ | | |
| | ![structure] | BB-3006 | 50% |
| | $C_5H_{11}$—[Cy]—[Ph(2,3-F)]—[Ph]—$OC_8H_{17}$ | | |
| | Cr −8.1 N 110.2 Iso | | |

As shown in Table 10, each of the liquid crystal compositions of Examples 6 to 9 did not exhibit an Sm phase and had the significantly wide temperature range of the N phase.

Example 10

The liquid crystal composition shown in Table 11 was prepared in Example 10. In this example, each of a combination of NN-001 and NN-002 and a combination of BB-3003 and BB-3012 was a combination of two or more 2,3-difluorobenzene-skeleton-containing compounds having a difference in the position of a 2,3-difluorobenzene skeleton and containing the same number of ring structures. Table 11 shows the phase transition temperatures (° C.), refractive index anisotropy Δn, and dielectric anisotropy Δ∈ of the liquid crystal composition as well.

TABLE 11

| Example 10 | Structure | Code | % |
|---|---|---|---|
| | CH2=CH-Cy-CH2-O-Ph(2,3-F2)-O-CH2-Cy-C2H5 | NN-001 | 35% |
| | C2H5-Cy-Cy-CH2-O-Ph(2,3-F2)-OC2H5 | NN-002 | 35% |
| | C5H11-Cy-Ph-Ph(2,3-F2)-OC8H17 | BB-3003 | 15% |
| | C5H11-Cy-CH2CH2-Ph(2,3-F2)-Ph-OC8H17 | BB-3012 | 15% |

Cr −40 N 111.4 Iso
Δn: 0.1103 Δε: −7.3

As shown, in Table 11, in Example 10, the crystallization temperature was decreased to −40° C., and the temperature range of the N phase was significantly wide. The liquid crystal composition had a refractive index anisotropy Δn of 0.1103 and a dielectric anisotropy Δ∈ of −7.3. In particular, the liquid crystal composition having the wide temperature range of a nematic phase and a large negative dielectric anisotropy was produced.

Example 11

The liquid crystal composition shown in Table 12 was prepared in Example 11. In this example, each of a combination of NN-001 and NN-002 and a combination of BB-3003 and BB-3012 was a combination of two or more 2,3-difluorobenzene-skeleton-containing compounds having a difference in the position of a 2,3-difluorobenzene skeleton and containing the same number of ring structures. Table 12 shows the phase transition temperatures (° C.), refractive index anisotropy Δn, and dielectric anisotropy Δ∈ of the liquid crystal composition as well.

TABLE 12

| Example 11 | Structure | Code | % |
|---|---|---|---|
| | CH2=CH-Cy-CH2-O-Ph(2,3-F2)-O-CH2-Cy-C2H5 | NN-001 | 24.5% |

TABLE 12-continued

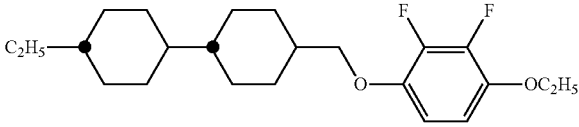

NN-002    24.5%

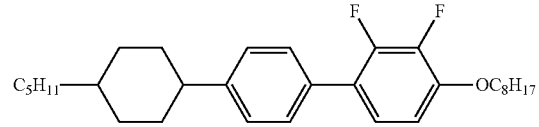

BB-3003   10.5%

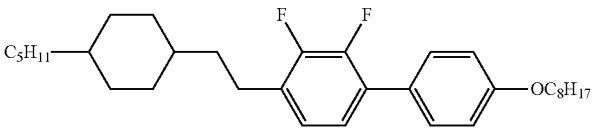

BB-3012   10.5%

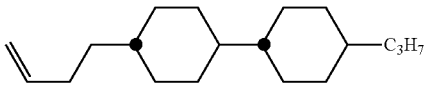

30%

Cr −43 N 104.9 Iso
Δn: 0.0865 Δε: −4.6

As shown in Table 12, in Example 11, the crystallization temperature was decreased to −43° C., and the temperature range of the H phase was significantly wide. The liquid crystal composition had a refractive index anisotropy Δn of 0.0865 and a dielectric anisotropy Δ∈ of −4.6. In particular, the liquid crystal composition having the wide temperature range of a nematic phase and a large negative dielectric anisotropy was produced.

Comparative Examples 5 to 7

Liquid crystal compositions shown in Table 13 were prepared in Comparative Examples 5 to 7. Each of these liquid crystal compositions was a mixture of liquid crystal compounds each having a 2,3-difluorobenzene structure at the same position and containing the same number of ring structures. Table 13 shows the phase transition temperatures (° C.) of the liquid crystal compositions as well.

TABLE 13

Comparative Example 5

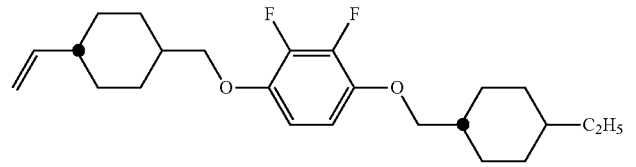

NN-001    50%

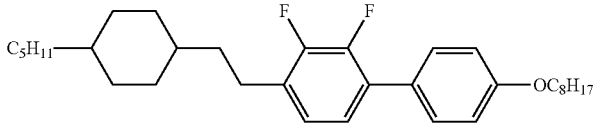

BB-3012   50%

Cr 12.7 N 102.6 Iso

Comparative Example 6

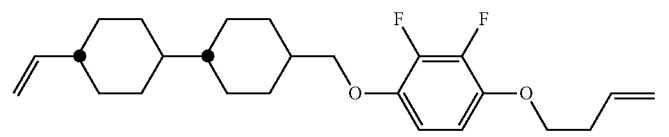

NN-003    50%

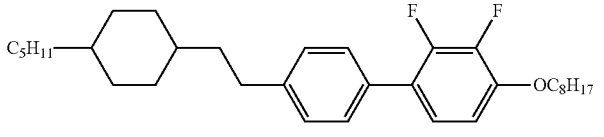

BB-3009   50%

Cr 28.3 SmA 54.3 N 123.6 Iso

TABLE 13-continued

| | | |
|---|---|---|
| Comparative Example 7 | 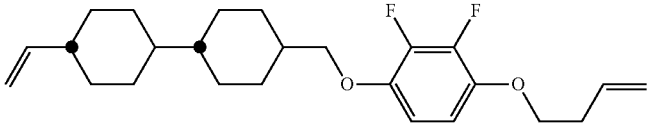 | NN-003 50% |
| | 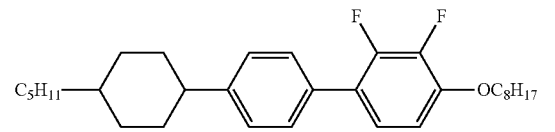 | BB-3003 50% |
| | Cr 13.8 SmA 71.3 N 130 Iso | |

As compared with Examples 6 to 9 shown in Table 10, Comparative Examples 5 to 7 shown in Table 13 each had the narrower temperature range of an N phase.

Example 12

The liquid crystal composition shown in Table 14 was prepared in Example 12. In this example, a combination of the same amount of BB-3003 and BB-3012 used in Example 3 and a combination of BB-3013 and BB-3016 in which the difference in an amount was 8% were each a combination of two or more 2,3-difluorobenzene-skeleton-containing compounds having a difference in the position of a 2,3-difluorobenzene skeleton and containing the same number of ring structures. Table 14 shows the phase transition temperatures (° C.) and selective reflection of the liquid crystal composition as well.

TABLE 14

| | | |
|---|---|---|
| Example 12 | 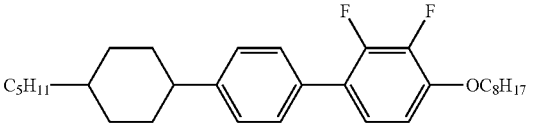 | BB-3003 24% |
| | 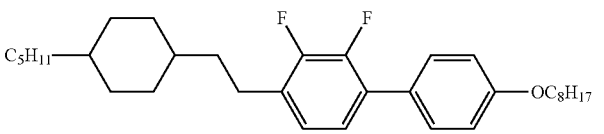 | BB-3012 24% |
| | 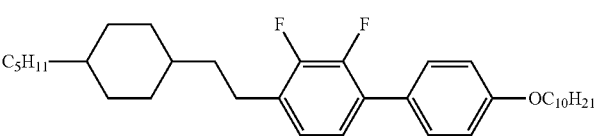 | BB-3013 20% |
| | 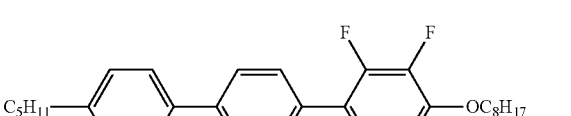 | BB-3016 12% |
| | 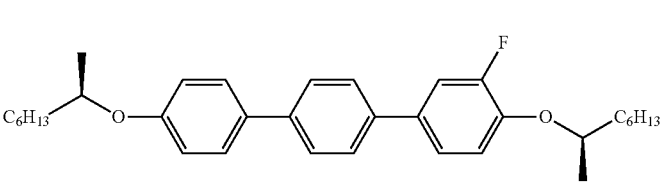 | JJ-3006 5% |
| | 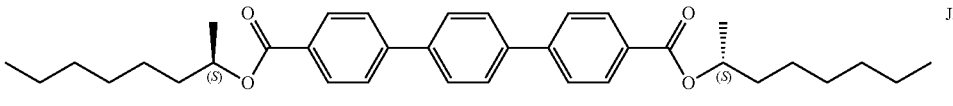 | JJ-3015 15% |
| | Cr −32 SmC* 57.6 SmA 103 N 116 Iso | |
| | Selective Reflection 1972 nm | |

As shown in Table 14, in Example 12, the crystallization temperature was decreased to −32° C., and the temperature range of the SmC* phase was significantly wide. The selective reflection of the liquid crystal composition of Example 12 was 1972 nm.

Example 13

The liquid crystal composition shown in Table 15 was prepared in Example 13. In this example, a combination of the same amount of BB-3003 and BB-3012 employed in Example 3 was a combination of two or more 2,3-difluorobenzene-skeleton-containing compounds having a difference in the position of a 2,3-difluorobenzene skeleton and containing the same number of ring structures, BB-3013 and BB-3017 were used for adjustment of phase transition temperatures and each had a 2,3-difluorobenzene skeleton at the same position; hence, they are not included in the combination used in the present invention. Table 15 shows the phase transition temperatures (° C.) of the liquid crystal composition as well.

two selected from the group consisting of a compound represented by General Formula (II-1), a compound represented by General Formula (II-2), and a compound represented by General Formula (II-3); or two selected from the group consisting of a compound represented by General Formula (III-1), a compound represented by General Formula (III-2), a compound represented by General Formula (III-3), and a compound represented by General Formula (III-4),

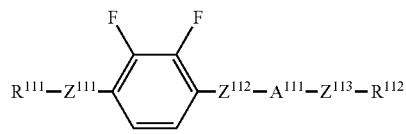

(I-1)

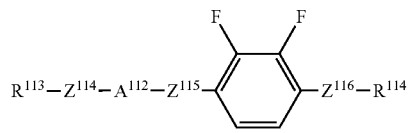

(I-2)

TABLE 15

Example 13

| Structure | Code | % |
|---|---|---|
| C₅H₁₁—[Cy]—[Ph]—[Ph(2,3-F₂)]—OC₈H₁₇ | BB-3003 | 28.5% |
| C₅H₁₁—[Cy]—CH₂CH₂—[Ph(3,2-F₂)]—[Ph]—OC₈H₁₇ | BB-3012 | 28.5% |
| C₅H₁₁—[Cy]—CH₂CH₂—[Ph(3,2-F₂)]—[Ph]—OC₁₀H₂₁ | BB-3013 | 24% |
| C₅H₁₁—[Ph]—[Ph(2,3-F₂)]—[Ph]—OC₈H₁₇ | BB-3017 | 14% |
| C₆H₁₃—*CH(CH₃)—O—[Ph(3,2-F₂)]—[Ph]—[Ph(2,3-F₂)]—O—*CH(CH₃)—C₆H₁₃ | JJ-3016 | 5% |

Cr −29 SmC* 70.9 SmA 100.7 N 130.3 Iso

As shown in Table 15, in Example 13, the crystallization temperature was decreased to −29° C., and the temperature range of the SmC* phase was significantly wide.

The invention claimed is:

1. A liquid crystal composition comprising two compounds, wherein said two compounds are:
two selected from the group consisting of a compound represented by General Formula (I-1) and a compound represented by General Formula (I-2); or -continued

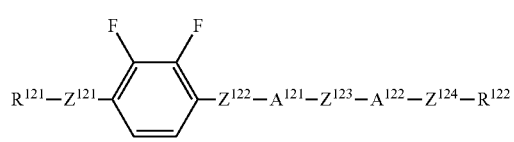

(II-1)

(II-2)

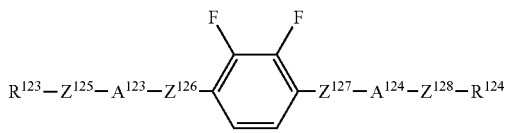

(II-3)

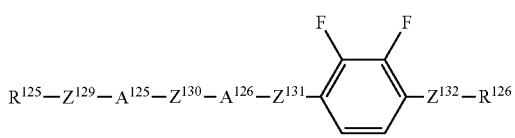

(III-1)

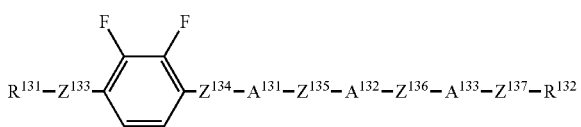

(III-2)

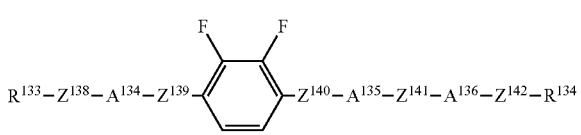

(III-3)

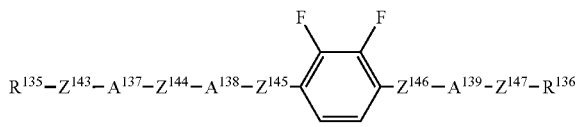

(III-4)

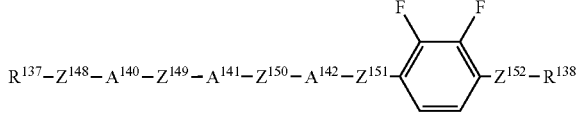

where $R^{111}$ to $R^{114}$, $R^{121}$ to $R^{126}$, and $R^{131}$ to $R^{138}$ each independently represent a linear or branched alkyl group having 1 to 18 carbon atoms, a hydrogen atom, or a fluorine atom; in the alkyl group, one —CH$_2$— group or two or more —CH$_2$— groups not adjoining each other are each optionally substituted with —O—, —S—, —CO—, —CO—O—, —O—CO—, —CO—S—, —S—CO—, —O—SO$_2$—, —SO$_2$—O—, —O—CO—O—, —CH=CH—, a cyclopropylene group, or —Si(CH$_3$)$_2$—; at least one hydrogen atom of the alkyl group is optionally substituted with a fluorine atom, a chlorine atom, a bromine atom, or a CN group;

$Z^{111}$ to $Z^{116}$ and $Z^{121}$ to $Z^{152}$ each independently represent —O—, —S—, —CO—, —CO—O—, —O—CO—, —O—CO—O—, —CO—N(R$^a$)—, —N(R$^a$)—CO—, —OCH$_2$—, —CH$_2$O—, —SCH$_2$—, —CH$_2$S—, —O—SO$_2$—, —SO$_2$—O—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=CH—, —CF=CH—, —CH=CF—, —CF=CF—, —C≡C—, —CH=CH—CO—O—, —O—CO—CH=CH—, or a single bond; R$^a$ of —CO—N(R$^a$)— or —N(R$^a$)—CO— represents a hydrogen atom or a linear or branched alkyl group having 1 to 4 carbon atoms;

$A^{111}$, $A^{112}$, $A^{121}$, $A^{124}$, $A^{125}$, $A^{126}$, and $A^{131}$ to $A^{142}$ each independently represent a cyclic group selected from a phenylene group, a cyclohexylene group, a dioxolanediyl group, a cyclohexenylene group, a bicyclo[2.2.2]octylene group, a piperidinediyl group, a naphthalenediyl group, a decahydronaphthalenediyl group, a tetrahydronaphthalenediyl group, and an indanediyl group; in the phenylene group, the naphthalenediyl group, the tetrahydronaphthalenediyl group, and the indanediyl group, at least one —CH= group in each ring is optionally substituted with a nitrogen atom; in the cyclohexylene group, the dioxolanediyl group, the cyclohexenylene group, the bicyclo[2.2.2]octylene group, the piperidinediyl group, the decahydronaphthalenediyl group, the tetrahydronaphthalenediyl group, and the indanediyl group, one —CH$_2$— group or two or more —CH$_2$— groups not adjoining each other in each ring are optionally substituted with —O— and/or —S—; and at least one hydrogen atom of each cyclic group is optionally substituted with a fluorine atom, a chlorine atom, a bromine atom, a CN group, an NO$_2$ group, or an alkyl, alkoxy, alkylcarbonyl, or alkoxycarbonyl group which has 1 to 7 carbon atoms and of which one or more hydrogen atoms are each optionally substituted with a fluorine atom or a chlorine atom, wherein a compound in which $A^{111}$, $A^{112}$, $A^{121}$, $A^{123}$, $A^{124}$, $A^{126}$, and $A^{131}$ to $A^{142}$ are each a 2,3-difluorobenzene skeleton is excluded, and $A^{122}$ and $A^{123}$ are cyclohexylene group.

2. The liquid crystal composition according to claim 1, wherein the liquid crystal composition exhibits a smectic liquid crystal phase.

3. The liquid crystal composition according to claim 1, wherein the liquid crystal composition exhibits a nematic liquid crystal phase.

4. A liquid crystal display device comprising the liquid crystal composition according to claim 1.

5. The liquid crystal composition according to claim 1, wherein said two compounds are:
the compound represented by General Formula (I-1) and the compound represented by General Formula (I-2); or
the compound represented by General Formula (II-1) and the compound represented by General Formula (II-2); or
the compound represented by General Formula (III-1) and the compound represented by General Formula (III-2).

6. The liquid crystal composition according to claim 1, wherein said two compounds are the compound represented by General Formula (II-1) and the compound represented by General Formula (II-2).

7. The liquid crystal composition according to claim 1, wherein said two compounds are the compound represented by General Formula (II-1) and the compound represented by General Formula (II-2), in which $A^{121}$ and $A^{124}$ are phenyl group.

8. The liquid crystal composition according to claim 6, wherein the liquid crystal composition has a crystallization temperature of 2.8° C. or lower.

9. The liquid crystal composition according to claim 8, wherein the liquid crystal composition has a crystallization temperature of less than 0° C.

10. The liquid crystal composition according to claim 7, wherein the liquid crystal composition has a crystallization temperature of 2.8° C. or lower.

11. The liquid crystal composition according to claim 10, wherein the liquid crystal composition has a crystallization temperature of less than 0° C.

* * * * *